(12) United States Patent
Dennis

(10) Patent No.: US 11,028,009 B2
(45) Date of Patent: *Jun. 8, 2021

(54) COEFFICIENT OF THERMAL EXPANSION FILLER FOR VANADIUM-BASED FRIT MATERIALS AND/OR METHODS OF MAKING AND/OR USING THE SAME

(71) Applicant: Guardian Glass, LLC, Auburn Hills, MI (US)

(72) Inventor: Timothy A. Dennis, Bloomdale, OH (US)

(73) Assignee: Guardian Glass, LLC, Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/432,080

(22) Filed: Jun. 5, 2019

(65) Prior Publication Data

US 2019/0308903 A1 Oct. 10, 2019

Related U.S. Application Data

(60) Continuation of application No. 15/242,861, filed on Aug. 22, 2016, now Pat. No. 10,329,187, which is a
(Continued)

(51) Int. Cl.
*E06B 3/673* (2006.01)
*C03C 8/24* (2006.01)
(Continued)

(52) U.S. Cl.
CPC .................. *C03C 8/24* (2013.01); *C03C 8/04* (2013.01); *E06B 3/677* (2013.01); *E06B 3/6736* (2013.01);
(Continued)

(58) Field of Classification Search
CPC .. E06B 3/6612; E06B 3/67334; E06B 3/6736; E06B 3/677; E06B 3/673;
(Continued)

(56) References Cited

U.S. PATENT DOCUMENTS 3,120,433 A 2/1964 Van Zee
3,252,811 A 5/1966 Beall
(Continued)

FOREIGN PATENT DOCUMENTS

AU 60 657 1/1967
DE 195 45 422 6/1997
(Continued)

OTHER PUBLICATIONS

U.S. Appl. No. 15/242,861, filed Aug. 22, 2016; Dennis.
(Continued)

*Primary Examiner* — Donald J Loney

(57) ABSTRACT

Certain example embodiments relate to seals for glass articles. Certain example embodiments relate to a composition used for sealing an insulted glass unit. In certain example embodiments the composition includes vanadium oxide, barium oxide, zinc oxide, and at least one additional additive. For instance, another additive that is a different metal oxide or different metal chloride may be provided. In certain example embodiments, a composition may be combined with a binder solution that substantially or completely burns out by the time the composition is melted. In certain example embodiments, a CTE filler is included with a frit material. In certain example embodiments, a vacuum insulated glass unit includes first and second glass substrates that are sealed together with a seal that includes the above-described composition.

4 Claims, 50 Drawing Sheets

Related U.S. Application Data division of application No. 13/480,987, filed on May 25, 2012, now Pat. No. 9,458,052, which is a continuation-in-part of application No. 13/354,963, filed on Jan. 20, 2012, now Pat. No. 9,359,247, which is a continuation-in-part of application No. 13/339,463, filed on Dec. 29, 2011, now Pat. No. 9,309,146, which is a continuation-in-part of application No. 13/238,358, filed on Sep. 21, 2011, now Pat. No. 9,290,408, which is a continuation-in-part of application No. 12/929,875, filed on Feb. 22, 2011, now Pat. No. 8,802,203.

(51) Int. Cl.
*E06B 3/677* (2006.01)
*C03C 8/04* (2006.01)

(52) U.S. Cl.
CPC .......... *E06B 3/67334* (2013.01); *E06B 3/673* (2013.01); *Y02B 80/22* (2013.01)

(58) Field of Classification Search
CPC ........ Y02B 80/24; Y02B 80/22; Y02A 30/25; Y02A 30/249
See application file for complete search history.

(56) References Cited

U.S. PATENT DOCUMENTS

| | | |
|---|---|---|
| 3,331,659 A | 7/1967 | Malloy |
| 3,650,778 A | 3/1972 | Dumesnil et al. |
| 3,837,866 A | 9/1974 | Malmendier et al. |
| 3,862,830 A | 1/1975 | Stern |
| 4,186,023 A | 1/1980 | Dumesnil et al. |
| 4,221,604 A | 9/1980 | Chirino et al. |
| 4,256,495 A | 3/1981 | Kawamura et al. |
| 4,314,031 A | 2/1982 | Sanford et al. |
| 4,482,579 A | 11/1984 | Fujii et al. |
| 4,683,154 A | 7/1987 | Benson et al. |
| 4,743,302 A | 5/1988 | Dumesnil et al. |
| 4,788,471 A | 11/1988 | Strauss |
| 4,801,488 A | 1/1989 | Smith |
| 4,810,484 A | 3/1989 | Uedaira et al. |
| 4,820,365 A | 4/1989 | Brumm et al. |
| 5,013,360 A | 5/1991 | Finkelstein et al. |
| 5,051,381 A | 9/1991 | Ohji et al. |
| 5,089,446 A | 2/1992 | Cornelius et al. |
| 5,188,990 A | 2/1993 | Dumesnil et al. |
| 5,336,644 A | 8/1994 | Akhtar et al. |
| 5,355,051 A | 10/1994 | Fondrk |
| 5,516,733 A | 5/1996 | Morena |
| 5,534,469 A | 7/1996 | Hayashi |
| 5,643,840 A | 7/1997 | Hikata et al. |
| 5,657,607 A | 8/1997 | Collins et al. |
| 5,664,395 A | 9/1997 | Collins et al. |
| 5,902,652 A | 5/1999 | Collins et al. |
| 6,187,700 B1 | 2/2001 | Merkel |
| 6,300,263 B1 | 10/2001 | Merkel |
| 6,326,685 B1 | 12/2001 | Jin et al. |
| 6,365,242 B1 | 4/2002 | Veerasamy |
| 6,383,580 B1 | 5/2002 | Aggas |
| 6,391,809 B1 | 5/2002 | Young |
| 6,399,169 B1 | 6/2002 | Wang et al. |
| 6,444,281 B1 | 9/2002 | Wang et al. |
| 6,472,032 B1 | 10/2002 | Asano |
| 6,503,583 B2 | 1/2003 | Nalepka et al. |
| 6,541,083 B1 | 4/2003 | Landa et al. |
| 6,566,290 B2 | 5/2003 | Beall et al. |
| 6,635,321 B2 | 10/2003 | Wang et al. |
| 6,641,689 B1 | 11/2003 | Aggas |
| 6,692,600 B2 | 2/2004 | Veerasamy et al. |
| 6,701,749 B2 | 3/2004 | Wang et al. |
| 6,946,171 B1 | 9/2005 | Aggas |
| 6,998,776 B2 | 2/2006 | Aitken et al. |
| 7,105,235 B2 | 9/2006 | Lo et al. |
| 7,244,480 B2 | 7/2007 | Minaai et al. |
| 7,435,695 B2 | 10/2008 | Hormadaly |
| 7,452,489 B2 | 11/2008 | Sawai et al. |
| 7,602,121 B2 | 10/2009 | Aitken et al. |
| 7,736,546 B2 | 6/2010 | Prunchak |
| 8,802,203 B2 | 8/2014 | Dennis |
| 9,290,408 B2 | 3/2016 | Dennis |
| 9,309,146 B2 | 4/2016 | Dennis |
| 9,359,247 B2 | 6/2016 | Dennis |
| 9,458,052 B2 | 10/2016 | Dennis |
| 9,776,910 B2 * | 10/2017 | Dennis ..................... C03C 8/04 |
| 10,329,187 B2 * | 6/2019 | Dennis ..................... C03C 8/04 |
| 2004/0043887 A1 | 3/2004 | Paulson |
| 2004/0207314 A1 | 10/2004 | Aitken et al. |
| 2005/0001545 A1 | 1/2005 | Aitken et al. |
| 2005/0110168 A1 | 5/2005 | Chuang |
| 2005/0191515 A1 | 9/2005 | Brese et al. |
| 2005/0233885 A1 | 10/2005 | Yoshida et al. |
| 2006/0003883 A1 | 1/2006 | Yoshida et al. |
| 2006/0042748 A1 | 3/2006 | Hasegawa et al. |
| 2006/0128549 A1 | 6/2006 | Hormadaly |
| 2007/0194304 A1 | 8/2007 | Zu et al. |
| 2009/0064717 A1 | 3/2009 | Son et al. |
| 2009/0151854 A1 | 6/2009 | Cooper |
| 2009/0151855 A1 | 6/2009 | Wang et al. |
| 2009/0199897 A1 | 8/2009 | Naito |
| 2009/0297862 A1 | 12/2009 | Boek et al. |
| 2010/0275654 A1 | 11/2010 | Wang |
| 2010/0330308 A1 | 12/2010 | Cooper et al. |
| 2011/0130264 A1 | 6/2011 | Beall |
| 2012/0213954 A1 | 8/2012 | Dennis |
| 2012/0308747 A1 | 12/2012 | Dennis |
| 2012/0321902 A1 | 12/2012 | Kohara et al. |

FOREIGN PATENT DOCUMENTS

| | | |
|---|---|---|
| EP | 0 061 183 | 9/1982 |
| EP | 0 889 010 | 1/1999 |
| EP | 1 065 183 | 1/2001 |
| EP | 1 571 134 | 9/2005 |
| EP | 2 017 236 | 1/2009 |
| JP | 63-55098 | 4/1988 |
| JP | 1992-231349 | 8/1992 |
| JP | 06-316435 | 11/1994 |
| JP | 2002-137939 | 5/2002 |
| JP | 2005-112715 | 4/2005 |
| JP | 2008-524419 | 10/2006 |
| JP | 2008-115057 | 5/2008 |
| JP | 2008-214153 | 9/2008 |
| JP | 2009-221047 | 10/2009 |
| JP | 2009-221048 | 10/2009 |
| JP | 2009-298673 | 12/2009 |
| JP | 2011-84437 | 4/2011 |
| JP | 2011-086518 | 4/2011 |
| KR | 10-2009-0026421 | 3/2009 |
| KR | 10-0978359 | 8/2010 |
| SU | 852811 | 8/1981 |
| SU | 1 578 093 | 7/1990 |
| SU | 1590472 | 9/1990 |
| SU | 1694561 | 11/1991 |
| SU | 1791433 | 1/1993 |
| WO | WO 96/02473 | 2/1996 |
| WO | WO 96/22255 | 7/1996 |
| WO | WO 99/47466 | 9/1999 |
| WO | WO 02/14640 | 2/2002 |
| WO | WO 02/27135 | 4/2002 |
| WO | WO 2004/095597 | 11/2004 |
| WO | WO 2006/044383 | 4/2006 |
| WO | WO 2011/108115 | 9/2011 |
| WO | WO 2012/115796 | 8/2012 |
| WO | WO 2013/043340 | 3/2013 |
| WO | WO 2013/101748 | 7/2013 |

OTHER PUBLICATIONS

U.S. Appl. No. 13/480,987, filed May 25, 2012; Dennis.
U.S. Appl. No. 12/458,071, filed Jun. 30, 2009; Cooper et al.

(56) References Cited

OTHER PUBLICATIONS

U.S. Appl. No. 12/000,663, filed Dec. 14, 2007; Cooper.
U.S. Appl. No. 13/354,963, filed Jan. 20, 2012; Dennis.
U.S. Appl. No. 12/000,791, filed Dec. 17, 2007; Wang et al.
Empower Materials: MSDS for QPAC 40 (7pgs).
U.S. Appl. No. 13/339,463, filed Dec. 29, 2011; Dennis.
U.S. Appl. No. 13/238,358, filed Sep. 21, 2011; Dennis.
U.S. Appl. No. 12/929,874, filed Feb. 22, 2011; Dennis.
U.S. Appl. No. 12/929,876, filed Feb. 22, 2011; Cooper et al.
U.S. Appl. No. 12/929,875, filed Feb. 22, 2011; Dennis.
U.S. Appl. No. 12/453,221, filed May 1, 2009; Wang.
"Pb-Free Vanadium-Based Low-Melting Glass Paste: VS-1026"; Hitachi Powered Metals Technical Report No. 7, (2008).
International Search Report dated Apr. 9, 2009.
International Search Report dated Jul. 8, 2010.
International Search Report dated Mar. 18, 2009.
Korean Office Action for KR Application No. 10-2014-7022057.
Korean Office Action for KR Application No. 10-2014-7021186.

\* cited by examiner

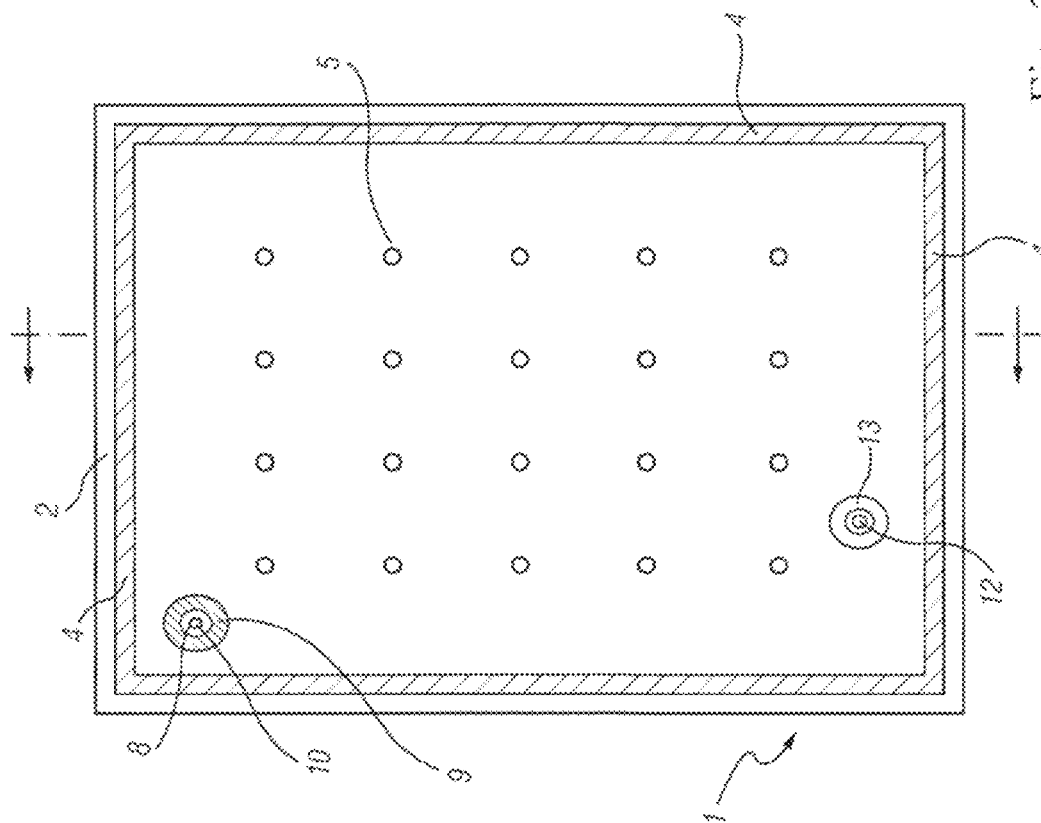
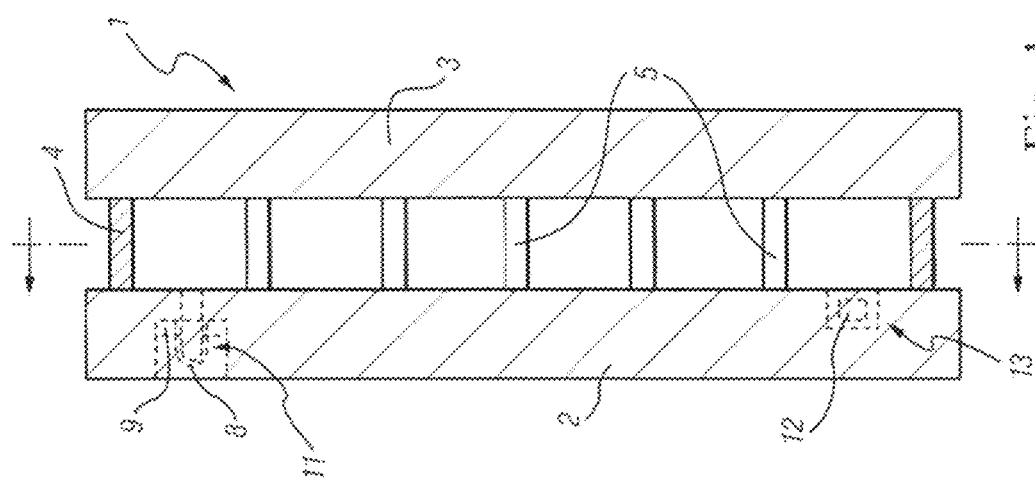
Fig. 2 (Prior Art)
Fig. 1 (Prior Art)

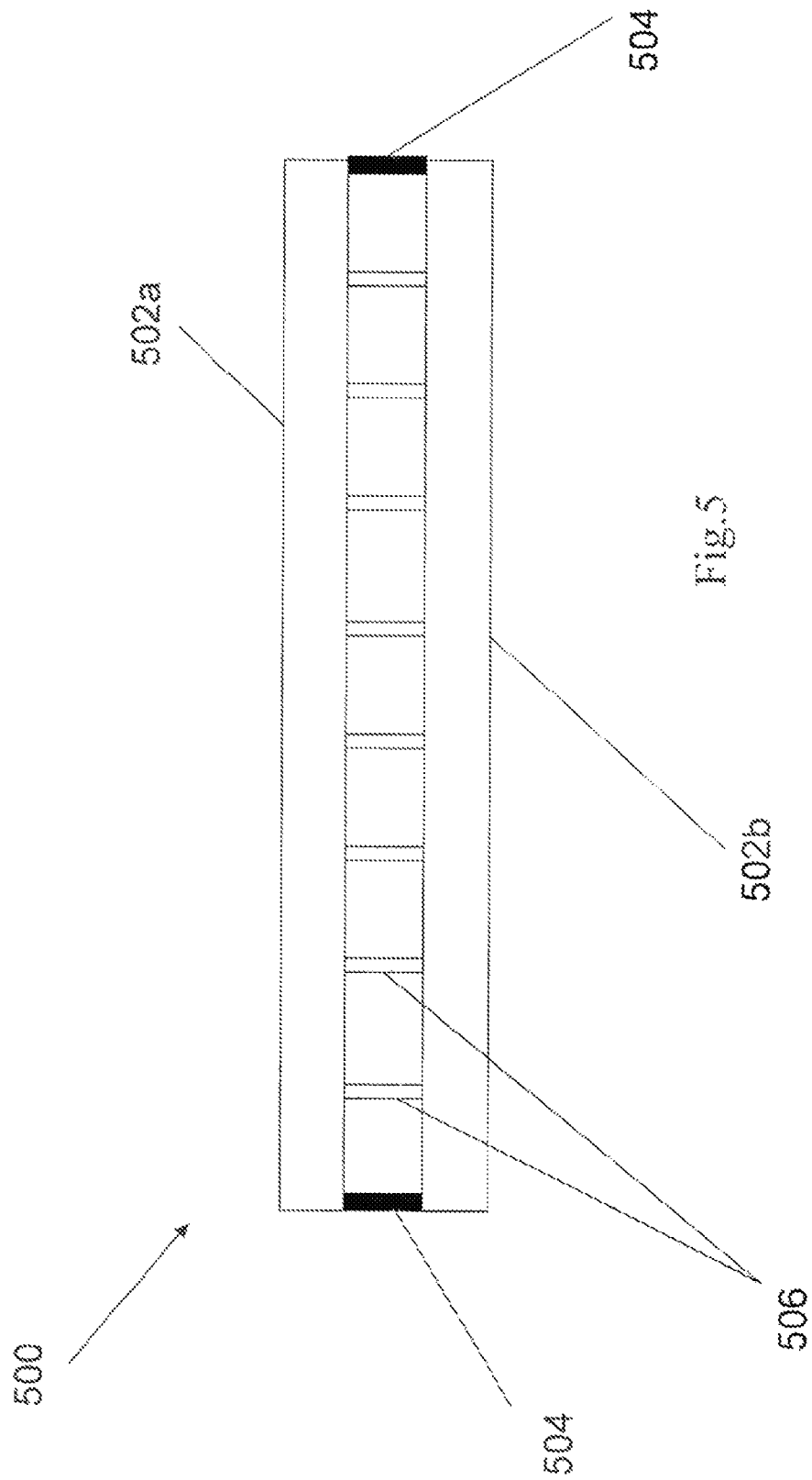

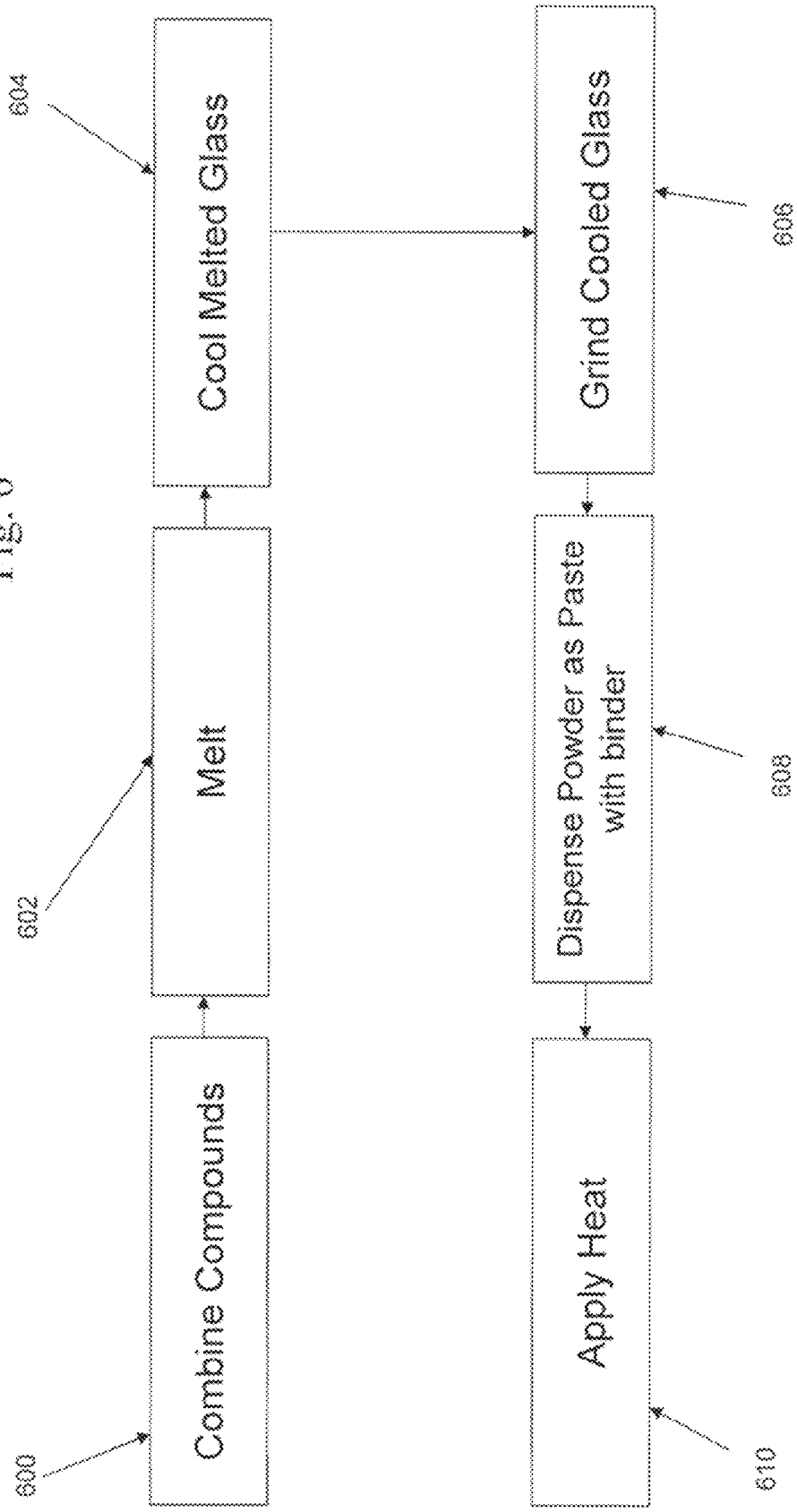

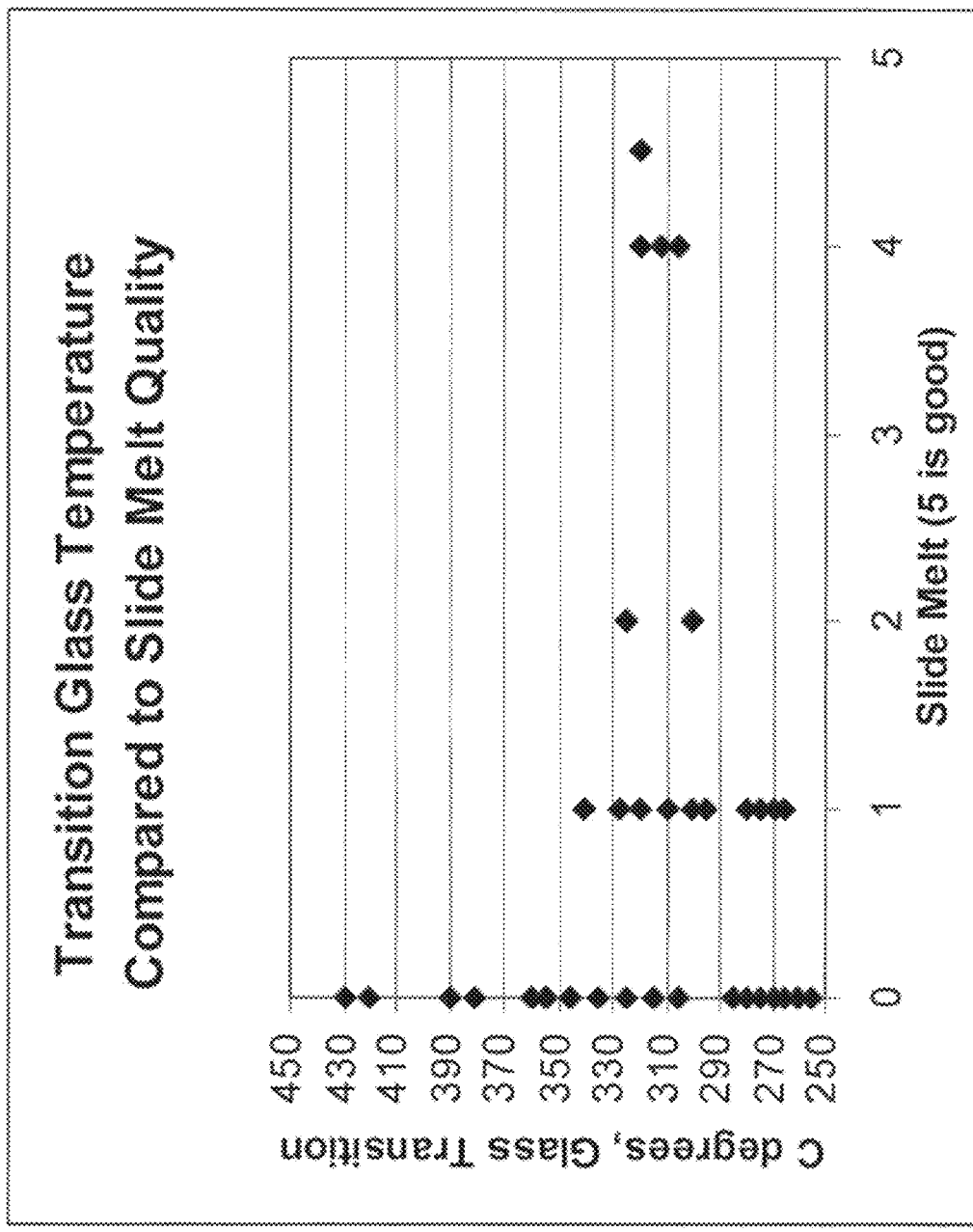

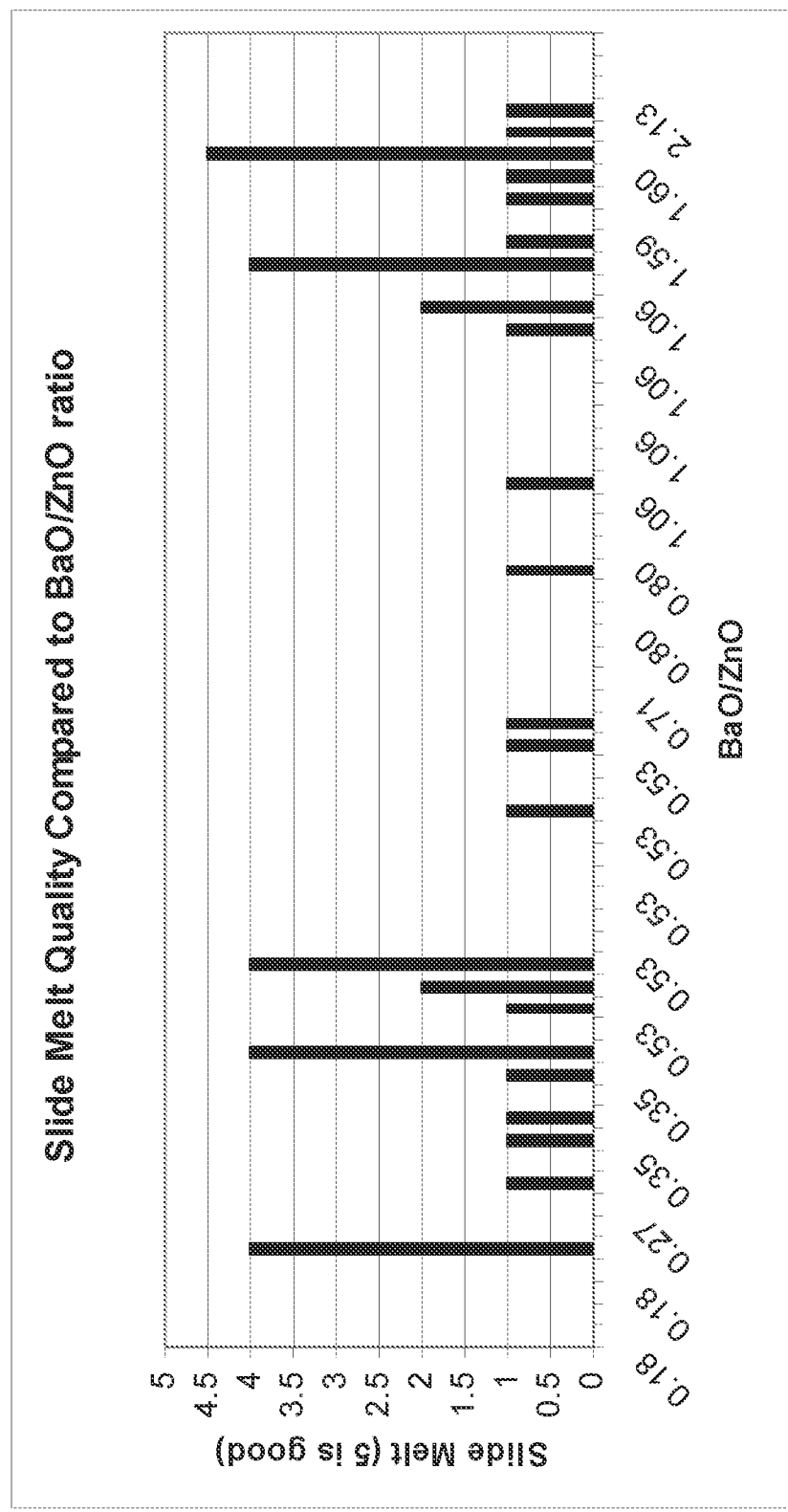

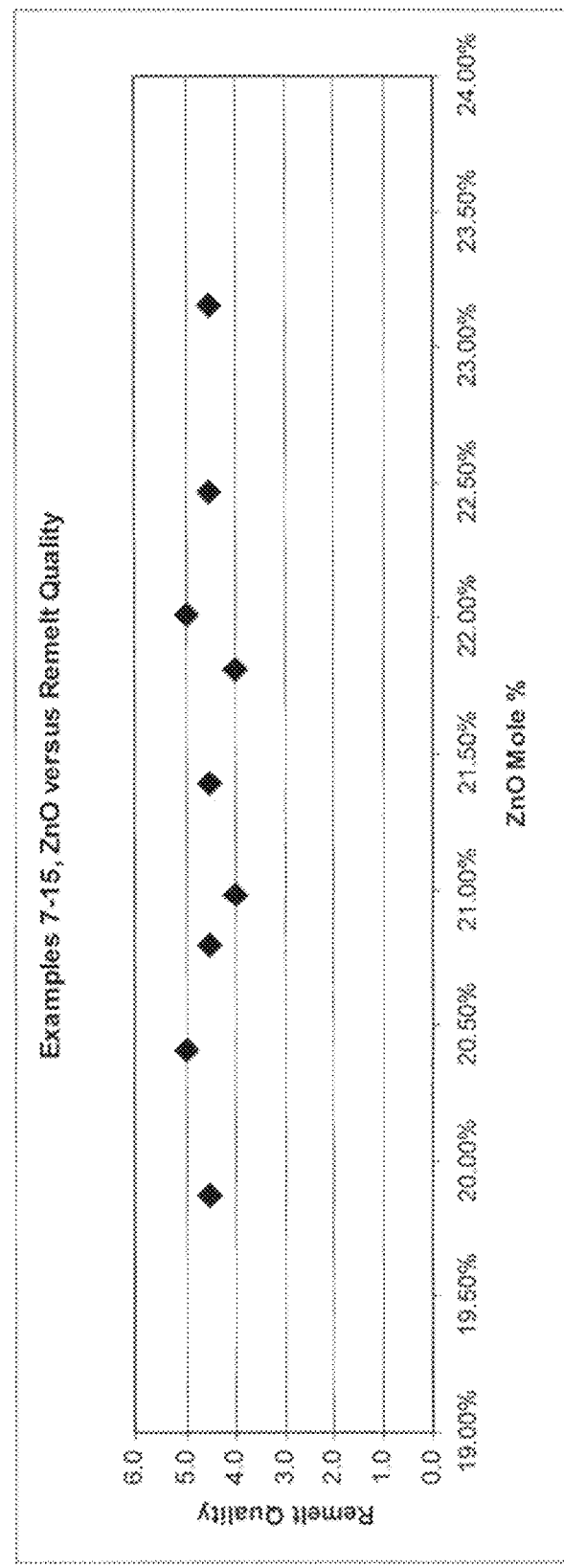

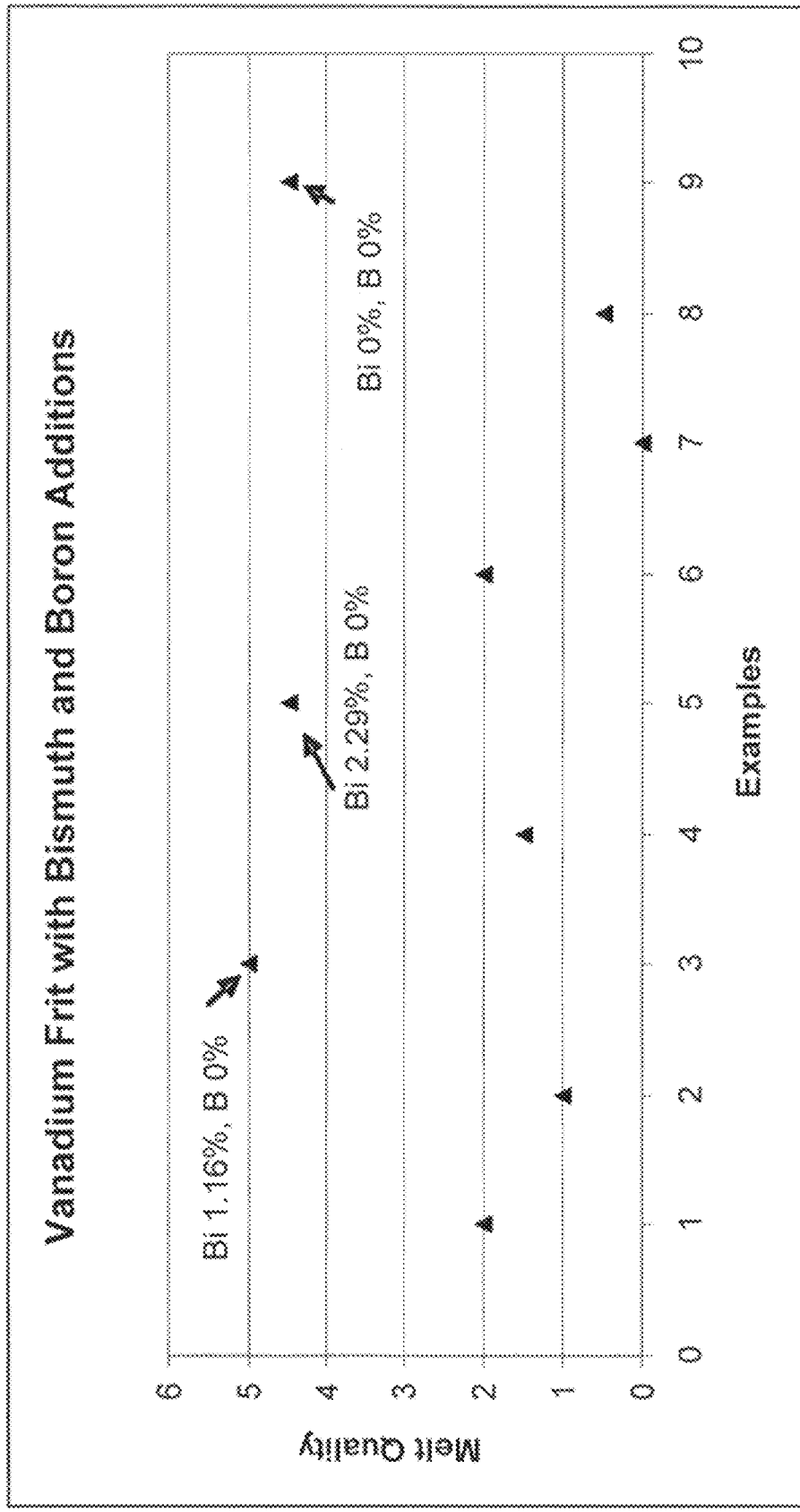

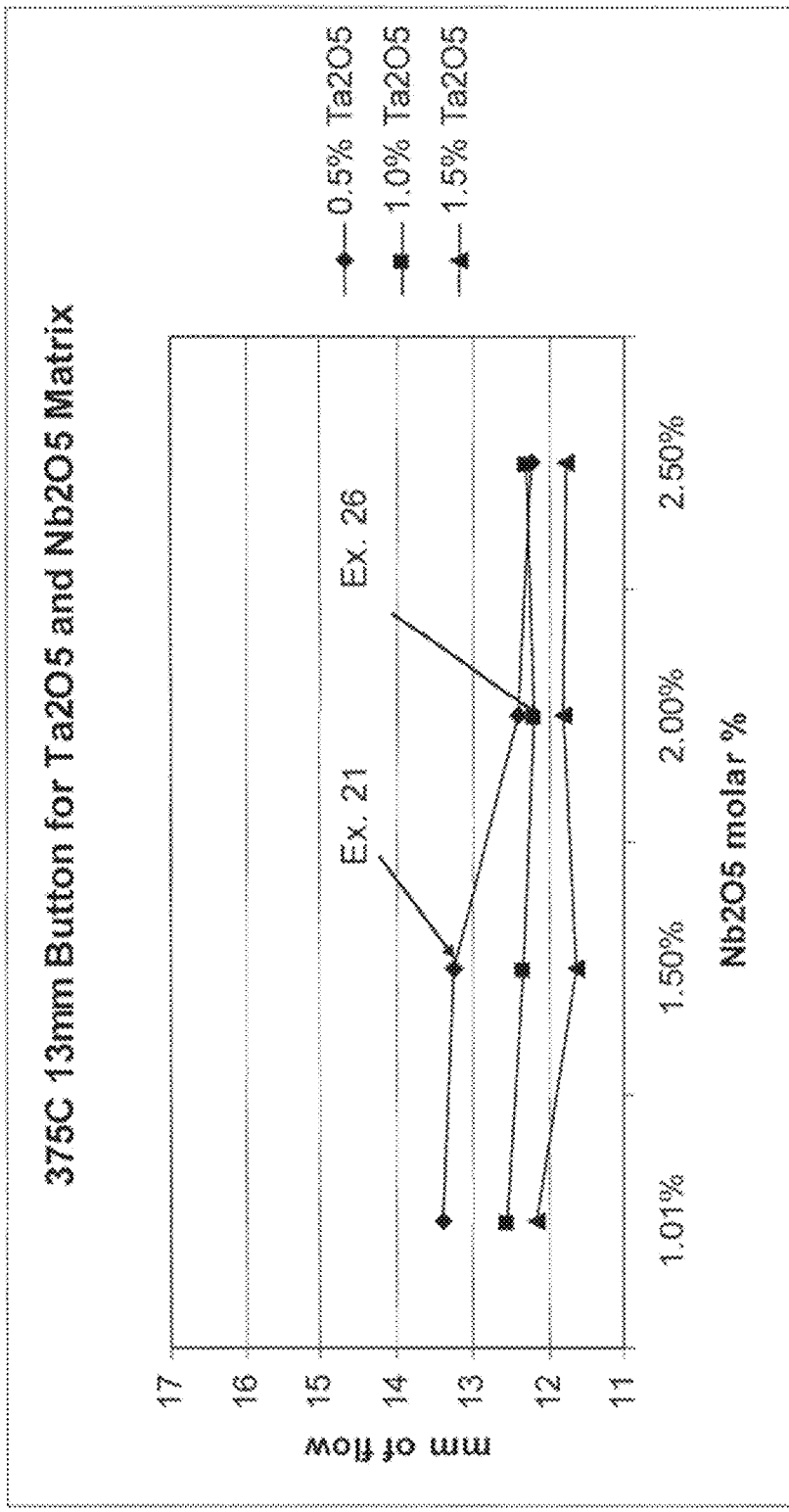

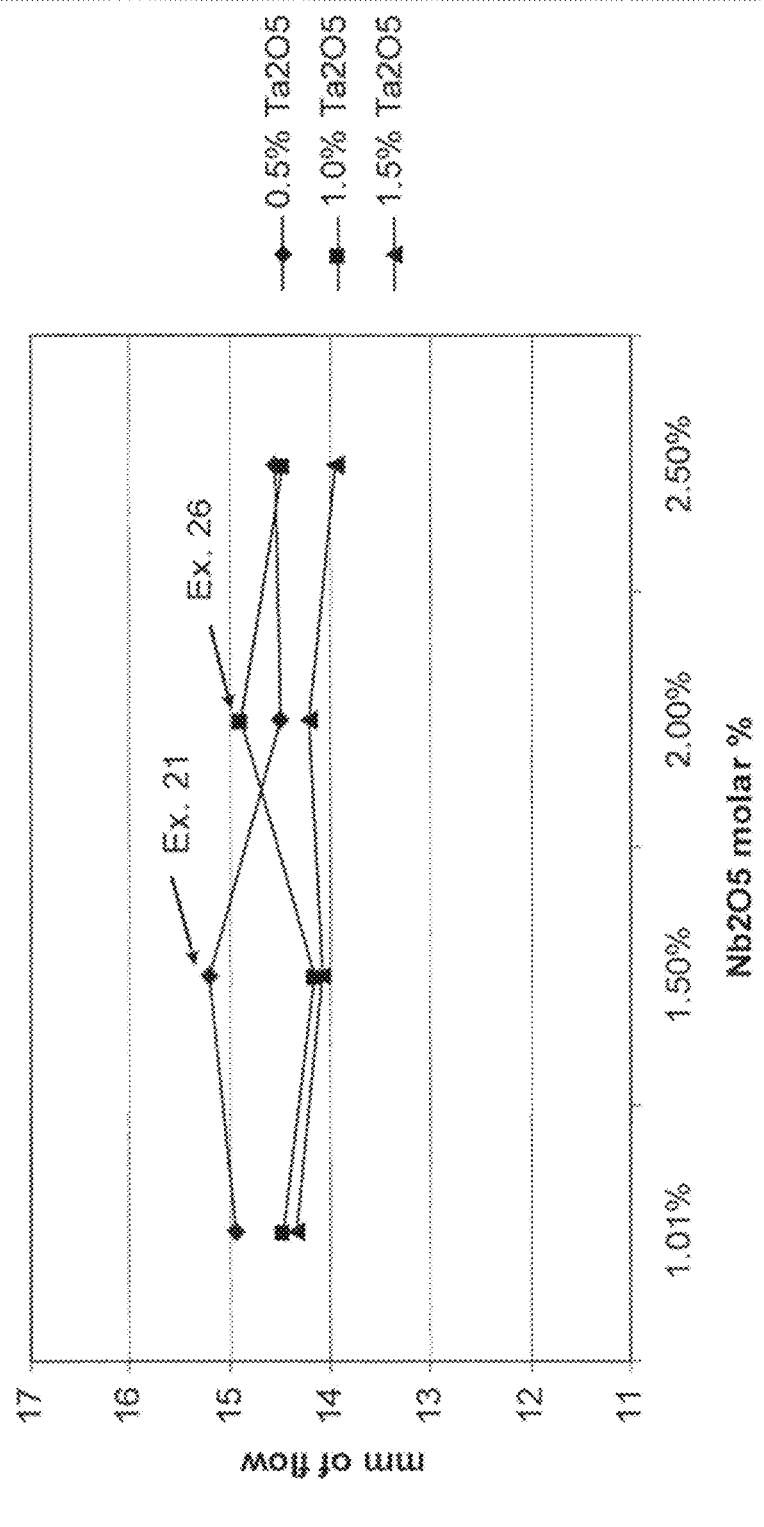

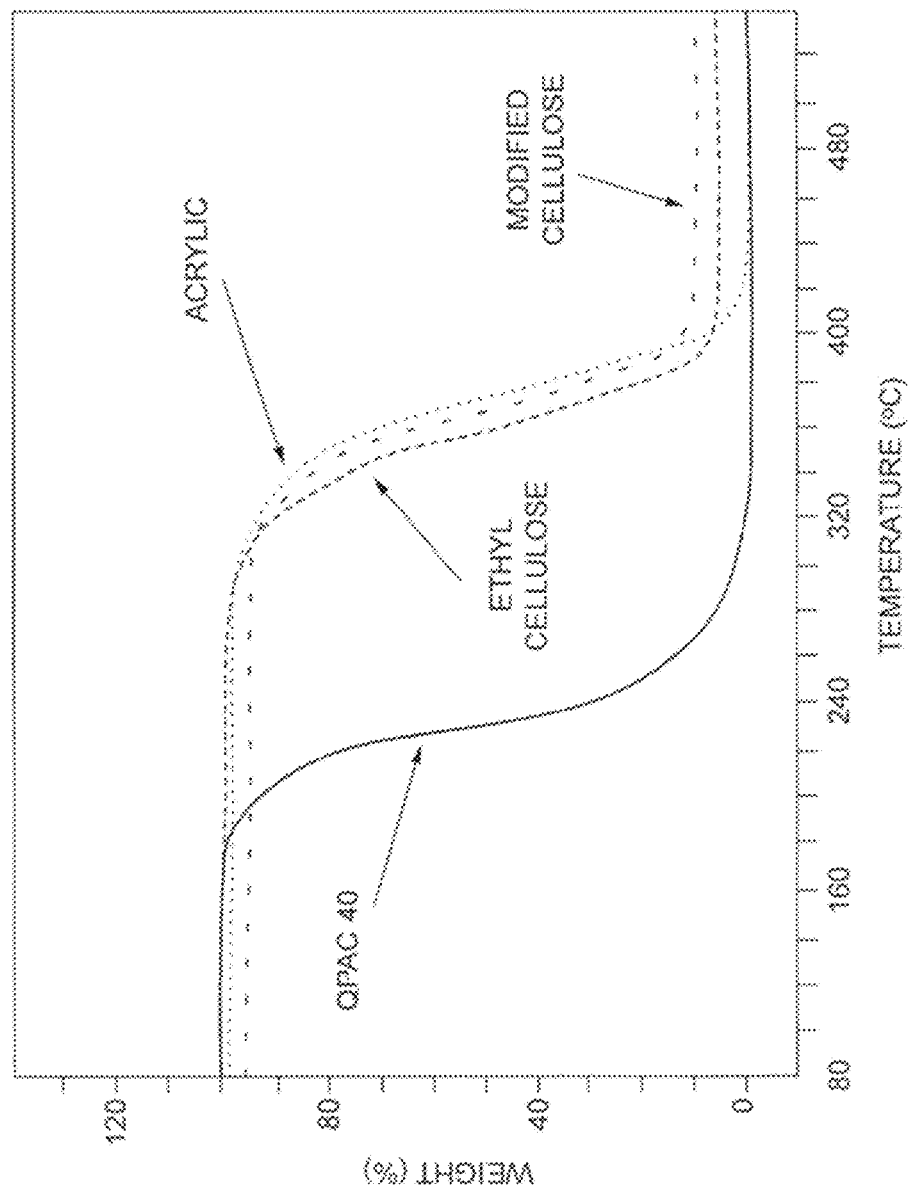

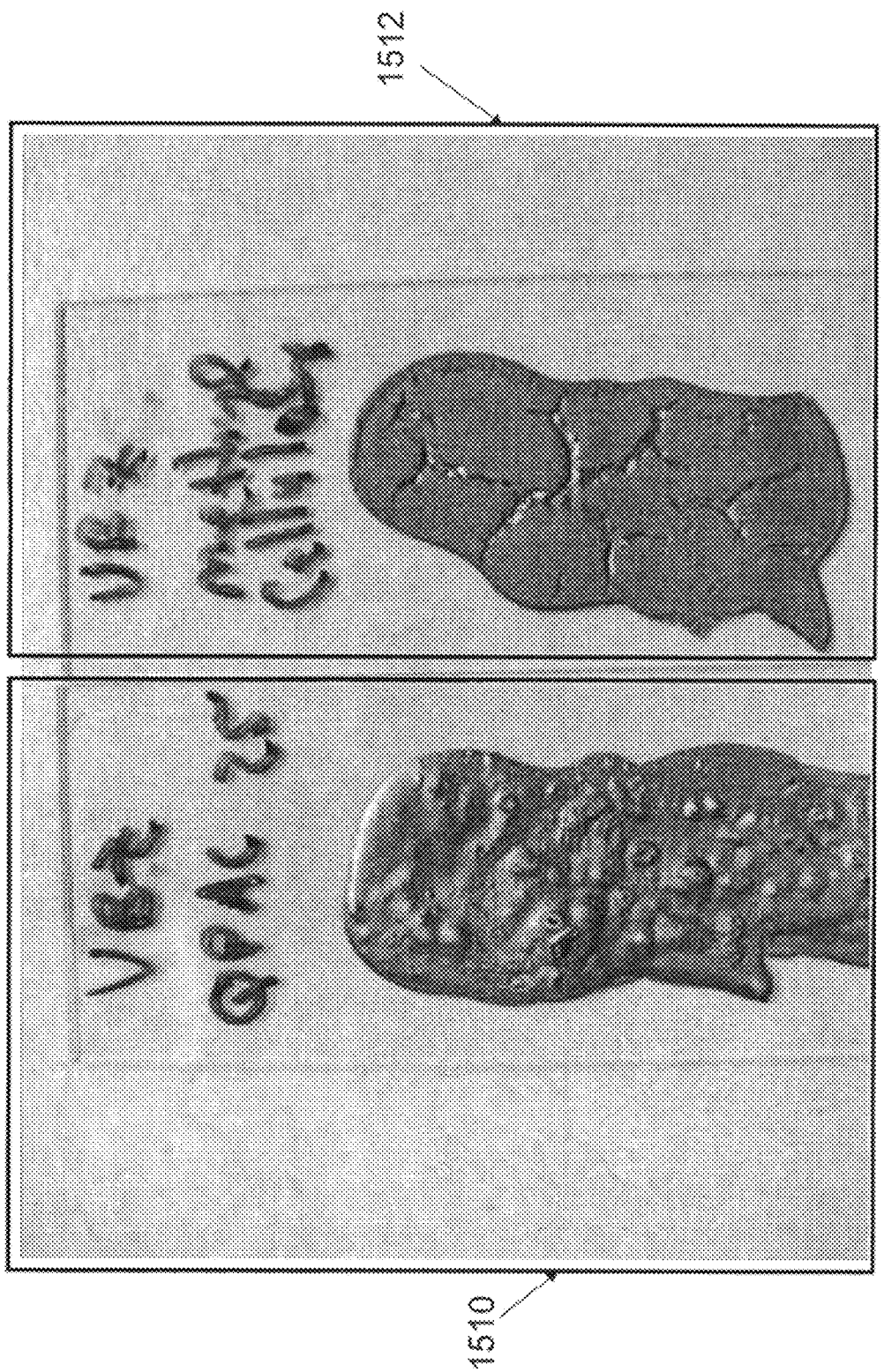

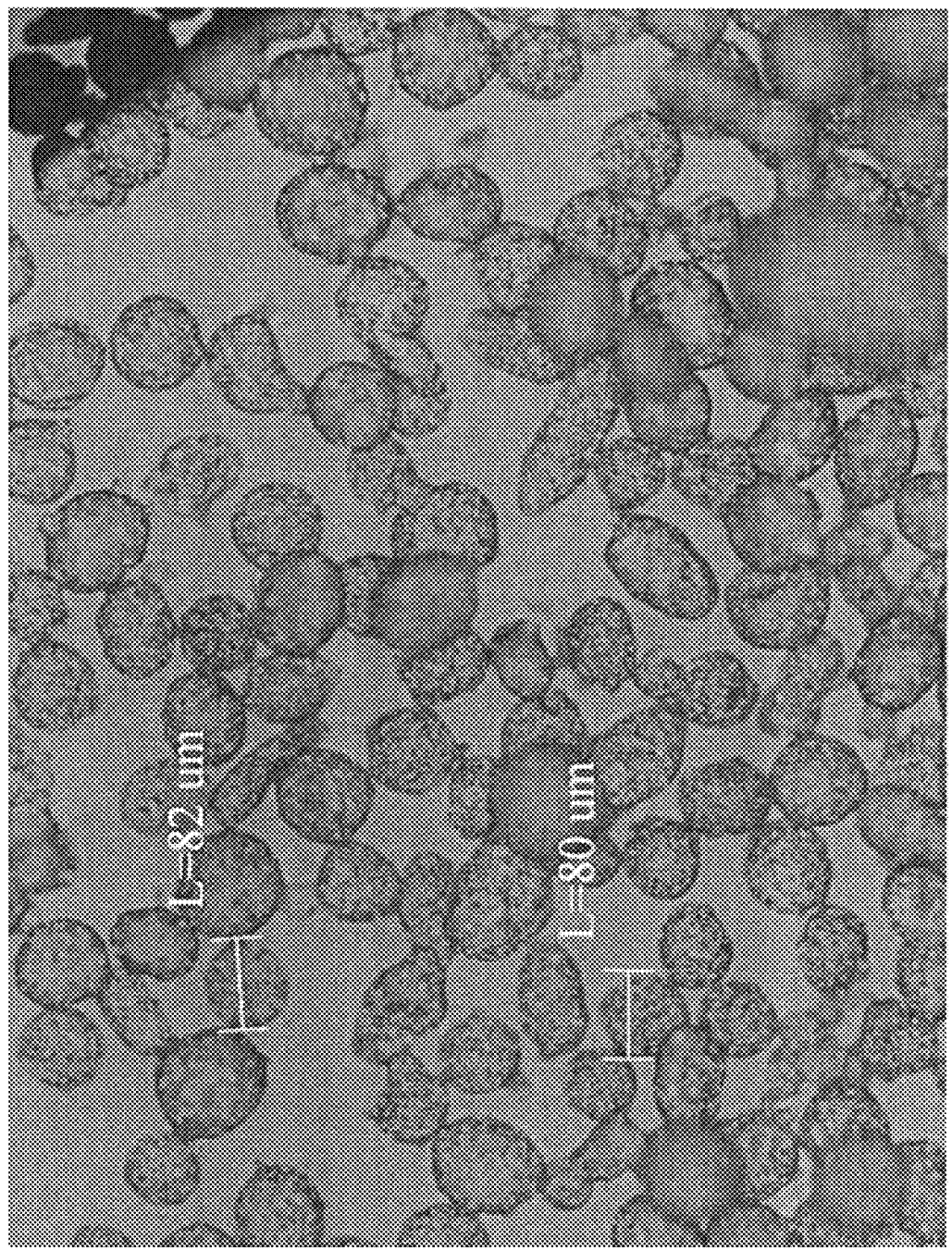

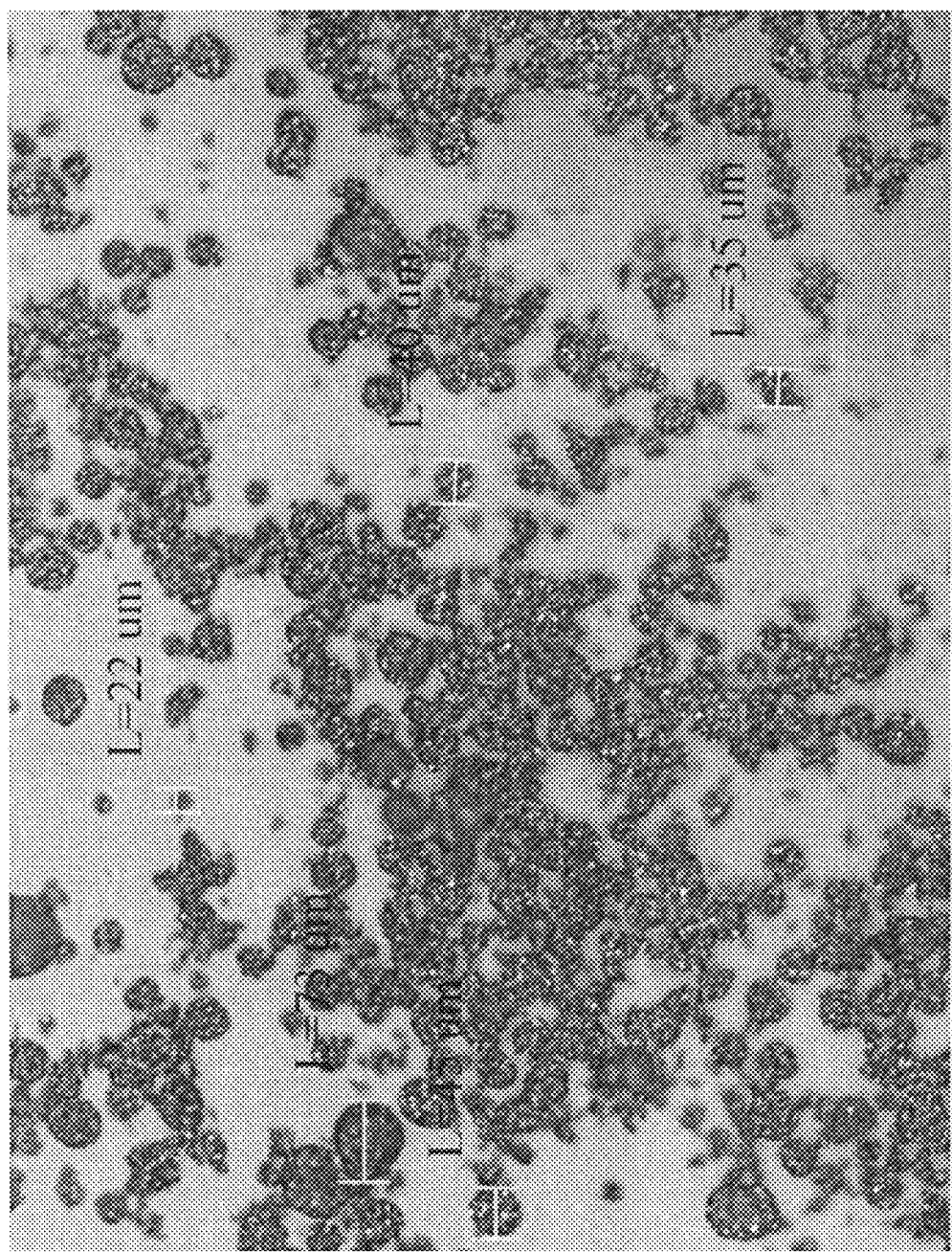

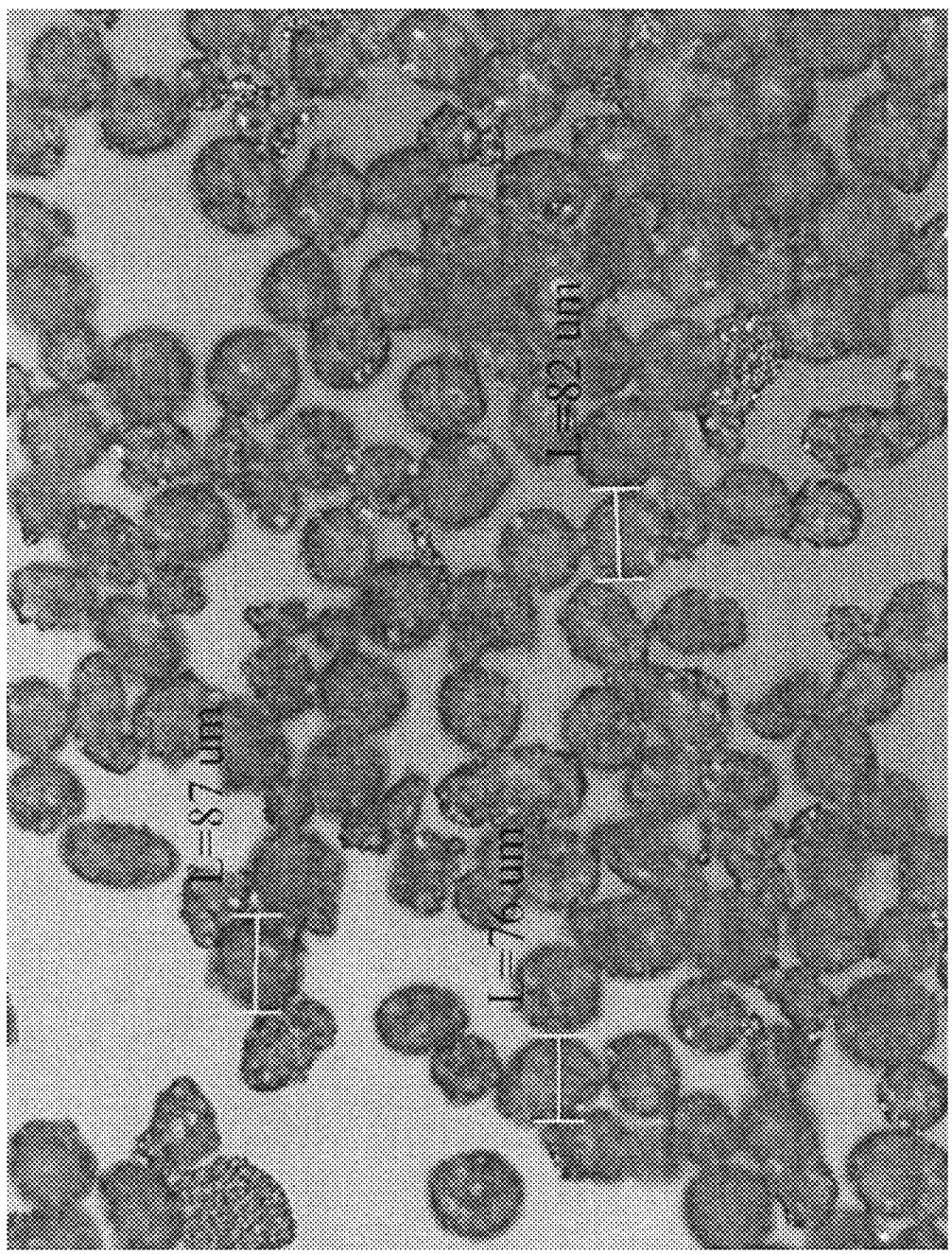

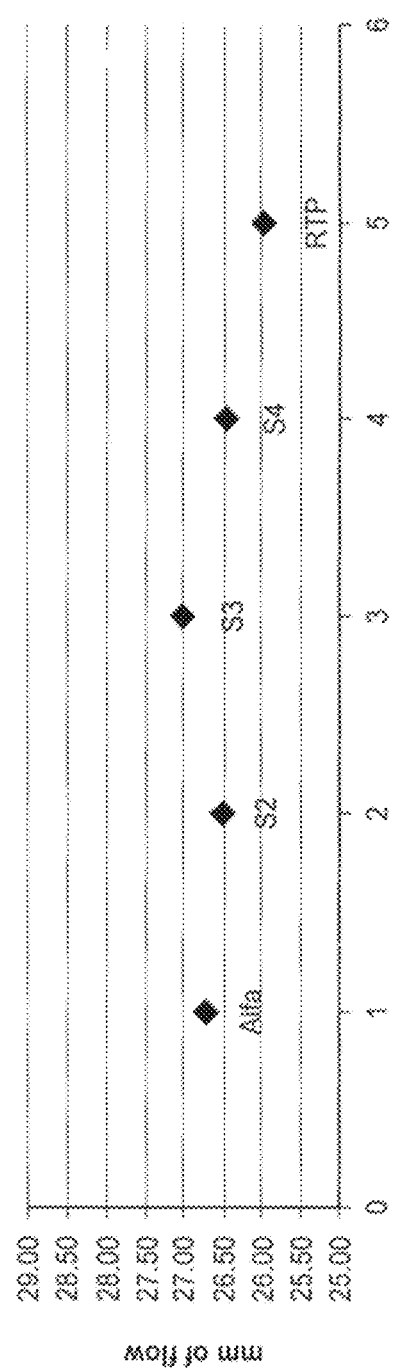

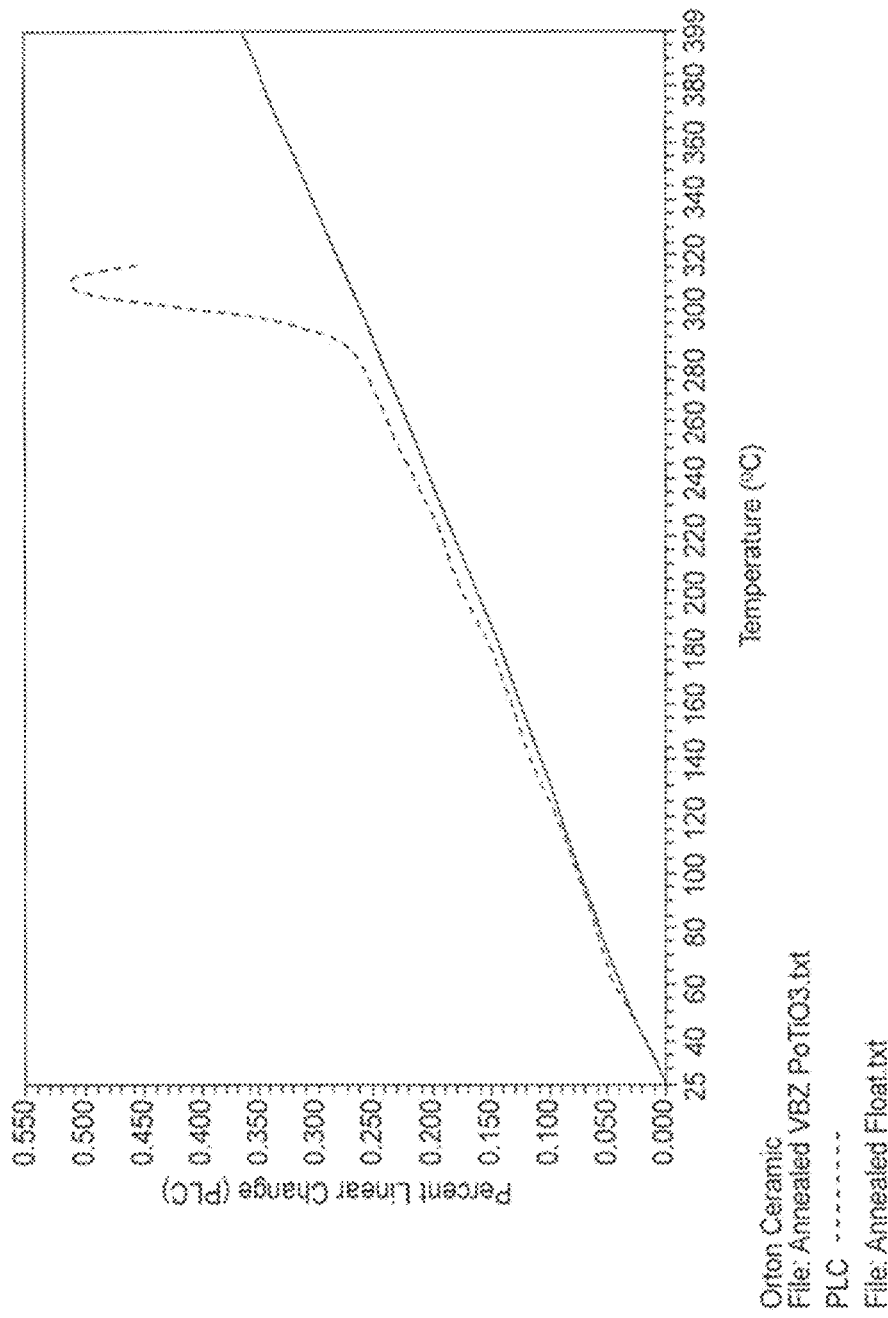

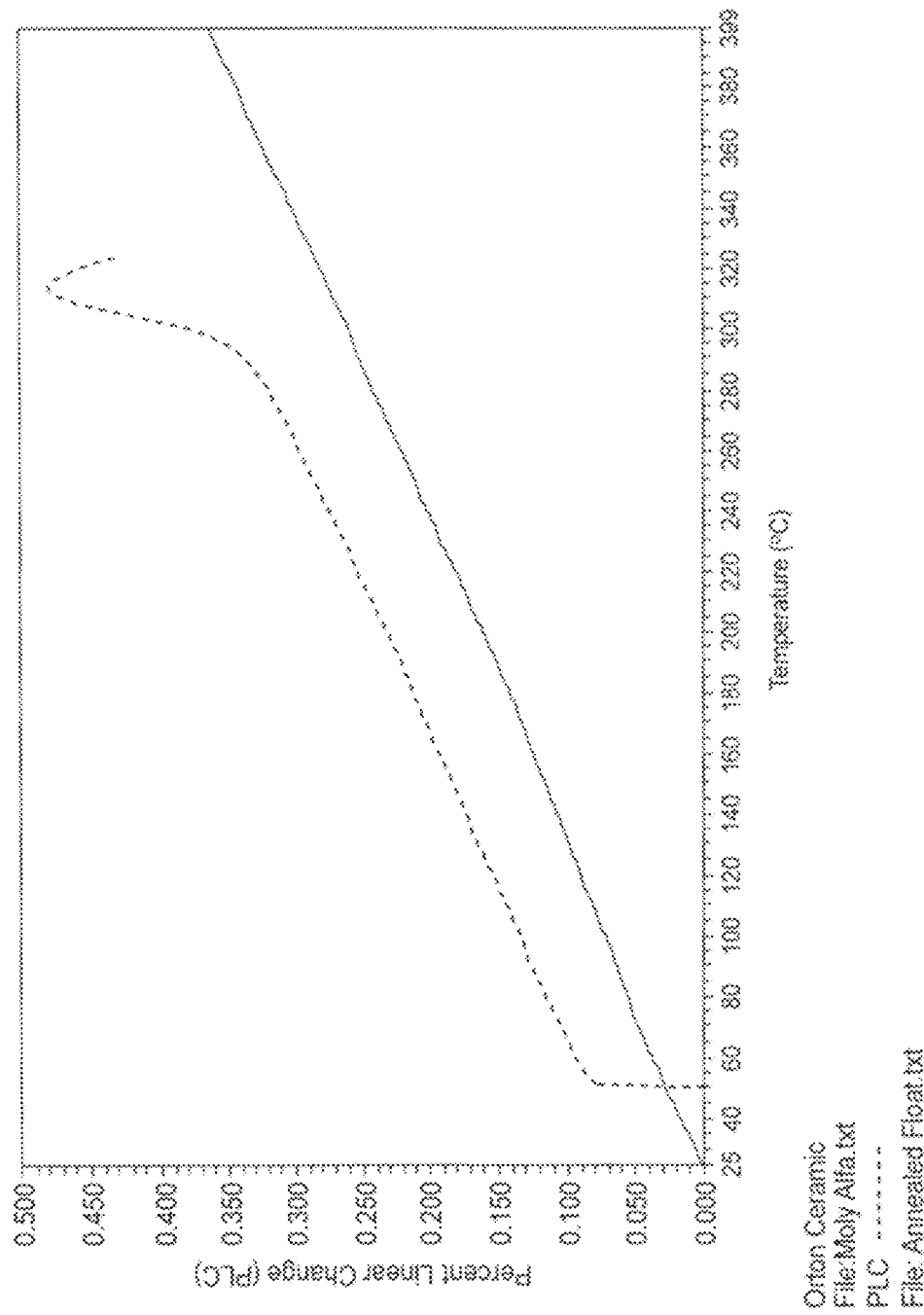

US 11,028,009 B2

COEFFICIENT OF THERMAL EXPANSION FILLER FOR VANADIUM-BASED FRIT MATERIALS AND/OR METHODS OF MAKING AND/OR USING THE SAME

CROSS REFERENCE TO RELATED APPLICATION

This application is continuation of U.S. application Ser. No. 15/242,861, which is a divisional of U.S. application Ser. No. 13/480,987, filed May 25, 2012 (now U.S. Pat. No. 9,458,052), which is a continuation-in-part of U.S. application Ser. No. 13/354,963, filed Jan. 20, 2012 (now U.S. Pat. No. 9,359,247), which is a continuation-in-part of U.S. application Ser. No. 13/339,463, filed Dec. 29, 2011 (now U.S. Pat. No. 9,309,146), which is a continuation-in-part of U.S. application Ser. No. 13/238,358, filed Sep. 21, 2011 (now U.S. Pat. No. 9,290,408), which is a continuation-in-part of U.S. application Ser. No. 12/929,875, filed Feb. 22, 2011 (now U.S. Pat. No. 8,802,203), the entire contents of which are each hereby incorporated herein by reference.

FIELD OF THE INVENTION

Certain example embodiments of this invention relate to coefficient of thermal expansion (CTE) fillers for glass frit materials. More particularly, certain example embodiments relate to fillers that are usable with vanadium-based frit materials. In certain example embodiments the fillers and frit materials may be used for glass articles (e.g., for use in vacuum insulated glass or VIG units), and/or methods of making the same, as well as articles including such frit materials and fillers and/or methods of making the same. In certain example embodiments, frits with CTE filler(s) are used in connection with vacuum insulated glass (VIG) units, and/or a method is provided for sealing VIG units with the frits/seals. In certain example embodiments, material(s) in certain forms and/or particle sizes of a CTE filler may be used.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 there between. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution there between. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

The composition of conventional edge seals are known in the art. See, for example, U.S. Pat. Nos. 3,837,866; 4,256, 495; 4,743,302; 5,051,381; 5,188,990; 5,336,644; 5,534, 469; 7,425,518, and U.S. Publication No. 2005/0233885, the disclosures of which are all hereby incorporated herein by reference.

Unfortunately, the aforesaid high temperatures and long heating times of the entire assembly utilized in the formulation of edge seal 4 are undesirable. This is especially the case when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength may be undesirable.

As seen in FIGS. 3-4, the percentage of remaining tempering strength varies based on the temperature that is exposed to the tempered glass. For example, at 900° F. only about 20% of the original temper strength remains. When the temperature that the sheet is exposed to is reduced to 800° F., about 428° C., the amount of strength remaining is about 70%. Finally, a reduction in temperature to about 600° F., about 315° C., results in about 95% of the original temper strength of the sheet remaining. As will be appreciated, it is desirable to reduce any temper strength losses as a result of exposing a tempered sheet of glass to high temperatures.

As noted above, the creation of VIG units includes the creation of a hermetic seal that can withstand the pressure applied from the vacuum created on inside of the unit. As also discussed above, the creation of the seal may conventionally involve temperatures of at or above 500° C. These temperatures are required in order to obtain a high enough temperature in order for the frit material used for the seal to melt and form the required seal for the VIG units. As shown above, such a temperature can result in a strength reduction for VIG units using tempered glass.

One conventional solution to sealing glass substrates together is to use an epoxy. However, in the case of VIG units, epoxy compositions may be insufficient to hold a seal on a vacuum. Furthermore, epoxies may be susceptible to environmental factors that may further reduce their effectiveness when applied to VIG units.

Another conventional solution is to use a frit solution that contains lead. As is known, lead has a relatively low melting point. Accordingly, temperatures for sealing the VIG units may not need to be as high for other frit materials, and thus the tempering strength of tempered glass substrates may not be reduced by the same amount required for other frit based materials. However, while lead based frits may resolve the above structural issues, the usage of lead in the frit may create new problems. Specifically, the health consequences to the population for products that contain lead. Additionally, certain countries (e.g., in the European Union) may impose strict requirements on the amount of lead that can be contained in a given product. Indeed, some countries (or customers) may require products that are completely lead-free.

As is known in the art, when a frit or sealing material is disposed onto a substrate, the coefficient of thermal expansion (CTE) of the sealing material may be different than that of the underlying substrate. This may create a CTE mismatch between the two materials. In such situations, as the temperature of the underlying substrate and the sealing material increases/decreases, the materials may respectively expand/shrink at different rates. This may cause structural problems in a product in which the sealing material is disposed (e.g., bound or adhered) against a substrate. For example, the sealing material may end up delaminating from the underlying substrate and causing the product to fail (e.g., as the VIG loses vacuum). As such failure is undesirable, a CTE filler may be added to the sealing material to adjust its expansion rate to bring it closer to (or match) that of the underlying substrate.

For certain applications (e.g., a given frit/substrate combination), an appropriate CTE filler may be known and may simply be added to the frit to obtain a CTE match. However, certain types of frits/glass articles may not have known or acceptable CTE fillers (e.g., a known CTE filler may contain lead above a certain amount), thus making it generally unsuitable for some markets and/or non-compliant with certain standards. Accordingly, it will be appreciated that CTE fillers for certain types of frit material, for example, a vanadium based frit material, may be desirable.

It will also be appreciated that techniques for creating improved seals for glass articles are continuously sought after.

Furthermore, frit materials may sometimes include binder agents that are used to, for example, facilitate binding the various materials that make up the frit. However, in certain instances the materials used in a frit may have a melting temperature that is less than a burn out point for a binder that is used in the frit. In such situations, the incomplete burn off of a binder may result in a porous frit seal, reduced frit to glass bonding due to, for example, carbon contamination in the frit, or other characteristics that may be undesirable for frit based seals.

Accordingly, it will be appreciated that there exists a need in the art for binders, solvents, CTE fillers, etc., that may be used with frit materials, e.g., with frit materials that have a relatively reduced melting point such as vanadium based frits (e.g., VBZ frits).

It also will be appreciated that there exists a need in the art for improved seals and the like that can be integrated with tempered glass units, such as, for example, VIG units. The seals may be designed to allow for reduced temperature sealing such that annealed or tempered glass can be sealed without detrimental impact on the properties of the glass.

In certain example embodiments, a frit material may provide glass to frit bonding sufficient for VIG purposes (e.g., in terms of structural strength). In certain example embodiments, the provided frit may provide proper glass wetting properties. In certain example embodiments, the frit may seal and have structural strength and a homogenous glassy structure to provide an adequate barrier to prevent vacuum degradation in example VIG units over a period of time.

In certain instances, improvements in melt flow may enable improved frit matching to glass expansion and/or increase process tolerances to frit bead variations. Improved wetting and bonding properties of a frit material may increase VIG yield by reducing bonding failures of the frit to the glass. A reduction in crystallization may additionally or alternatively facilitate a selected composition to meeting different heating environments (e.g., an internal seal, an external seal, etc).

In certain example embodiments, a method of making a vacuum insulated glass (VIG) unit is provided. First and second glass substrates are provided in substantially parallel, spaced apart relation to one another, with a gap being defined between the first and second substrates. A material is disposed proximate to the first and/or second glass substrates, with the material comprising at least a frit material and a coefficient of thermal expansion (CTE) material. Energy is applied to the material so as to melt the material at a melting temperature. The CTE material comprises elements that are substantially spherical in form, and said elements are between about 60 and 100 microns in size. The frit material is formed from a base composition includes ~45-50% (Normalized Mole %) vanadium oxide, ~20-23% (Normalized Mole %) barium oxide, and ~19-22% (Normalized Mole %) zinc oxide.

In certain example embodiments, a material is provided. A coefficient of thermal expansion (CTE) material is substantially lead-free. A frit material has a composition that includes: ~45-50% (Normalized Mole %) vanadium oxide, ~20-23% (Normalized Mole %) barium oxide and ~19-22% (Normalized Mole %) zinc oxide. The material has a first CTE value that is within about 15% of soda lime silicate glass by virtue of the CTE material's composition.

In certain example embodiments, a vacuum insulted glass (VIG) unit is provided. First and second substantially parallel, spaced apart glass substrates are provided. An edge seal is provided around a periphery of the first and/or second substrates to form a hermetic seal therebetween and at least partially defines a gap between the first and second substrates. The gap is provided at a pressure less than atmospheric. The edge seal is formed from the material, at least initially, according to the techniques disclosed herein, e.g., so as to include vanadium, barium, and zinc, as well as at least 4 additives, and a CTE matching material.

In certain example embodiments, a method of making a material is provided. A composition is provided to a holder, the composition comprising ~45-50% (Normalized Mole %) vanadium oxide, ~20-23% (Normalized Mole %) barium oxide, and ~19-22% (Normalized Mole %) zinc oxide. The composition is melted. The melted composition is cooled and/or allowed to cool so as to form an intermediate article. A base frit material is creating from the intermediate article. The base frit material is combined with a CTE filler material that is comprised of particles that are 150-170 mesh and substantially spherical in shape.

In certain example embodiments, a method of bonding a frit material to a glass substrate is provided. The frit material is combined with a CTE material to form a combined material. The combined material is disposed on the substrate. The combined material is heated to a temperature of less than about 400 degrees C. A coefficient thermal expansion associated with the combined material is within 10% of a coefficient of thermal expansion for the glass substrate when heat is applied to the combined material. The frit material includes a composition comprising: ~45-50% (Normalized Mole %) vanadium oxide, ~20-23% (Normalized Mole %) barium oxide and ~19-22% (Normalized Mole %) zinc oxide.

In certain example embodiments, a CTE material comprises a first element group and a second element group, wherein the first element group includes elements that are between 40 and 100 microns in size and the second element group includes elements that are between 80 and 200 microns in size.

In certain example embodiments, the first element group is lower, by weight, than the second element group. The first element group may comprise between 25 to 45 percent of a CTE filler. In certain instances, the percentage may be about 35 percent. In certain example embodiments, the CTE filler may be between 25 and 40 percent of the total weight of the material that includes the frit material. In certain instances, the CTE filler may be about 32 percent of the weight.

In certain example embodiments, a material includes a CTE filler wherein the CTE material comprises a first group of particles and a second group of particles, where the first group of particles includes a majority of elements (e.g., by weight or size) that are between 60 and 100 microns and the second group of particles includes a majority of elements (e.g., by weight or size) that are between 80 and 160 microns.

The features, aspects, advantages, and example embodiments described herein may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a cross-sectional view of a conventional vacuum IG unit;

FIG. 2 is a top plan view of the bottom substrate, edge seal, and spacers of the FIG. 1 vacuum IG unit taken along the section line illustrated in FIG. 1;

FIG. 5 is cross-sectional view of a vacuum insulated glass unit according to certain example embodiments;

FIG. 6 is a flowchart illustrating a process for making a vacuum insulated glass unit with a frit material according to certain example embodiments;

FIGS. 7A-7D are graphs summarizing properties of compositions according to certain example embodiments;

FIGS. 8A-8C are graphs summarizing the quality of compositions according to certain exemplary embodiments;

FIG. 9 is a graph showing results when additional elements are added to compositions according to certain example embodiments;

FIGS. 12A-12C are graphs summarizing flow characteristics of example frit materials according to certain example embodiments;

FIG. 13 is a graph showing thermogravimetric analysis of certain example binding agents;

FIGS. 15A and 15B respectively show another heating profile graph and the example frit materials melted according to the heating profile;

FIGS. 23A-23C show microscope images of example particles of certain example CTE fillers;

FIGS. 26A-26F are microscope images of example particles of certain example CTE fillers;

FIG. 27 is a graph with flow properties of certain example particle types;

FIGS. 30A-30C are graphs that illustrate CTE values for example frit materials that include example CTE fillers.

DETAILED DESCRIPTION OF EXAMPLE EMBODIMENTS OF THE INVENTION

Figure 3:
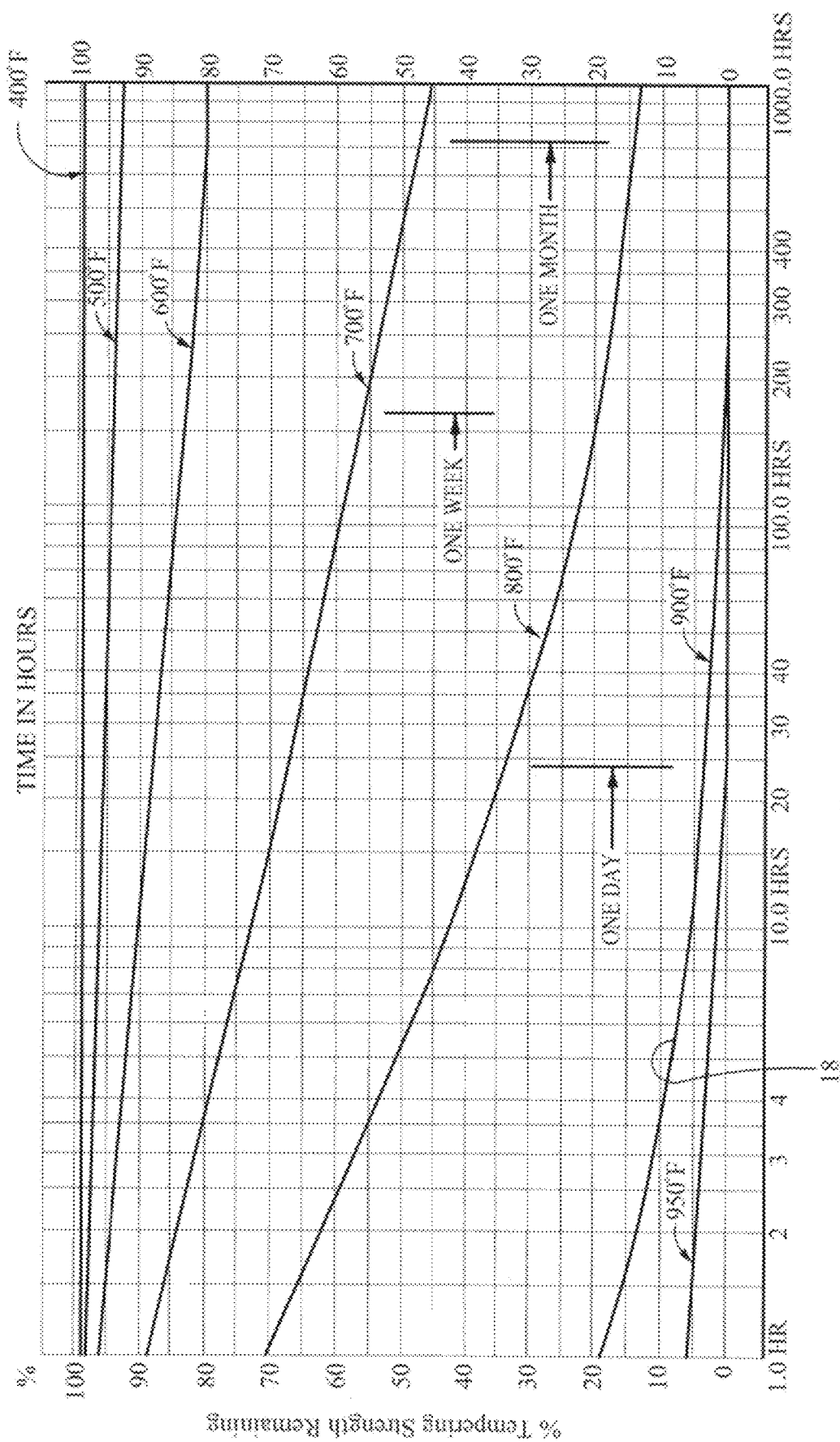
FIG. 3 is a graph correlating time (hours) versus percent tempering strength remaining, illustrating the loss of original temper strength for a thermally tempered sheet of glass after exposure to different temperatures for different periods of time.

The following description is provided in relation to several example embodiments which may share common characteristics, features, etc. It is to be understood that one or more features of any one embodiment may be combinable with one or more features of other embodiments. In addition, single features or a combination of features may constitute an additional embodiment(s).

Certain example embodiments may relate to glass units (e.g., VIG units) that include two glass substrates sealed with an improved seal, e.g., of or including a vanadium-based frit material. In certain example embodiments an improved seal may include the following materials: vanadium oxide, barium oxide, and zinc oxide. In addition, certain example embodiments may include one or more of the following compounds: $Ta_2O_5$, $Ti_2O_3$, $SrCl_2$, $GeO_2$, CuO, AgO, $Nb_2O_5$, $B_2O_3$, MgO, $SiO_2$, TeO2, Tl2O3, Y2O3, SnF2, SnO2, CuCl, SnCl2, CeO2, AgCl, In2O3, SnO, SrO, MgO, $MoO_3$, $CsCO_3$, $CuCl_2$, and $Al_2O_3$.

FIG. 5 is cross-sectional view of a vacuum insulated glass unit according to certain example embodiments. VIG unit 500 may include first and second glass substrates 502a and 502b that are spaced apart and define a space therebetween. The glass substrates 502a and 502b may be connected via an improved seal 504, of or including a vanadium-based frit. Support pillars 506 may help maintain the first and second substrates 502a and 502b in substantially parallel spaced apart relation to one another. It will be appreciated that the CTE of the improved seal 504 and the glass substrates 502a and 502b may substantially match one another. This may be advantageous in terms of reducing the likelihood of the glass cracking, etc. Although FIG. 5 is described in relation to a VIG unit, it will be appreciated that the improved seal 504, of or including a vanadium-based frit may be used in connection with other articles and/or arrangements including, for example, insulating glass (IG) units and/or other articles.

FIG. 6 is a flowchart illustrating a process for preparing a frit material to be used in making a vacuum insulated glass unit according to certain example embodiments. In step 600, base compounds are combined and disposed into an appropriate container (e.g., a heat resistant container such as, for example, a ceramic container). In step 602, the combined compound is melted. Preferably, the temperature to melt the combined material may be at least 1000° C. In certain exemplary embodiments, the combined compound is melted at 1000° C. for between 30 to 60 minutes. In certain exemplary embodiments, the combined compound is melted at 1100° C. for 60 minutes. In certain exemplary embodiments, the combined compound is melted at 1200° C. for 60 minutes. In certain exemplary embodiments, the melting temperature is a cycle that includes 500° C. for 15 minutes, 550° C. for 15 minutes, 600° C. for 15 minutes, and a ramp up to 1000° C. for 60 minutes.

After the combined compounds are melted, the material may be cooled in step 604, e.g., to form a glass sheet. After cooling, the glass may be crushed or ground into fine particulates in step 606. In certain example embodiments, the size of the particulates may be no larger than about 100 mesh. Once the glass is ground into a powder, it may be disposed between the substrates in step 608. In certain example embodiments, the powder may be dispensed as a paste with a binder. Additional details on binding and/or solvent agents that may be used in certain example embodiments are provided in greater detail below. Heat may then be applied in step 610 to the glass substrate and the powder. In certain example embodiments, the heat may be between 300° C. and 400° C., or more preferably between 325° C. and 375° C. It will be appreciated that when heat of the above temperatures is applied to tempered glass that the tempered glass may lose a reduced amount of strength versus when heat of in excess of 350° C. is applied to the tempered glass. Thus, certain example embodiments preferably involve a frit melting temperature of less than 500° C., more preferably less than 425° C., and sometimes less than 350° C.

In certain example embodiments, the combined compounds include the following materials: vanadium oxide, barium oxide, and zinc oxide.

FIGS. 7A-7D show graphs summarizing properties of compositions according to certain example embodiments.

The table below corresponds to the data shown in FIG. 7A with those compositions with a melt quality of less than 4 (on a scale of 0 to 5) omitted from the table.

TABLE 1

| Normalized Moles of Batch Composition | | | | | | | | |
|---|---|---|---|---|---|---|---|---|
| $V_2O_5$ | BaO | ZnO | BaO/ZnO | $Bi_2O_3$ | $B_2O_3$ | Tg(C) | Tx1(C) | Rating |
| 43.66% | 9.87% | 46.47% | 0.21 | | | 320 | 410 | 4 |
| 39.01% | 13.25% | 37.37% | .35 | 2.18% | 8.20% | 312 | 430 | 4 |
| 47.33% | 12.96% | 24.41% | 0.53 | 9.95% | 5.53% | 305 | 380 | 4 |
| 50.24% | 23.38% | 21.39% | 1.33 | | | 320 | 425 | 4 |
| 51.54% | 26.26% | 16.46% | 1.60 | 5.75% | | 320 | 410 | 4.5 |

Figure 7A:
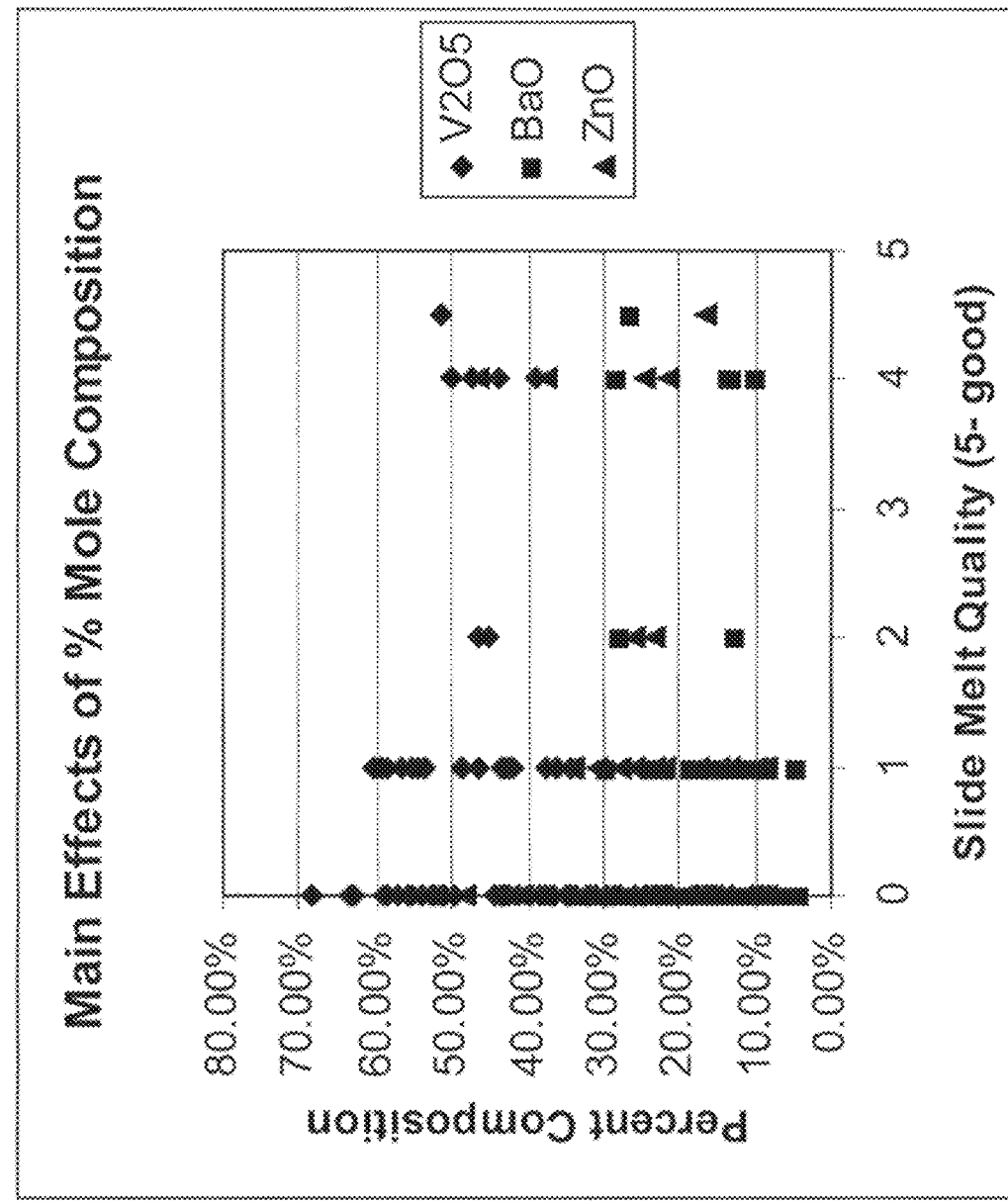
Figure 7B:
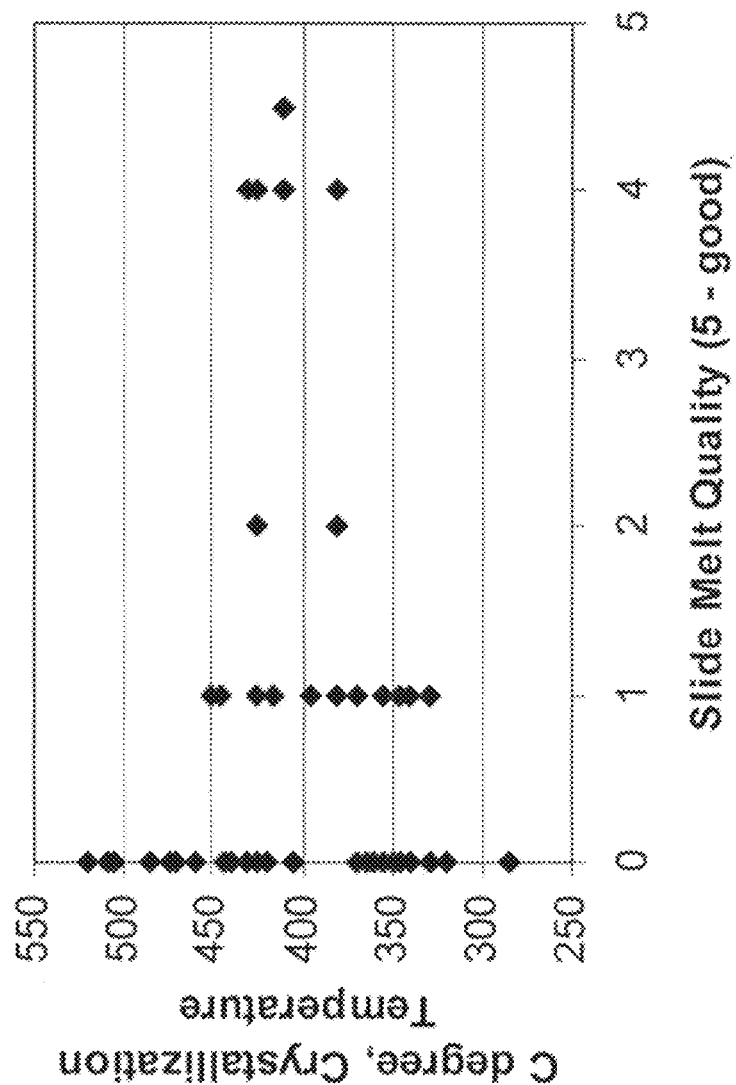

The melts shown in FIG. 7A were applied to a microscope glass slide with a temperature of 375° C. applied for 15 minutes. FIG. 7B shows a graph that includes the crystallization temperature (first crystallization peak—Tx1—of the above table) of the above melts. According to certain exemplary embodiments, a preferred temperature for Tx1 may be between about 375° C. and 425° C., preferably about 400° C.

FIG. 7C shows the transition glass temperatures, Tg, compared the above melts. The graph showing exemplary data shows that Tg values between about 290 C and 335 C may be preferred for the above compositions.

FIG. 7D includes the above melts in a graph showing the melt quality versus the barium/zinc ratio.

Figure 8A:
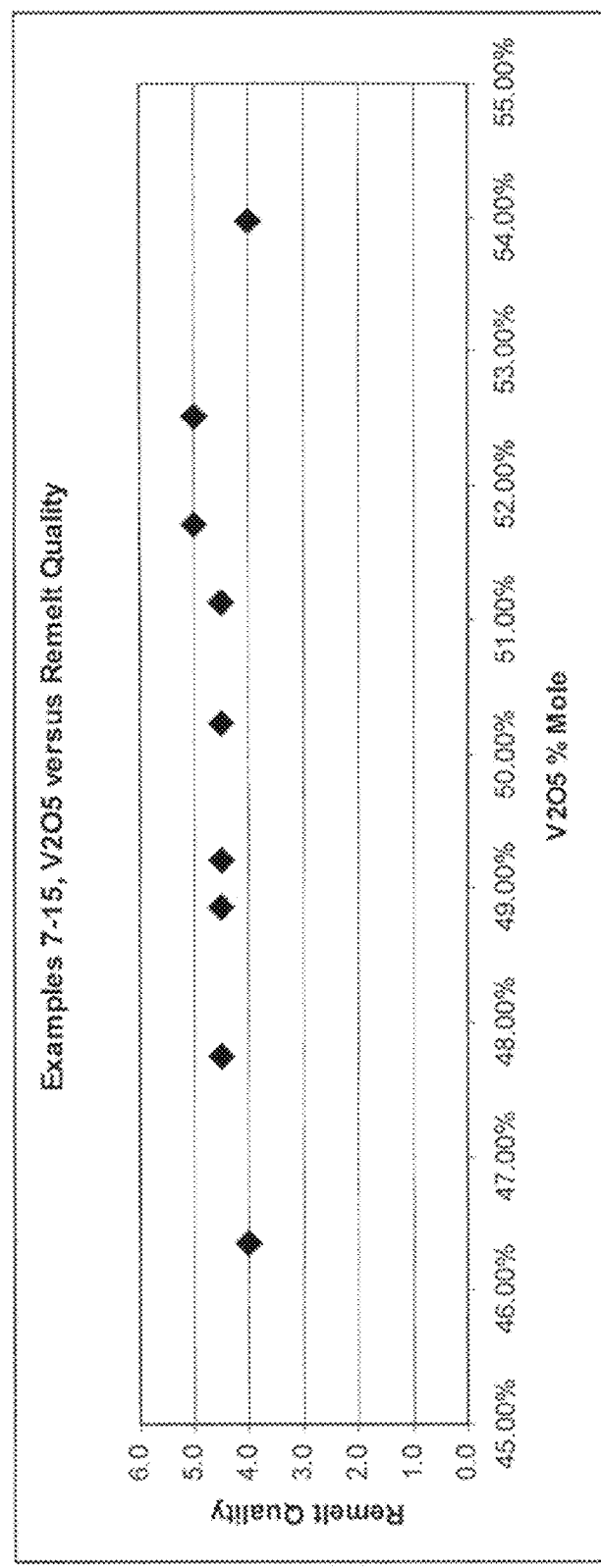
Figure 8B:
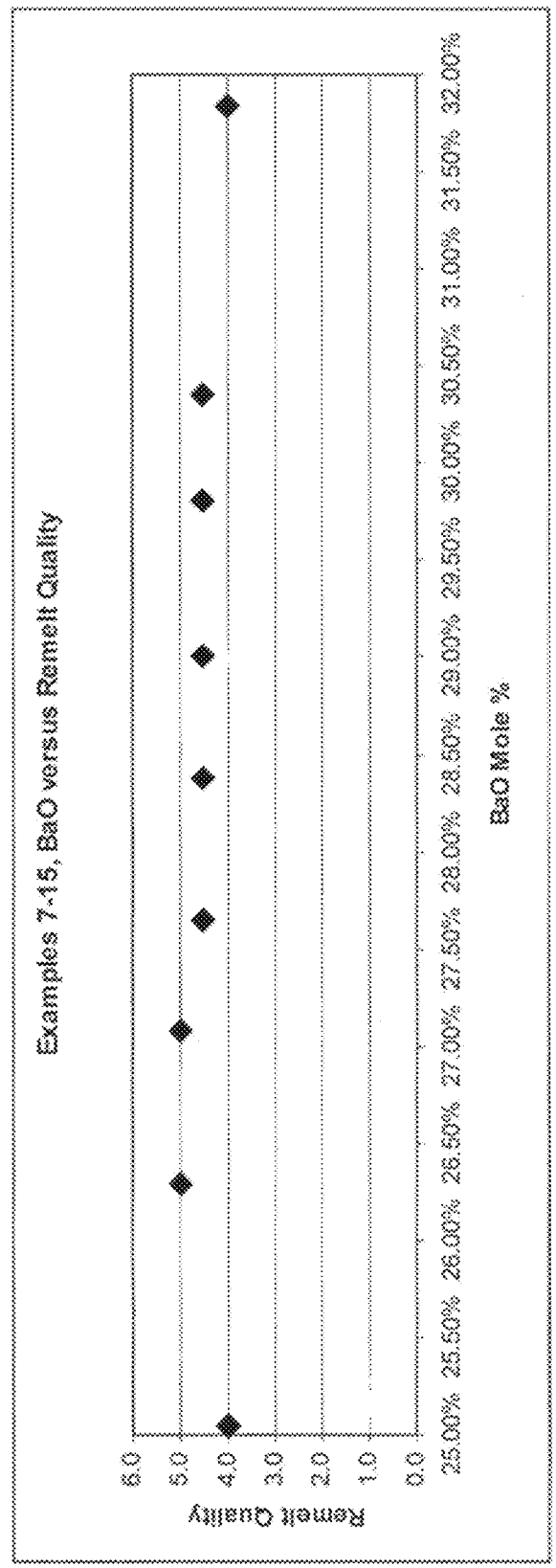

FIGS. 8A-8C show graphs that summarize the quality of compositions according to certain exemplary embodiments. FIG. 8A summarizes the $V_2O_5$ percentage used in certain exemplary compositions. FIG. 8B summarizes the BaO percentage used in certain exemplary compositions. FIG. 8C summarizes the ZnO percentage used in certain exemplary compositions. As shown in the illustrative graphs, a vanadium percentage of between about 51% and 53% may be preferable according to certain example embodiments.

Below, tables 2A-2C show exemplary compositions according to certain example embodiments. Additionally, examples 7-15 in the tables correspond to graphs 8A-8C. For the compositions shown in the below tables, $BaCO_3$ factor of 1.287027979 was used to convert to a BaO resulting compound.

TABLE 2A

| | Weight Percentage | | | Weight | Weights of Batch Composition for 25 grams | | | Normalized Weight Percentage | | |
|---|---|---|---|---|---|---|---|---|---|---|
| Ex. | V$_2$O$_5$ | BaO | ZnO | Normal | V$_2$O$_5$ | BaO | ZnO | V$_2$O$_5$ | BaO | ZnO |
| 1 | 60 | 30 | 10 | 0.23 | 13.800 | 8.880 | 2.300 | 55.24 | 35.55 | 9.21 |
| 2 | 52.5 | 25 | 10 | 0.27 | 14.175 | 8.687 | 2.700 | 55.45 | 33.99 | 10.56 |
| 3 | 45 | 20 | 10 | 0.31 | 13.950 | 7.980 | 3.100 | 55.73 | 31.88 | 12.39 |
| 4 | 45 | 10 | 20 | 0.32 | 14.400 | 4.118 | 6.400 | 57.79 | 16.53 | 25.68 |
| 5 | 52.5 | 10 | 25 | 0.28 | 14.700 | 3.604 | 7.000 | 58.09 | 14.24 | 27.66 |
| 6 | 60 | 10 | 30 | 0.25 | 15.000 | 3.218 | 7.500 | 58.33 | 12.51 | 29.16 |
| 7 | 52.5 | 25 | 10 | 0.24 | 12.600 | 7.722 | 2.400 | 55.45 | 33.99 | 10.56 |
| 8 | 57.5 | 25 | 10 | 0.25 | 14.375 | 8.044 | 2.500 | 57.69 | 32.28 | 10.03 |
| 9 | 47.5 | 25 | 10 | 0.28 | 13.300 | 9.009 | 2.800 | 52.97 | 35.88 | 11.15 |
| 10 | 52.5 | 27.5 | 10 | 0.26 | 13.650 | 9.202 | 2.600 | 53.63 | 36.15 | 10.22 |
| 11 | 57.5 | 27.5 | 10 | 0.25 | 14.375 | 8.848 | 2.500 | 55.88 | 34.40 | 9.72 |
| 12 | 47.5 | 27.5 | 10 | 0.27 | 12.825 | 9.556 | 2.700 | 51.13 | 38.10 | 10.77 |
| 13 | 52.5 | 22.5 | 10 | 0.28 | 14.700 | 8.108 | 2.800 | 57.40 | 31.66 | 10.93 |
| 14 | 57.5 | 22.5 | 10 | 0.26 | 14.950 | 7.529 | 2.600 | 59.61 | 30.02 | 10.37 |
| 15 | 47.5 | 22.5 | 10 | 0.29 | 13.775 | 8.398 | 2.900 | 54.94 | 33.49 | 11.57 |

TABLE 2B

| | Moles of Batch | | | Normalized Moles | | | |
|---|---|---|---|---|---|---|---|
| Ex. | V$_2$O$_5$ | BaO | ZnO | V$_2$O$_5$ | BaO | ZnO | Glass Type |
| 1 | 0.3037 | 0.1801 | 0.1132 | 50.87% | 30.17% | 18.95% | amorphous |
| 2 | 0.3049 | 0.1722 | 0.1298 | 50.24% | 28.38% | 21.39% | glassy |
| 3 | 0.3064 | 0.1616 | 0.1522 | 49.41% | 26.05% | 24.54% | amorphous |
| 4 | 0.3177 | 0.0838 | 0.3156 | 44.31% | 11.68% | 44.01% | amorphous |
| 5 | 0.3194 | 0.0722 | 0.3400 | 43.66% | 9.87% | 46.47% | amorphous |
| 6 | 0.3207 | 0.0634 | 0.3584 | 43.19% | 8.54% | 48.27% | amorphous |
| 7 | 0.3049 | 0.1722 | 0.1298 | 50.24% | 28.38% | 21.39% | glassy |
| 8 | 0.3172 | 0.1636 | 0.1233 | 52.51% | 27.08% | 20.41% | glassy |
| 9 | 0.2912 | 0.1818 | 0.1370 | 47.74% | 29.80% | 22.46% | glassy |
| 10 | 0.2949 | 0.1832 | 0.1255 | 48.85% | 30.35% | 20.80% | glassy |
| 11 | 0.3073 | 0.1743 | 0.1194 | 51.12% | 29.00% | 19.87% | glassy |
| 12 | 0.2811 | 0.1931 | 0.1323 | 46.35% | 31.83% | 21.81% | glassy |
| 13 | 0.3156 | 0.1604 | 0.1344 | 51.70% | 26.28% | 22.01% | glassy |
| 14 | 0.3278 | 0.1521 | 0.1274 | 53.97% | 25.05% | 20.98% | glassy |
| 15 | 0.3021 | 0.1697 | 0.1421 | 49.20% | 27.65% | 23.15% | glassy |

The rating shown in Table 2C is based off of deposing the ground composition on a microscope glass slide and heating the composition at about 375° C. for between 10 and 30 minutes.

TABLE 2C

| Example | Tg (C°) | Tx2 (C°) | Tx2 (C°) | Tx1 − Tg | Rating |
|---|---|---|---|---|---|
| 1 | 280 | 330 | 540 | 50 | 0.0 |
| 2 | 320 | 425 | 525 | 105 | 4.0 |
| 3 | 280 | 430 | 550 | 150 | 0.0 |
| 4 | 280 | 320 | 365 | 40 | 0.0 |
| 5 | 320 | 410 | 560 | 90 | 4.0 |
| 6 | 285 | 425 | 560 | 140 | 0.0 |
| 7 | 315 | 390 | 530 | 75 | 4.5 |
| 8 | 295, 325 | 415 | 535 | 90 | 5.0 |
| 9 | 320 | 420 | 525 | 100 | 4.5 |
| 10 | 325 | 410 | 540 | 85 | 4.5 |
| 11 | 315 | 395 | 530 | 80 | 4.5 |
| 12 | 330 | 415 | 560 | 85 | 4.0 |
| 13 | 315 | 400 | 530 | 85 | 5.0 |
| 14 | 305 | 395 | 530 | 90 | 4.0 |
| 15 | 320 | 395 | 525 | 75 | 4.5 |

FIG. 9 shows a graph with results of adding additional elements (e.g., Bi$_2$O$_3$ and 8203) to a vanadium based frit. Corresponding data shown in FIG. 9 is also displayed below in Table 3.

TABLE 3

| Ex. | V2O5 | BaO | ZnO | Bi2O3 | B2O3 | Tg(C) | Tx1(C) | DSC Responses |
|---|---|---|---|---|---|---|---|---|
| 1 | 65.39% | 14.87% | 12.46% | 0.00% | 7.28% | 320 | 430 | medium weak |
| 2 | 60.96% | 13.86% | 11.61% | 0.00% | 13.57% | 240 | 415 | very weak |
| 3 | 69.71% | 15.85% | 13.28% | 1.16% | 0.00% | 315 | 405 | strong peaks |
| 4 | 64.69% | 14.71% | 12.32% | 1.08% | 7.20% | 325 | 440 | very weak |
| 5 | 68.91% | 15.67% | 13.13% | 2.29% | 0.00% | 320 | 410 | medium weak |
| 6 | 64.00% | 14.56% | 12.19% | 2.13% | 7.12% | 320 | 425 | very weak |

TABLE 3-continued

| Ex. | V2O5 | BaO | ZnO | Bi2O3 | B2O3 | Tg(C) | Tx1(C) | DSC Responses |
|---|---|---|---|---|---|---|---|---|
| 7 | 59.74% | 13.59% | 11.38% | 1.99% | 13.30% | 315 | 410 | very weak |
| 8 | 60.34% | 13.72% | 11.49% | 1.00% | 13.43% | 315 | 400 | very weak |
| 9 | 70.53% | 16.04% | 13.43% | 0.00% | 0.00% | 315 | 380 | strong peaks |

In certain example embodiments, a strong DSC response may correspond to a good remelt quality. In certain example embodiments, the addition of bismuth in concentrations of between about 0% and 3% may result in increased remelt flow quality.

In certain example embodiments, a frit that includes $V_2O_5$, BaO, and ZnO may further include one or more additives. In certain example embodiments, the additives may be between about 0.5% and 15% weight. According to certain example embodiments, the additives may be added to a base composition that includes between about 50% and 60% weight $V_2O_5$, 27% and 33% weight BaO, and 9% and 12% weight ZnO.

Figure 10A:
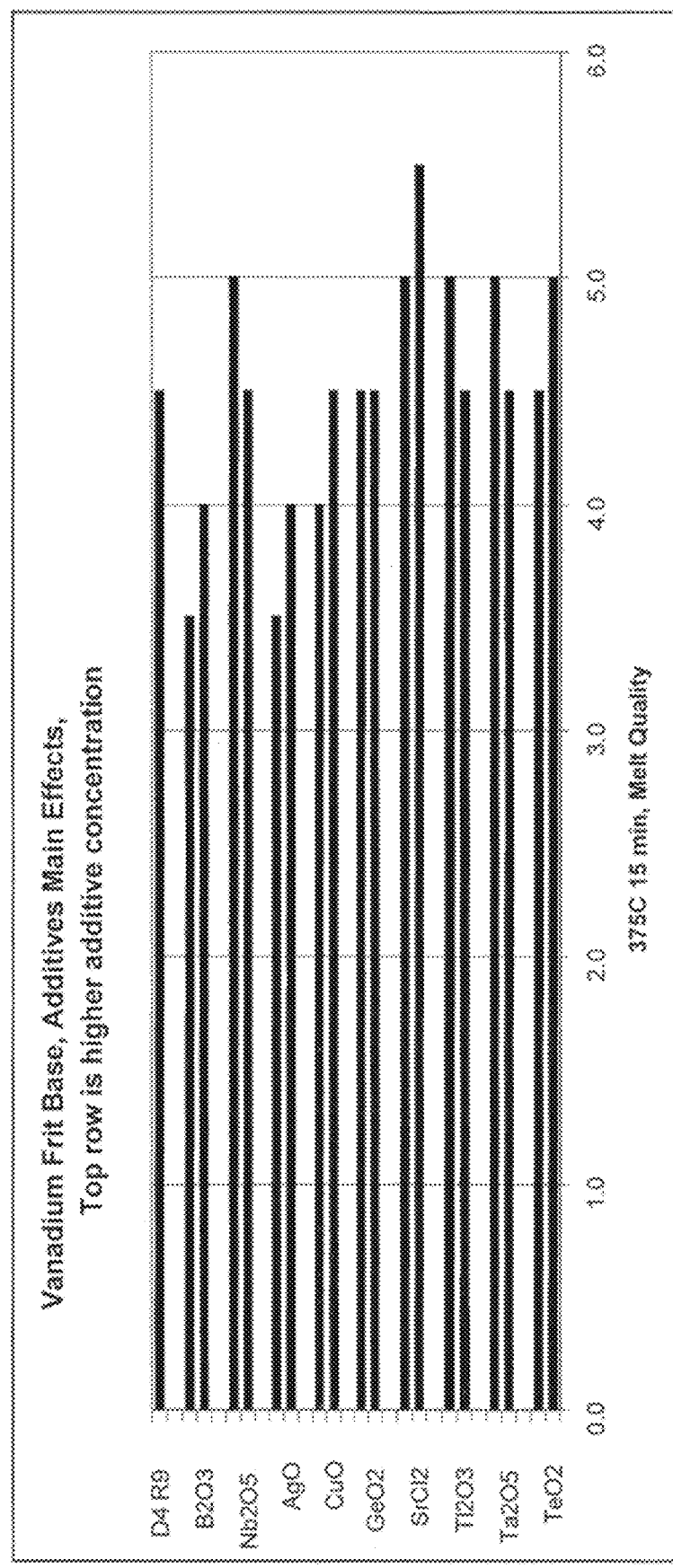
FIGS. 10A-10C show graphs summarizing impacts of additives being added to vanadium based frits according to certain example embodiments.
Figure 10B:
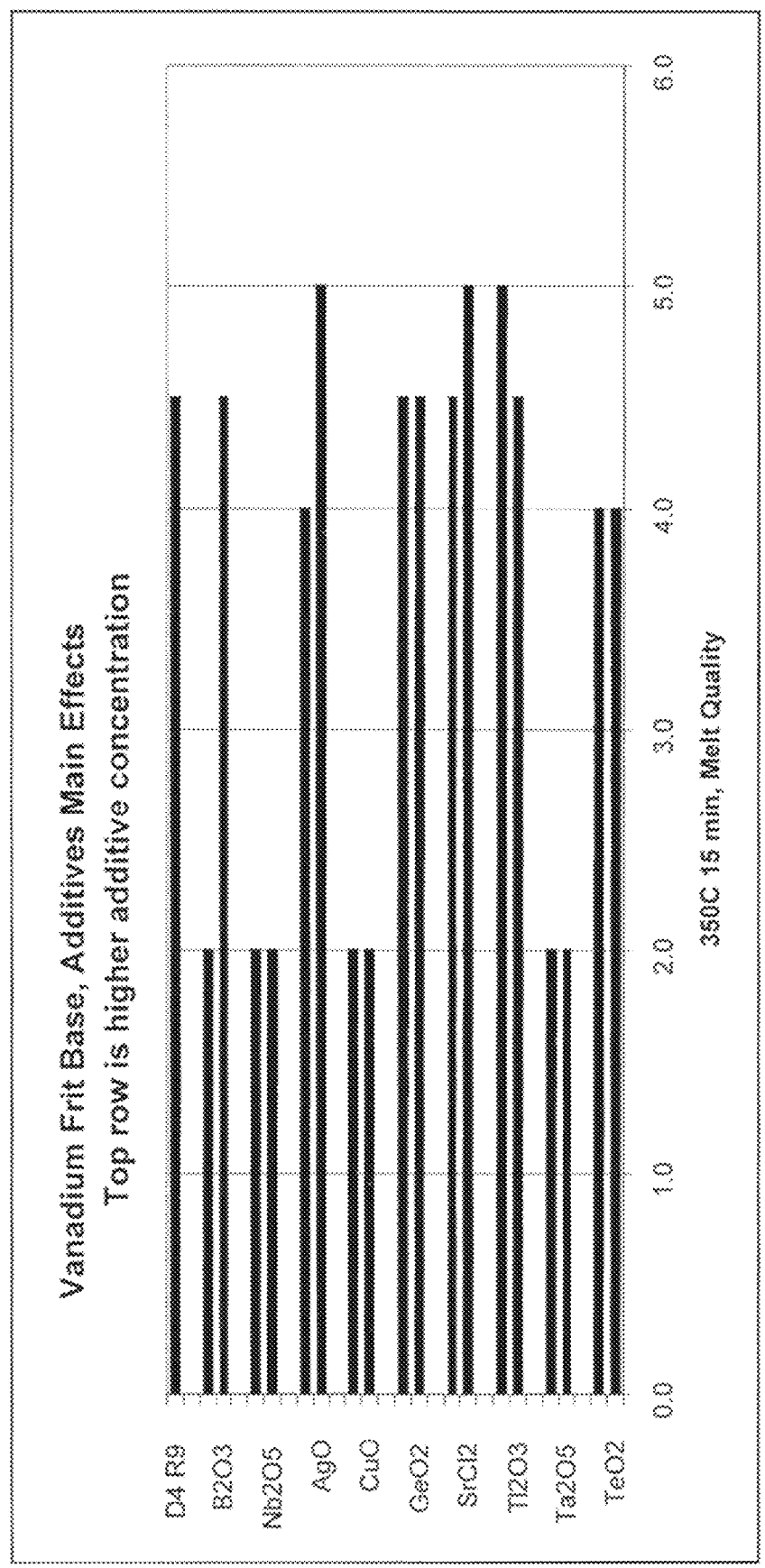
Figure 10C:
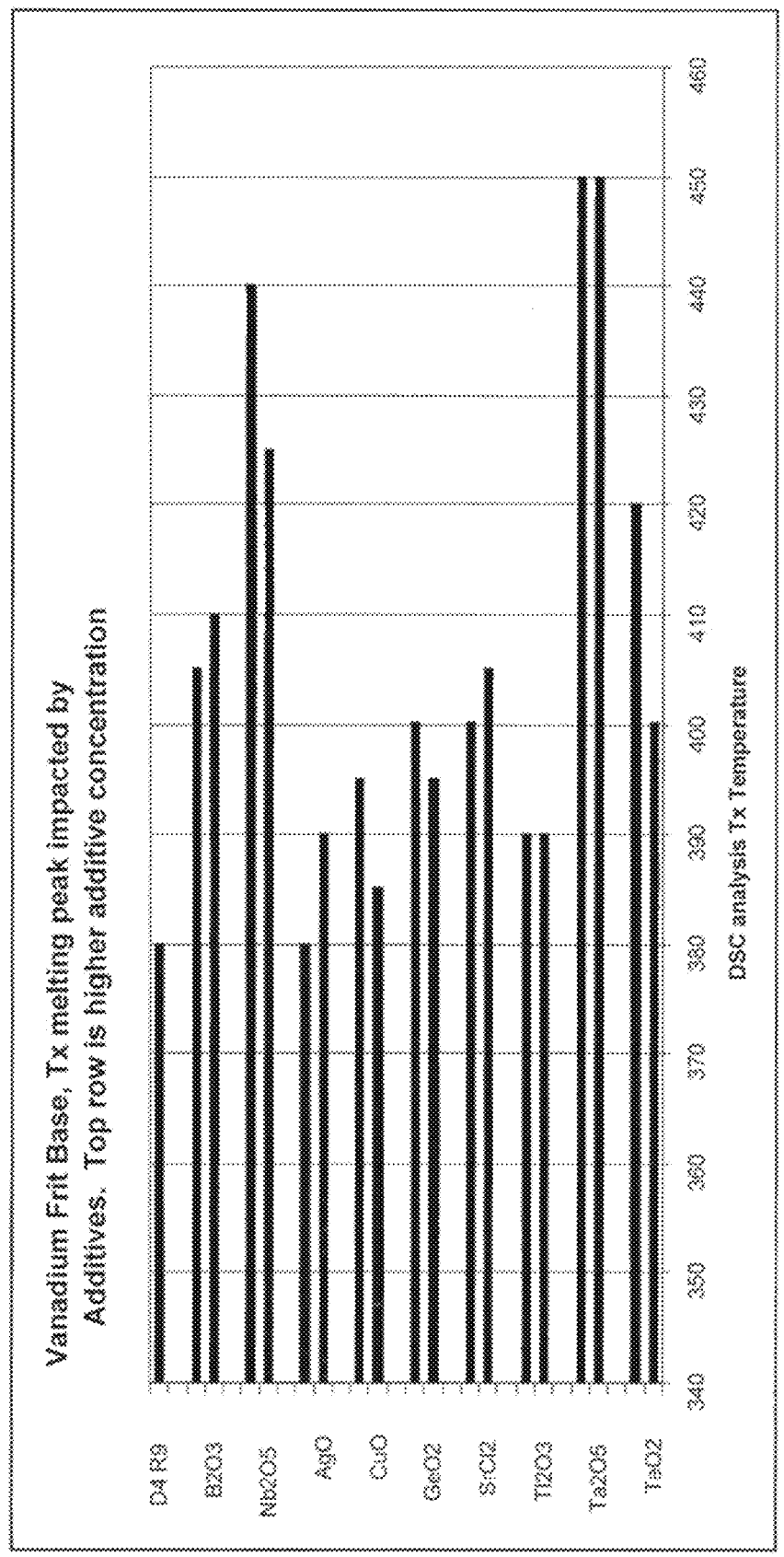

Below, Tables 4A-4D show results of including additives to the base composition of $V_2O_5$, BaO, and ZnO. Table 4D shows the melt quality on a scale of about 0 to 5 for each of the compositions. FIGS. 10A-10C show graphs corresponding to the data shown in the below tables. A $BaCO_3$ factor of 1.2870 was used to form the BaO used for the following examples.

TABLE 4A

| | Weights (gm) | | | Additive | | Normalized Weights | | | |
|---|---|---|---|---|---|---|---|---|---|
| Ex | V2O5 | BaO | ZnO | Type | Amount | V2O5 | BaO | ZnO | Additive |
| 1 | 52.5 | 22.5 | 10 | TeO2 | 2 | 14.175 | 7.819 | 2.700 | 0.540 |
| 2 | 52.5 | 22.5 | 10 | TeO2 | 4 | 13.650 | 7.529 | 2.600 | 1.040 |
| 3 | 52.5 | 22.5 | 10 | Ta2O5 | 5 | 13.650 | 7.529 | 2.600 | 1.300 |
| 4 | 52.5 | 22.5 | 10 | Ta2O5 | 10 | 13.125 | 7.240 | 2.500 | 2.500 |
| 5 | 52.5 | 22.5 | 10 | Ti2O3 | 5 | 13.650 | 7.529 | 2.600 | 1.300 |
| 6 | 52.5 | 22.5 | 10 | Ti2O3 | 10 | 13.125 | 7.240 | 2.500 | 2.500 |
| 7 | 52.5 | 22.5 | 10 | SrCl2 | 2 | 14.175 | 7.819 | 2.700 | 0.540 |
| 8 | 52.5 | 22.5 | 10 | SrCl2 | 4 | 13.650 | 7.529 | 2.600 | 1.040 |
| 9 | 52.5 | 22.5 | 10 | GeO2 | 1 | 14.175 | 7.819 | 2.700 | 0.270 |
| 10 | 52.5 | 22.5 | 10 | GeO2 | 2 | 14.175 | 7.819 | 2.700 | 0.540 |
| 11 | 52.5 | 22.5 | 10 | CuO | 1 | 14.175 | 7.819 | 2.700 | 0.270 |
| 12 | 52.5 | 22.5 | 10 | CuO | 2 | 14.175 | 7.819 | 2.700 | 0.540 |
| 13 | 52.5 | 22.5 | 10 | AgO | 1.5 | 14.175 | 7.819 | 2.700 | 0.405 |
| 14 | 52.5 | 22.5 | 10 | AgO | 3 | 14.175 | 7.819 | 2.700 | 0.810 |
| 15 | 52.5 | 22.5 | 10 | Nb2O5 | 3 | 14.175 | 7.819 | 2.700 | 0.810 |
| 16 | 52.5 | 22.5 | 10 | Nb2O5 | 6 | 13.650 | 7.529 | 2.600 | 1.560 |
| 17 | 52.5 | 22.5 | 10 | B2O3 | .8 | 14.175 | 7.819 | 2.700 | 0.216 |
| 18 | 52.5 | 22.5 | 10 | B2O3 | 1.6 | 14.175 | 7.819 | 2.700 | 0.432 |

TABLE 4B

| | Normalized Weight Percentage | | | | Moles of Batch Composition | | | |
|---|---|---|---|---|---|---|---|---|
| Ex | V2O5 | BaO | ZnO | Additive | V2O5 | BaO | ZnO | Additive |
| 1 | 56.17 | 30.99 | 10.70 | 2.14 | 0.309 | 0.157 | 0.131 | 0.013 |
| 2 | 55.00 | 30.34 | 10.48 | 4.19 | 0.302 | 0.154 | 0.129 | 0.026 |
| 3 | 54.43 | 30.02 | 10.37 | 5.18 | 0.299 | 0.152 | 0.127 | 0.012 |
| 4 | 51.75 | 28.54 | 9.86 | 9.86 | 0.285 | 0.145 | 0.121 | 0.022 |
| 5 | 54.43 | 30.02 | 10.37 | 5.18 | 0.299 | 0.152 | 0.127 | 0.011 |
| 6 | 51.75 | 28.54 | 9.86 | 9.86 | 0.285 | 0.145 | 0.121 | 0.022 |
| 7 | 56.17 | 30.99 | 10.70 | 2.14 | 0.309 | 0.157 | 0.131 | 0.013 |
| 8 | 55.00 | 30.34 | 10.48 | 4.19 | 0.302 | 0.154 | 0.129 | 0.026 |
| 9 | 56.78 | 31.32 | 10.82 | 1.08 | 0.312 | 0.159 | 0.133 | 0.010 |
| 10 | 56.17 | 30.99 | 10.70 | 2.14 | 0.309 | 0.157 | 0.131 | 0.020 |
| 11 | 56.78 | 31.32 | 10.82 | 1.08 | 0.312 | 0.159 | 0.133 | 0.014 |
| 12 | 56.17 | 30.99 | 10.70 | 2.14 | 0.309 | 0.157 | 0.131 | 0.027 |
| 13 | 56.48 | 31.15 | 10.76 | 1.61 | 0.311 | 0.158 | 0.132 | 0.013 |
| 14 | 55.58 | 30.66 | 10.59 | 3.18 | 0.306 | 0.155 | 0.130 | 0.026 |
| 15 | 55.58 | 30.66 | 10.59 | 3.18 | 0.306 | 0.155 | 0.130 | 0.012 |
| 16 | 53.87 | 29.71 | 10.26 | 6.16 | 0.296 | 0.151 | 0.126 | 0.023 |
| 17 | 56.91 | 31.39 | 10.84 | 0.87 | 0.313 | 0.159 | 0.133 | 0.012 |
| 18 | 56.42 | 31.12 | 10.75 | 1.72 | 0.310 | 0.158 | 0.132 | 0.025 |

TABLE 4C

| Ex | Normalized Moles V2O5 | BaO | ZnO | Additive | Tg (C) | (Tx1(C) | Tx2(C) | Tx1 − Tg |
|---|---|---|---|---|---|---|---|---|
| 1 | 50.57% | 25.71% | 21.53% | 2.20% | 315 | 400 | 525 | 85 |
| 2 | 49.48% | 25.16% | 21.07% | 4.30% | 315 | 420 | 530 | 105 |
| 3 | 50.68% | 25.76% | 21.58% | 1.99% | 320 | 450 |  | 130 |
| 4 | 49.69% | 25.26% | 21.16% | 3.90% | 320 | 450 | 530 | 130 |
| 5 | 50.71% | 25.78% | 21.59% | 1.92% | 305 | 390 | 495 | 85 |
| 6 | 49.75% | 25.29% | 21.18% | 3.77% | 295 | 390 | 470 | 95 |
| 7 | 50.56% | 25.70% | 21.53% | 2.21% | 315 | 405 | 530 | 90 |
| 8 | 49.47% | 25.15% | 21.06% | 4.32% | 315 | 400 | 530 | 85 |
| 9 | 50.83% | 25.84% | 21.64% | 1.68% | 315 | 395 | 530 | 80 |
| 10 | 49.99% | 25.41% | 21.28% | 3.31% | 315 | 400 | 530 | 85 |
| 11 | 50.56% | 25.71% | 21.53% | 2.20% | 315 | 385 | 525 | 70 |
| 12 | 49.47% | 25.15% | 21.06% | 4.31% | 320 | 395 | 545 | 75 |
| 13 | 50.61% | 25.73% | 21.55% | 2.12% | 305 | 390 | 525 | 85 |
| 14 | 49.55% | 25.19% | 21.10% | 4.16% | 300 | 380 |  | 80 |
| 15 | 50.68% | 25.76% | 21.58% | 1.98% | 315 | 425 | 550 | 110 |
| 16 | 49.69% | 25.26% | 21.16% | 3.89% | 325 | 440 | 465 | 115 |
| 17 | 50.66% | 25.75% | 21.57% | 2.02% | 315 | 410 | 540 | 95 |
| 18 | 49.66% | 25.25% | 21.14% | 3.95% | 320 | 405 | 545 | 85 |

TABLE 4D

| Example | Melt Quality @ 375 C., 15 min | Melt Quality at 350 C., 15 min |
|---|---|---|
| 1 | 5.0 | 4.0 |
| 2 | 4.5 | 4.0 |
| 3 | 4.5 | 2.0 |
| 4 | 5.0 | 2.0 |
| 5 | 4.5 | 4.5 |
| 6 | 5.0 | 5.0 |
| 7 | 5.5+ | 5.0 |
| 8 | 5.0 | 4.5 |
| 9 | 4.5 | 4.5 |
| 10 | 4.5 | 4.5 |
| 11 | 4.5 | 2.0 |
| 12 | 4.0 | 2.0 |
| 13 | 4.0 | 5.0 |
| 14 | 3.5 | 4.0 |
| 15 | 4.5 | 2.0 |
| 16 | 5.0 | 2.0 |
| 17 | 4.0 | 4.5 |
| 18 | 3.5 | 2.0 |

In certain example embodiments, the molar composition of an additive to a base composition higher than is shown in tables 4A-4D. Table 5A shows additives with an increased additive amount (on a % mole basis). The base composition used with the additive amount may be based on, for example, the base composition shown in Row 1 of Tables 4A-4D. The additives shown in Table 5, in the selected quantities displayed, may improve melt quality when compared to the above base composition. A melt type of Glassy indicates that a "button" of the compound melted onto a glass plate, forming a homogenous glassy structure. Sinter indicates that the compound (in a powder form) fused together, but remained in a powder form.

TABLE 5

| Example | Additive Type | Amount | Melt Type (350 C. for 20 minutes) | Adhesion to glass substrate. |
|---|---|---|---|---|
| 1 | CuCl | 4.00% | Glassy | No Stick |
| 2 | SnCl2 | 3.99% | Glassy | No Stick |
| 3 | SnCl2 | 5.99% | Glassy, Slight Flow | Slight stick |
| 4 | SiO2 | 6.02% | More Glassy | No Stick |
| 5 | Al2O3 | 6.00% | Glassy | No Stick |
| 6 | CeO2 | 4.00% | Sinter | No Stick |
| 7 | TeO2 | 3.99% | Glassy | Slight stick |
| 8 | TeO2 | 6.01% | Glassy | Slight stick |
| 9 | Tl2O3 | 3.99% | Glassy, Slight Flow | No Stick |
| 10 | Tl2O3 | 6.01% | Glassy, Slight Flow | No Stick |

Figure 4:
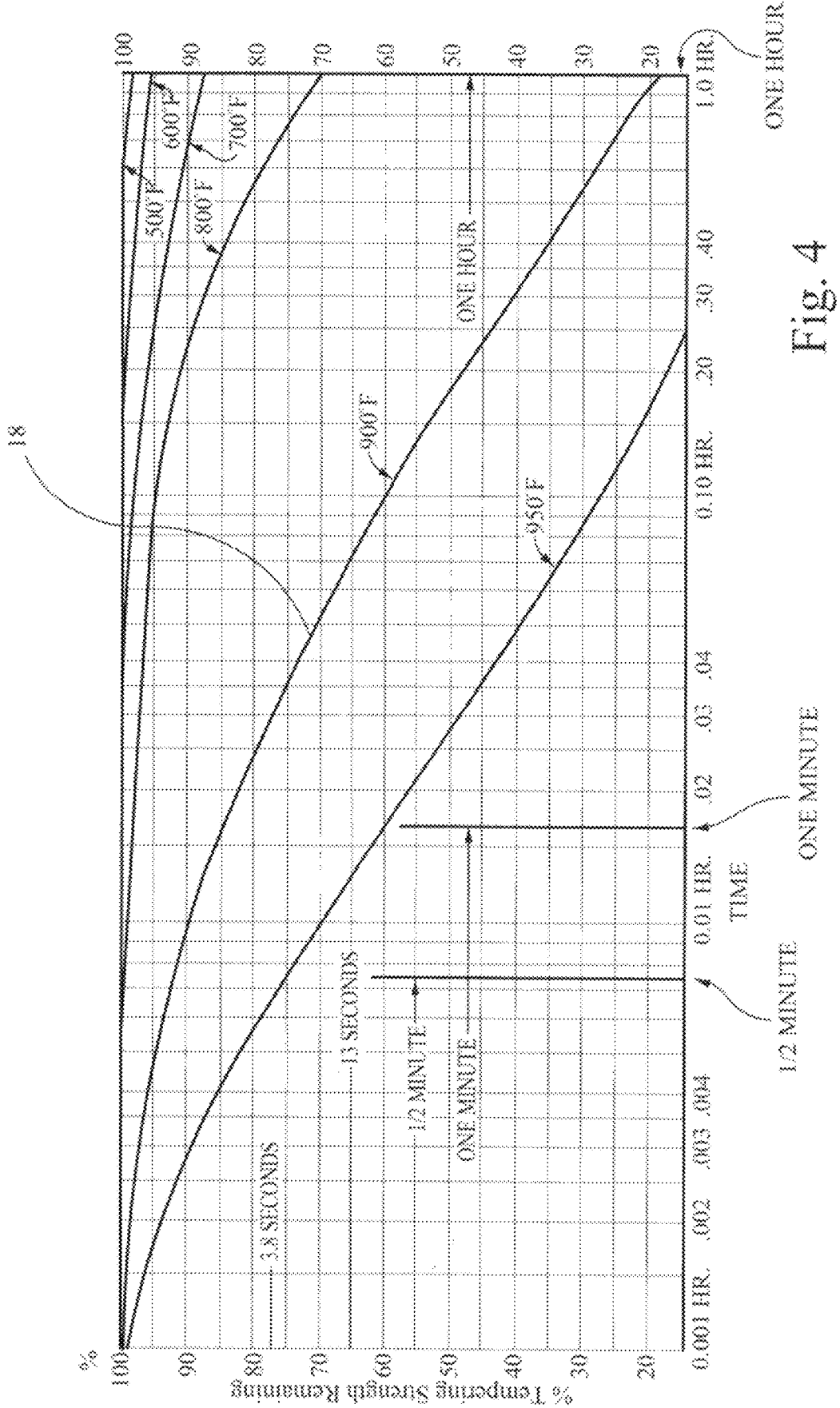
FIG. 4 is a graph correlating time versus percent tempering strength remaining similar to that of FIG. 3, except that a smaller time period is provided on the x-axis.

Accordingly, in certain example embodiments, additives of a relatively increased amount (e.g., versus those shown in FIG. 4) may be added to a base composition. In certain example embodiments, the additives may include, for example, CuCl, SnCl$_2$, SiO$_2$, Al$_2$O$_3$, and TeO$_2$. It will be appreciated that toxic nature of thallium oxide (Tl$_2$O$_3$) may preclude its use in certain instances.

In certain example embodiments, two or more additives may be included in a base compound. Table 6 shows the results of adding two additives to an exemplary base composition. Table 6 includes example melts at 375 and 350. Additionally, 13 mm buttons of the exemplary compounds were tested on a glass plate. The structural strength of the resulting exemplary compound are also shown in the far right column.

TABLE 6

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 1 | TeO2 | Al2O3 | 3.01 | 3.01 | 4.5 | 5.5 | glassy | Fractures |
| 2 | TeO2 | Al2O3 | 2.99 | 5.01 | 5 | 4 | glassy | Fractures |
| 3 | TeO2 | Al2O3 | 4.02 | 3.01 | 6 | 5.5 | glassy | Fractures |
| 4 | TeO2 | Al2O3 | 3.99 | 5.00 | 5 | 4.5 | glassy | Fractures |
| 5 | TeO2 | Al2O3 | 5.01 | 2.99 | 4.5 | 4.5 | glassy | Fractures |

TABLE 6-continued

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 6 | TeO2 | Al2O3 | 5.00 | 5.00 | 5 | 4.5 | glassy | Fractures |
| 7 | TeO2 | SiO$_2$ | 3.01 | 3.00 | 5 | 5.5 | glassy | Fractures |
| 8 | TeO2 | SiO$_2$ | 2.99 | 5.02 | 5 | 4.5 | glassy | Fractures |
| 9 | TeO2 | SiO$_2$ | 4.00 | 2.99 | 5 | 4 | glassy | Fractures |
| 10 | TeO2 | SiO$_2$ | 3.99 | 4.99 | 5 | 4.5 | Less glassy | Fractures |
| 11 | TeO2 | SiO$_2$ | 5.00 | 2.99 | 4.5 | 4.5 | Less glassy | Hard |
| 12 | TeO2 | SiO$_2$ | 5.00 | 4.99 | 4.5 | 4.5 | Less glassy | Hard |
| 13 | SnCl2 | Al2O3 | 3.01 | 3.01 | 5 | 6 | more glassy | Hard |
| 14 | SnCl2 | Al2O3 | 3.00 | 5.01 | 5 | 5.5 | glassy | Hard |
| 15 | SnCl2 | Al2O3 | 4.01 | 3.01 | 4.5 | 6 | glassy | Hard |
| 16 | SnCl2 | Al2O3 | 4.00 | 4.99 | 5.5 | 6 | glassy | Hard |
| 17 | SnCl2 | Al2O3 | 5.00 | 2.99 | 5.5 | 5.5 | glassy | Fractures |
| 18 | SnCl2 | Al2O3 | 5.00 | 5.00 | 5.5 | 5.5 | more glassy | Hard |
| 19 | SnCl2 | SiO2 | 3.00 | 3.00 | 4.5 | 4.5 | glassy | Hard |
| 20 | SnCl2 | SiO2 | 3.00 | 4.99 | 5 | 6 | glassy | Hard |
| 21 | SnCl2 | SiO2 | 4.00 | 2.99 | 6 | 6 | glassy | Fractures |
| 22 | SnCl2 | SiO2 | 4.01 | 4.99 | 5.5 | 5.5 | glassy | Fractures |
| 23 | SnCl2 | SiO2 | 5.00 | 2.99 | 5 | 5.5 | glassy | Hard |
| 24 | SnCl2 | SiO2 | 5.00 | 4.99 | 5.5 | 5.5 | glassy | Fractures |
| 25 | Al2O3 | SiO2 | 3.01 | 3.00 | 4.5 | 4 | less glassy | Hard |
| 26 | Al2O3 | SiO2 | 2.99 | 4.99 | 5 | 5.5 | less glassy | Hard |
| 27 | Al2O3 | SiO2 | 4.00 | 2.99 | 4.5 | 4.5 | less glassy | Hard |
| 28 | Al2O3 | SiO2 | 4.00 | 4.99 | 5 | 4.5 | less glassy | Hard |
| 29 | Al2O3 | SiO2 | 5.01 | 2.99 | 5 | 4.5 | less glassy | Hard |
| 30 | Al2O3 | SiO2 | 5.01 | 4.99 | 4 | 2 | less glassy | Hard |

Accordingly, certain example may include two additives similar to those found in examples 3, 16, and 21 as shown in Table 6 (e.g., TeO2 with SiO2, SnCl2 with Al2O3, and SnCl2 with SiO2). In certain example embodiments, the addition of two or more additives may have beneficial results on an exemplary base composition. For example the addition of SiO2 to another additive may increase the strength of the overall frit. Alternatively, or in addition, TeO2 combined with other additives may increase the melt flow and glass wetting qualities of the frit when compared to a base frit.

In certain example embodiments, the combination of SnCl2 with SiO2 and/or Al$_2$O$_3$ may result in an increase in structural strength for the resulting frit material.

In certain example embodiments, one or more additives may be added to a base composition where the amount is between 1% and 10% by weight or between about 1% and 6% normalized moles for a batch. In certain example embodiments, additives may be added in a smaller amount, for example between about 0.1% and 1% by weight. In certain example embodiments a batch for a base composition (in grams) may include V$_2$O$_5$ at 52.5, BaO at 22.5, ZnO at 10. In certain example embodiments, additives added to the above base composition may include: 1) TeO2 at 3.85 gm and Al$_2$O$_3$ at 1.84 gm; 2) SnCl2 at 4.65 gm and Al$_2$O$_3$ at 3.12 gm; 3) SnCl2 at 4.55 gm and SiO2 at 1.08 gm. Correspondingly, the additives may then have a normalize weight percentage of: 1) TeO2 at 1.00 and Al$_2$O$_3$ at 0.48; 2) SnCl2 at 1.21 and Al$_2$O$_3$ at 0.81; 3) SnCl2 at 1.18 and SiO2 at 0.28. These examples may correspond to examples 3, 16, and 21 in the above table 6.

Figure 11A:
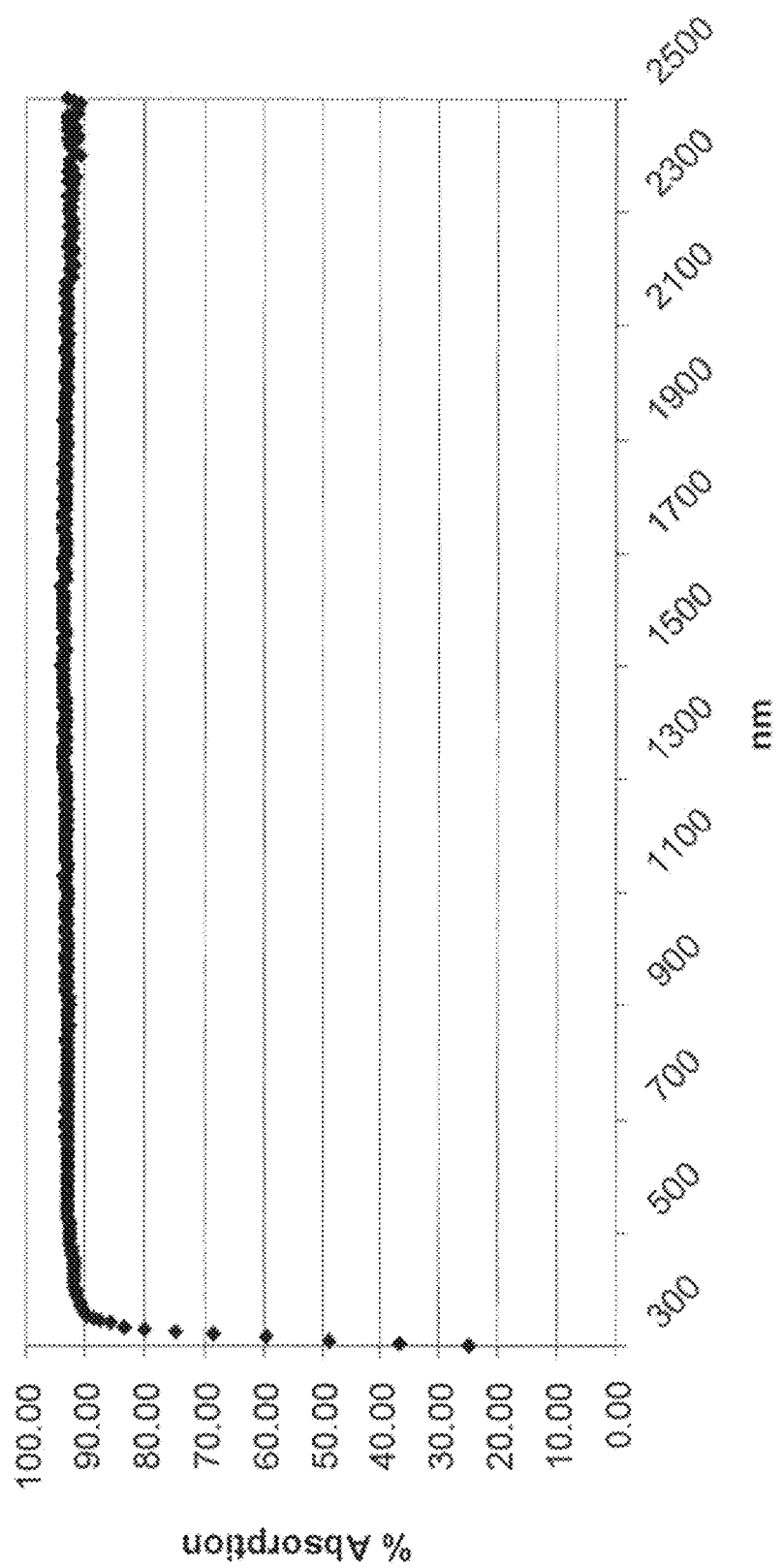
FIGS. 11A-11C show graphs summarizing absorption in the visible and infrared wavelengths for vanadium based frits according to certain example embodiments.
Figure 11B:
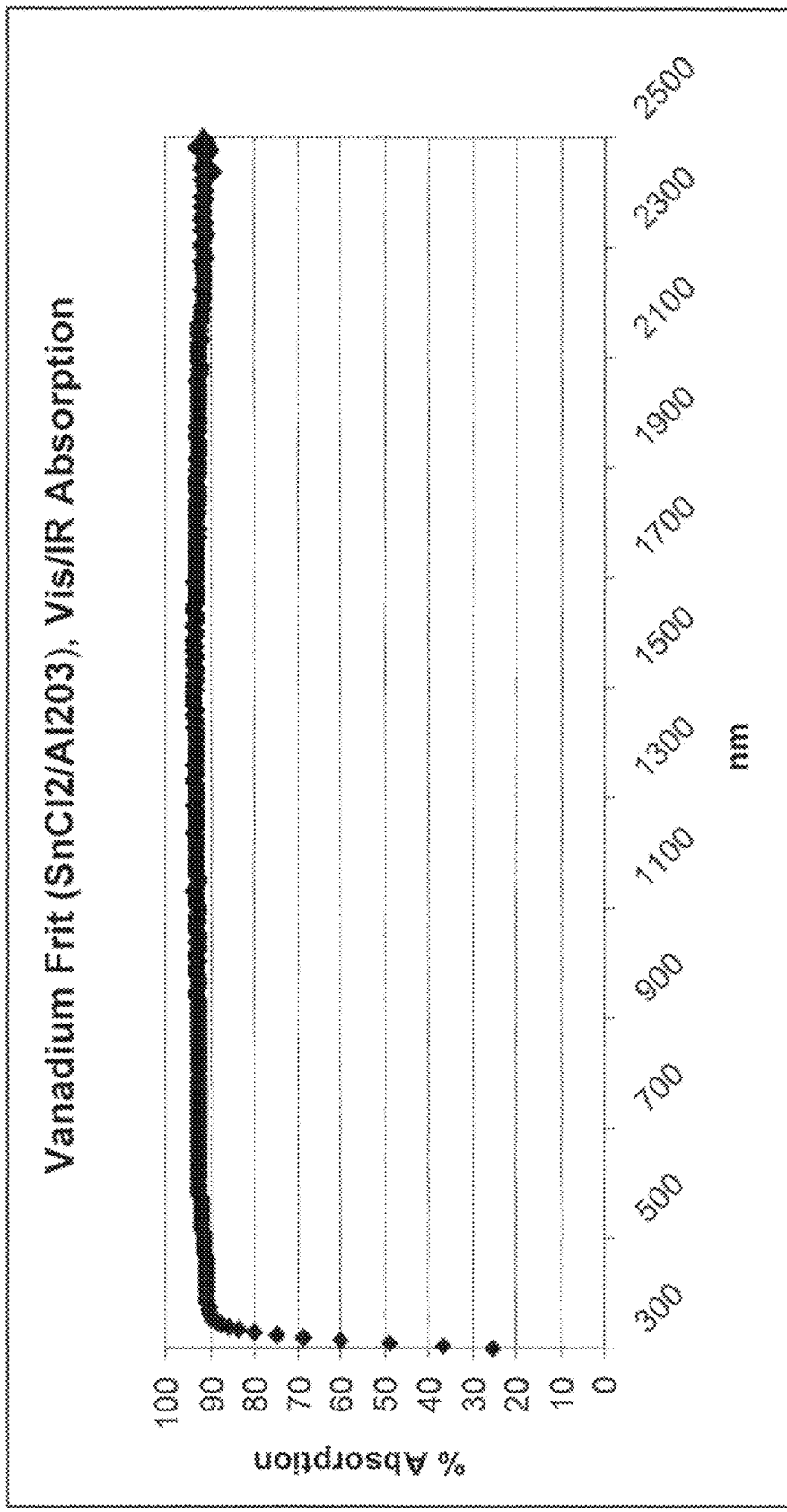
Figure 11C:
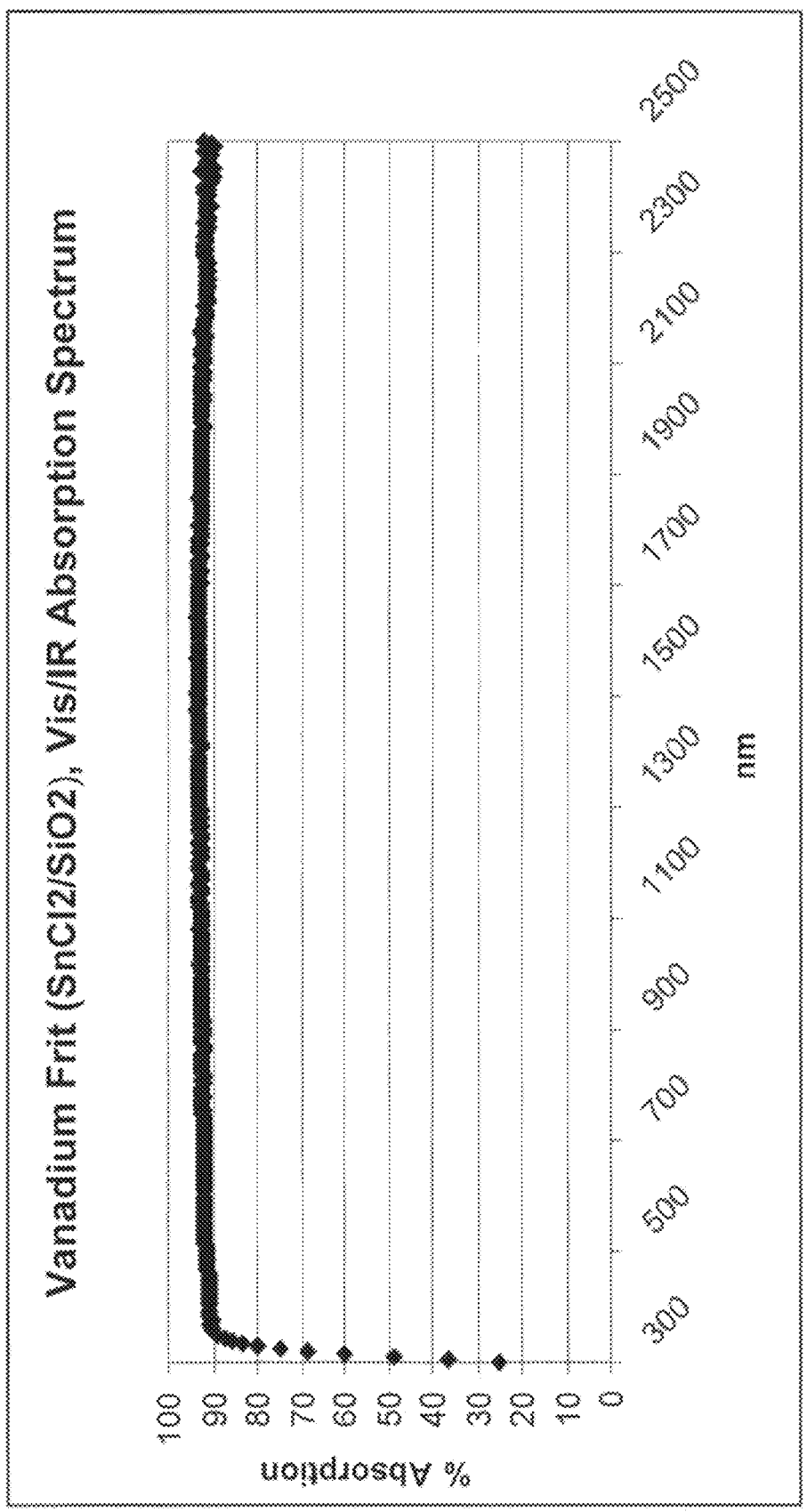

FIGS. 11A-11C show graphs illustrating absorption in the visible and infrared wavelengths for vanadium based frits according to certain example embodiments. As shown in the graphs, example vanadium based frits may have absorption of at least 90% across a substantial breath of the visible and IR spectrum. In certain example embodiments the absorption may be about 95%. As discussed in co-pending application Ser. No. 12/929,874, filed on Feb. 22, 2011, entitled "IMPROVED FRIT MATERIALS AND/OR METHOD OF MAKING VACUUM INSULATING GLASS UNITS INCLUDING THE SAME", the entire contents of which are incorporated herein by reference, frit materials with high visible/IR absorption may be advantageous.

FIG. 11A shows the absorption properties of a vanadium based frit with TeO2 and Al$_2$O$_3$ used as additives (e.g., Ex. 3 of Table 6). FIG. 11B shows the absorption properties of a vanadium based frit with SnCl$_2$ and Al$_2$O$_3$ used as additives (e.g., Ex. 16 of Table 6). FIG. 11C shows the absorption properties of a vanadium based frit with SnCl$_2$ and SiO$_2$ used as additives (e.g., Ex. 21 of Table 6).

In certain example embodiments, the application of IR energy to a frit material may be based on a heating profile where the IR energy applied to the frit varies over time. Exemplary heating profiles may be found in co-pending application Ser. No. 12/929,874, the entire contents of which are incorporated herein by reference.

In certain example embodiments, a base composition may be augmented by 3 or 4 additives. For example, a batch for a base composition (in grams) may include V$_2$O$_5$ at 52.5, BaO at 22.5, ZnO at 10. Accordingly, three and/or more additives from among TeO2, SnCl2, Al2O3, and SiO2 may be selected to augment the base composition. The ranges (in grams) for the additives may vary between 0 to 7.5 grams per additive. Thus, on a normalized molar percentage the above additives may be included at between 0% and 6%. Thus, the normalized molar percentage of a base composition may be $V_2O_5$ at between about 43% and 50%, BaO between about 22% and 26%, ZnO between about 18% and 22%. In certain example embodiments, additives (on a normalized molar basis) of TeO2 at around 2%, SnCl2 around 2%, Al2O3 around 2%, and SiO2 around 4% may be added to the base composition.

The techniques, compositions, etc disclosed herein may be used other methods and/or systems for forming a VIG unit. For example, a vanadium based frit may be used to form an edge seal of a VIG unit. Systems, apparatuses, and/or methods used for creating a VIG unit may be described in co-pending application Ser. No. 12/929,876, filed on Feb. 22, 2011, entitled "LOCALIZED HEATING TECHNIQUES INCORPORATING TUNABLE INFRA-RED ELEMENT(S) FOR VACUUM INSULATING GLASS UNITS, AND/OR APPARATUSES FOR THE SAME", the entire contents of which are hereby incorporated by reference.

Certain example embodiments may include three or more additives to a base composition that includes vanadium pentaoxide; barium carbonate that coverts in whole or in part to barium oxide; and zinc oxide. The above three "base" frit elements may be included at 35-55% molar for $V_2O_5$, 15-35% for BaO, and 15-25% molar for ZnO or, more preferably, 40-50% molar for $V_2O_5$, 20-30% for BaO, and 18-22% molar for ZnO.

Along with an example base frit composition, one or more additives may be added. The additives may include, for example:

1) $SnCl_2$ at between 1-10% molar, which may help reduce glass softening temperatures and/or reduce crystallization in certain example embodiments;
2) $CuCl_2$ at between 1-5% molar, which may help reduce glass softening temperature in certain example embodiments;
3) $MoO_3$ at between 1-6% molar, which may help reduce glass softening temperatures in certain example embodiments;
4) $TeO_2$ at between 1-10% molar, which may help increase glass flow ability and/or wetting to a substrate glass in certain example embodiments;
5) $Ta_2O_5$ at between 0.5-5% molar, which may help increase softening temperature and/or increase crystallization temperature in certain example embodiments;
6) $Nb_2O_5$ at between 0.5-6% molar, which may help increase softening temperature and/or increase crystallization temperature in certain example embodiments;
7) $Al_2O_3$ at between 0.5-5% molar, which may help increase softening, weathering ability, chemical durability, and/or mechanical strength in certain example embodiments;
8) $SiO_2$ at between 0.5-5% molar, which may help increase softening, weathering ability, chemical durability, and/or mechanical strength in certain example embodiments; and
9) $CsCO_3$ at between 0.5-4% molar, which may help increase melt flow and/or reduce wetting ability in certain example embodiments.

In certain example embodiments, four or more additives, more preferably six or more additives may be added to the above base composition. It will be appreciated that as the number of the additives increases, the interactions between the various additives may produce different results based on the relative weighting of one or more additives (or the base composition). It also will be appreciated that the increased number of additives may create synergistic effects (e.g., in terms of glass softening temperature, flowability, and/or other adjustments) that otherwise might not be observable.

In certain example embodiments, one or more additives may be introduced through the frit creation process rather than being expressly introduced. For example, additive ingredients may be introduced into a frit material as a result of firing the frit material in a crucible. For instance, some ingredients may be "leached" from the crucible and into the frit material. In certain example embodiments, $Al_2O_3$ and $SiO_2$ may be leached by this process.

Tables 7-10 show example frit compositions according to certain example embodiments. The different tables each include one or more additives that are varied while the other ingredients are kept substantially the same between the example compounds of the give table.

In tables 7A-7C, molybdenum oxide is varied between the example compounds; in tables 8A-8C tellurium oxide is varied between the example compounds; in tables 9A-9C cesium carbonate is varied between the example compounds; and in tables 10A-10D tantalum oxide and niobium oxide are varied between the example compounds.

Tables 7A, 8A, 9A, and 10A show the example frit compositions by normalized weight percentage. Tables 7B, 8B, 9B, and 10B show the example frit compositions by normalized mole percent. The values given in tables 7-10 A and B are normalized to approximately 100% for shown compositions. For example, $V_2O_5$ from example 1 in table 7A is 54.88% by weight of the frit composition for the frit composition. Similarly, $V_2O_5$ for the same example frit composition is shown as 49.76% mole of the resulting frit composition (e.g., from Table 7B). Thus, the normalized weight and mole percentages may add up to about 100% for the example frit compositions shown in the various tables herein. Tables 7C, 8C, 9C, 10C, and 10D show exemplary results for the example frit compositions. As can be seen in the results of the above noted tables (e.g., tables 7-10), performance of one or more of the above examples may be improved over a base frit material, or a frit material with only one additive as discussed above. For example, example frit materials 9 and 11 shown in Table 8 show good flow at 375 degrees C. (5 and 6.5, respectively).

TABLE 7A $MoO_3$ Examples

Normalized Weight Percentage

| Example | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 1 | 54.88 | 26.61 | 10.45 | 0.87 | 4.15 | 1.38 | 0.00 | 0.00 | 1.65 |
| 2 | 54.64 | 26.49 | 10.41 | 1.31 | 4.13 | 1.37 | 0.00 | 0.00 | 1.64 |
| 3 | 54.39 | 26.38 | 10.36 | 1.75 | 4.11 | 1.37 | 0.00 | 0.00 | 1.64 |
| 4 | 54.15 | 26.26 | 10.31 | 2.19 | 4.10 | 1.36 | 0.00 | 0.00 | 1.63 |
| 5 | 53.91 | 26.14 | 10.27 | 2.63 | 4.08 | 1.36 | 0.00 | 0.00 | 1.62 |
| 6 | 53.67 | 26.02 | 10.22 | 3.07 | 4.06 | 1.35 | 0.00 | 0.00 | 1.62 |

TABLE 7B

MoO$_3$ Examples

Normalized Moles of Batch Composition

| Ex. | V$_2$O$_5$ | BaO | ZnO | MoO$_3$ | TeO$_2$ | Ta$_2$O$_5$ | Al$_2$O$_3$ | SiO$_2$ | Nb$_2$O$_5$ |
|---|---|---|---|---|---|---|---|---|---|
| 1 | 49.76% | 22.24% | 21.18% | 0.99% | 4.29% | 0.51% | 0.00% | 0.00% | 1.02% |
| 2 | 49.50% | 22.12% | 21.08% | 1.50% | 4.27% | 0.51% | 0.00% | 0.00% | 1.02% |
| 3 | 49.25% | 22.01% | 20.97% | 2.00% | 4.24% | 0.51% | 0.00% | 0.00% | 1.01% |
| 4 | 49.00% | 21.90% | 20.86% | 2.50% | 4.22% | 0.51% | 0.00% | 0.00% | 1.01% |
| 5 | 48.75% | 21.79% | 20.75% | 3.00% | 4.20% | 0.50% | 0.00% | 0.00% | 1.00% |
| 6 | 48.50% | 21.67% | 20.65% | 3.50% | 4.18% | 0.50% | 0.00% | 0.00% | 1.00% |

TABLE 7C

MoO$_3$ Examples

Test Results

| Ex. | Slides 350 C. 15 min | Slides 375 C. 15 min | 375 C. 13 mm button 20 min | Results | 400 C. 13 mm button 20 min | Results |
|---|---|---|---|---|---|---|
| 1 | 5.0 | 5.5 | 12.39 | glass | 13.76 | light haze |
| 2 | 3.0 | 4.5 | 12.80 | glass | 14.06 | light haze |
| 3 | 4.0 | 5.5 | 12.51 | glass | 14.14 | light haze |
| 4 | 4.5 | 5.0 | 13.08 | glass | 14.22 | light haze |
| 5 | 5.5 | 5.0 | 12.93 | glass | 14.26 | light haze |
| 6 | 5.5 | 5.5 | 12.88 | glass | 14.50 | light haze |

TABLE 8A

TeO$_2$ Examples

Normalized Weight Percentage

| Example | V$_2$O$_5$ | BaO | ZnO | MoO$_3$ | TeO$_2$ | Ta$_2$O$_5$ | Al$_2$O$_3$ | SiO$_2$ | Nb$_2$O$_5$ |
|---|---|---|---|---|---|---|---|---|---|
| 7 | 54.84 | 26.59 | 10.45 | 2.67 | 2.42 | 1.38 | 0.00 | 0.00 | 1.65 |
| 8 | 54.56 | 26.46 | 10.39 | 2.66 | 2.91 | 1.37 | 0.00 | 0.00 | 1.64 |
| 9 | 54.29 | 26.33 | 10.34 | 2.65 | 3.39 | 1.37 | 0.00 | 0.00 | 1.63 |
| 10 | 54.02 | 26.19 | 10.29 | 2.63 | 3.88 | 1.36 | 0.00 | 0.00 | 1.63 |
| 11 | 53.74 | 26.06 | 10.24 | 2.62 | 4.37 | 1.35 | 0.00 | 0.00 | 1.62 |
| 12 | 53.47 | 25.93 | 10.18 | 2.61 | 4.86 | 1.34 | 0.00 | 0.00 | 1.61 |
| 13 | 53.20 | 25.80 | 10.13 | 2.59 | 5.34 | 1.34 | 0.00 | 0.00 | 1.60 |
| 14 | 52.92 | 25.66 | 10.08 | 2.58 | 5.83 | 1.33 | 0.00 | 0.00 | 1.59 |

TABLE 8B

TeO$_2$ Examples

Normalized Moles of Batch Composition

| Ex. | V$_2$O$_5$ | BaO | ZnO | MoO$_3$ | TeO$_2$ | Ta$_2$O$_5$ | Al$_2$O$_3$ | SiO$_2$ | Nb$_2$O$_5$ |
|---|---|---|---|---|---|---|---|---|---|
| 7 | 49.61% | 22.17% | 21.12% | 3.06% | 2.50% | 0.51% | 0.00% | 0.00% | 1.02% |
| 8 | 49.36% | 22.06% | 21.01% | 3.04% | 3.00% | 0.51% | 0.00% | 0.00% | 1.02% |
| 9 | 49.11% | 21.95% | 20.91% | 3.03% | 3.50% | 0.51% | 0.00% | 0.00% | 1.01% |
| 10 | 48.85% | 21.83% | 20.80% | 3.01% | 4.00% | 0.51% | 0.00% | 0.00% | 1.01% |
| 11 | 48.59% | 21.72% | 20.69% | 2.99% | 4.50% | 0.50% | 0.00% | 0.00% | 1.00% |
| 12 | 48.34% | 21.60% | 20.58% | 2.98% | 5.00% | 0.50% | 0.00% | 0.00% | 1.00% |
| 13 | 48.09% | 21.49% | 20.47% | 2.96% | 5.50% | 0.50% | 0.00% | 0.00% | 0.99% |
| 14 | 47.83% | 21.38% | 20.36% | 2.95% | 6.00% | 0.49% | 0.00% | 0.00% | 0.98% |

TABLE 8C

TeO$_2$ Examples

Test Results

| Ex. | Slides 350 C. 15 min | Slides 375 C. 15 min | 375 C. 13 mm button 20 min | Results | 400 C. 13 mm button 20 min | Results |
|---|---|---|---|---|---|---|
| 7 | 5.5 | 6.0 | 12.89 | glass | 14.37 | haze |
| 8 | 3.0 | 6.5 | 13.08 | glass | 14.63 | light haze |
| 9 | 3.0 | 5.0 | 13.38 | glass | 14.93 | light haze |
| 10 | 6.5 | 5.0 | 13.17 | glass | 14.66 | light haze |
| 11 | 4.5 | 6.5 | 13.04 | glass | 14.72 | glass |
| 12 | 6.0 | 6.5 | 12.72 | glass | 14.53 | light haze |
| 13 | 5.5 | 5.0 | 12.94 | glass | 14.59 | light haze |
| 14 | 5.5 | 6.0 | 13.24 | glass | 14.92 | light haze |

TABLE 9A

CsCO$_3$ Examples

Normalized Weight Percentage

| Example | V$_2$O$_5$ | BaO | ZnO | MoO$_3$ | TeO$_2$ | Ta$_2$O$_5$ | Al$_2$O$_3$ | SiO$_2$ | Nb$_2$O$_5$ | CsCO$_3$ |
|---|---|---|---|---|---|---|---|---|---|---|
| 15 | 52.95 | 25.68 | 10.09 | 2.58 | 4.31 | 1.33 | 0.00 | 0.00 | 1.59 | 1.47 |
| 16 | 52.69 | 25.55 | 10.04 | 2.57 | 4.29 | 1.32 | 0.00 | 0.00 | 1.59 | 1.97 |
| 17 | 52.43 | 25.43 | 9.99 | 2.56 | 4.26 | 1.32 | 0.00 | 0.00 | 1.58 | 2.44 |
| 18 | 52.17 | 25.30 | 9.94 | 2.54 | 4.24 | 1.31 | 0.00 | 0.00 | 1.57 | 2.92 |
| 19 | 51.91 | 25.17 | 9.89 | 2.53 | 4.22 | 1.31 | 0.00 | 0.00 | 1.56 | 3.41 |
| 20 | 51.65 | 25.05 | 9.84 | 2.52 | 4.20 | 1.30 | 0.00 | 0.00 | 1.55 | 3.89 |

TABLE 9B

CsCO$_3$ Examples

Normalized Moles of Batch Composition (%)

| Ex. | V$_2$O$_5$ | BaO | ZnO | MoO$_3$ | TeO$_2$ | Ta$_2$O$_5$ | Al$_2$O$_3$ | SiO$_2$ | Nb$_2$O$_5$ | CsCO$_3$ |
|---|---|---|---|---|---|---|---|---|---|---|
| 15 | 48.23 | 21.55 | 20.53 | 2.97 | 4.47 | 0.50 | 0.00 | 0.00 | 0.99 | 0.75 |
| 16 | 48.11 | 21.50 | 20.48 | 2.96 | 4.46 | 0.50 | 0.00 | 0.00 | 0.99 | 1.00 |
| 17 | 47.99 | 21.45 | 20.43 | 2.96 | 4.45 | 0.50 | 0.00 | 0.00 | 0.99 | 1.25 |
| 18 | 47.87 | 21.39 | 20.38 | 2.95 | 4.44 | 0.50 | 0.00 | 0.00 | 0.99 | 1.50 |
| 19 | 47.74 | 21.34 | 20.33 | 2.94 | 4.43 | 0.49 | 0.00 | 0.00 | 0.98 | 1.75 |
| 20 | 47.62 | 21.28 | 20.27 | 2.93 | 4.41 | 0.49 | 0.00 | 0.00 | 0.98 | 2.00 |

TABLE 9C

CsCO$_3$ Examples

Test Results

| Ex. | Slide 350 C.- 15 min | Slide 375 C.- 15 min | 13 mm button- 375 C. 20 min | Results | 13 mm button- 400 C. 20 min | Results |
|---|---|---|---|---|---|---|
| 15 | 5.5 | 6.5 | 13.40 | glass | 14.88 | haze |
| 16 | 5.5 | 5.5 | 13.05 | glass | 15.40 | glass |
| 17 | 4.0 | 6.5 | 13.60 | glass | 15.17 | light haze |
| 18 | 4.5 | 6.5 | 13.33 | glass | 14.81 | haze |
| 19 | 6.0 | 4.5 | 13.28 | glass | 14.59 | haze |
| 20 | 4.5 | 7.0 | 13.97 | glass | 16.36 | light haze |

TABLE 10A

Ta$_2$O$_5$ and Nb$_2$O$_5$ Examples

Normalized Weight Percentage

| Example | V$_2$O$_5$ | BaO | ZnO | MoO$_3$ | TeO$_2$ | Ta$_2$O$_5$ | Al$_2$O$_3$ | SiO$_2$ | Nb$_2$O$_5$ |
|---|---|---|---|---|---|---|---|---|---|
| 21 | 53.87 | 26.12 | 10.26 | 2.63 | 3.37 | 1.34 | 0.00 | 0.00 | 2.41 |
| 22 | 53.42 | 25.90 | 10.18 | 2.60 | 3.34 | 1.34 | 0.00 | 0.00 | 3.22 |
| 23 | 52.98 | 25.69 | 10.09 | 2.58 | 3.31 | 1.33 | 0.00 | 0.00 | 4.01 |
| 24 | 53.59 | 25.99 | 10.21 | 2.61 | 3.35 | 2.65 | 0.00 | 0.00 | 1.60 |
| 25 | 53.15 | 25.77 | 10.12 | 2.59 | 3.32 | 2.65 | 0.00 | 0.00 | 2.39 |
| 26 | 52.71 | 25.56 | 10.04 | 2.57 | 3.29 | 2.65 | 0.00 | 0.00 | 3.18 |
| 27 | 52.28 | 25.35 | 9.96 | 2.55 | 3.27 | 2.63 | 0.00 | 0.00 | 3.97 |
| 28 | 52.86 | 25.63 | 10.07 | 2.58 | 3.30 | 3.97 | 0.00 | 0.00 | 1.59 |
| 29 | 52.43 | 25.43 | 9.99 | 2.56 | 3.28 | 3.94 | 0.00 | 0.00 | 2.38 |
| 30 | 52.00 | 25.21 | 9.90 | 2.54 | 3.25 | 3.94 | 0.00 | 0.00 | 3.16 |
| 31 | 51.57 | 25.01 | 9.82 | 2.51 | 3.22 | 3.93 | 0.00 | 0.00 | 3.93 |

TABLE 10B

Ta$_2$O$_5$ and Nb$_2$O$_5$ Examples

Normalized Moles of Batch Composition

| Ex. | V$_2$O$_5$ | BaO | ZnO | MoO$_3$ | TeO$_2$ | Ta$_2$O$_5$ | Al$_2$O$_3$ | SiO$_2$ | Nb$_2$O$_5$ |
|---|---|---|---|---|---|---|---|---|---|
| 21 | 48.87% | 21.84% | 20.81% | 3.01% | 3.48% | 0.50% | 0.00% | 0.00% | 1.50% |
| 22 | 48.61% | 21.73% | 20.70% | 3.00% | 3.46% | 0.50% | 0.00% | 0.00% | 2.00% |
| 23 | 48.37% | 21.62% | 20.59% | 2.98% | 3.44% | 0.50% | 0.00% | 0.00% | 2.50% |
| 24 | 48.87% | 21.84% | 20.81% | 3.01% | 3.48% | 1.00% | 0.00% | 0.00% | 1.00% |
| 25 | 48.62% | 21.73% | 20.70% | 3.00% | 3.46% | 1.00% | 0.00% | 0.00% | 1.50% |
| 26 | 48.37% | 21.62% | 20.59% | 2.98% | 3.44% | 1.00% | 0.00% | 0.00% | 2.00% |
| 27 | 48.12% | 21.51% | 20.49% | 2.96% | 3.43% | 1.00% | 0.00% | 0.00% | 2.50% |
| 28 | 48.62% | 21.73% | 20.70% | 3.00% | 3.46% | 1.50% | 0.00% | 0.00% | 1.00% |
| 29 | 48.37% | 21.62% | 20.59% | 2.98% | 3.44% | 1.50% | 0.00% | 0.00% | 1.50% |
| 30 | 48.12% | 21.50% | 20.49% | 2.96% | 3.43% | 1.50% | 0.00% | 0.00% | 2.00% |
| 31 | 47.87% | 21.39% | 20.38% | 2.95% | 3.41% | 1.50% | 0.00% | 0.00% | 2.50% |

TABLE 10C

Ta$_2$O$_5$ and Nb$_2$O$_5$ Examples

Test Results

| Ex. | Slide 350 C.- 15 min | Slide 375 C.- 15 min | 13 mm button- 375 C. 20 min | Results | 13 mm button- 400 C. 20 min | Results |
|---|---|---|---|---|---|---|
| 21 | 4.5 | 6.5 | 13.24 | glass | 15.21 | glass |
| 22 | 4.0 | 6.5 | 12.42 | glass | 14.50 | glass |
| 23 | 2.5 | 6.0 | 12.24 | glass | 14.55 | glass |
| 24 | 4.5 | 6.5 | 12.56 | glass | 14.47 | glass |
| 25 | 3.0 | 5.0 | 12.35 | glass | 14.16 | glass |
| 26 | 4.5 | 6.0 | 12.19 | glass | 14.88 | glass |
| 27 | 4.5 | 5.0 | 12.30 | glass | 14.48 | glass |
| 28 | 3.0 | 5.5 | 12.16 | glass | 14.34 | glass |
| 29 | 3.0 | 5.5 | 11.62 | glass | 14.07 | glass |
| 30 | 3.0 | 5.5 | 11.79 | glass | 14.20 | glass |
| 31 | 3.0 | 6.0 | 11.77 | glass | 13.96 | glass |

TABLE 10D

Ta$_2$O$_5$ and Nb$_2$O$_5$ Examples

Test Results Continued

| Example | 13 mm button- 425 C. 20 min | Result |
|---|---|---|
| 21 | 16.07 | Haze |
| 22 | 15.86 | Haze |
| 23 | 16.08 | light haze |
| 24 | 14.79 | Haze |
| 25 | 15.99 | Glass |
| 26 | 16.40 | light haze |
| 27 | 16.15 | light haze |
| 28 | 15.33 | Haze |
| 29 | 15.55 | Glass |
| 30 | 15.71 | light haze |
| 31 | 14.57 | Haze |

In certain example embodiments, the use of Ta$_2$O$_5$ and/or Nb$_2$O$_5$ may help reduce the crystallization of the frit material. As the percentage of contribution by such additives increases, the softening temperature (e.g., a temperature at which the frit material may flow) may also increase. In certain example embodiments, such properties may be desirable for a tip off seal in a VIG unit (e.g., sealing the vacuum hole in a VIG unit).

Frit materials used for tipping off a vacuum hole may have different desirable properties than frit materials for a perimeter seal for a VIG unit. For example, a frit material used in a tip off seal may be completely or substantially exposed to IR and therefore may reach a higher temperature than that of a perimeter seal. Conversely, the perimeter seal may have the glass absorb some percentage of the SWIR directed at the frit of a perimeter seal (e.g., 10%-30% of the SWIR). Thus, an exemplary frit material (e.g., example 21) may be used for a perimeter seal while example 26 may be used for tip off seal.

As shown in Table 10D, the example frit compositions may provide increased resistance, or greater tolerance, to crystallization. The example compositions shown in Tables 7-10 were done in an alumina crucible. With such a crucible, a certain amount of Al$_2$O$_3$ and SiO$_2$ may be "leached" from the crucible during the frit preparation process. Thus, while Al$_2$O$_3$ and SiO$_2$ may not be shown in the above tables 7-10, these additives (or others depending on the crucible type) may yet be present in the frit composition due to the leaching process from the crucible. The leaching of Al$_2$O$_3$ and SiO$_2$ may be a result of melting or firing the frit compositions at certain temperatures (e.g., 800 C degrees C., 1000 degrees C., etc). Different firing temperatures and/or different lengths of time of firing may affect the amount of material leached from the crucible. The variation of Al$_2$O$_3$ and SiO$_2$ may change the frit performance for sealing at 375 degrees C. and 400 degrees C.

In certain example embodiments, Al$_2$O$_3$ may be included in a frit material at between 0% and 2% normalized moles by composition, or at a normalized weight percentage between 0% and 1.2%, or more preferably about 0.8%. SiO$_2$ may be included at between 1 and 5% normalized mole by composition and/or between about 0.5 and 2% by weight, and more preferably about 1.2% by normalized weight. The inventor has determined that in certain instances, having SiO$_2$ or Al$_2$O$_3$ in amount greater than about 2-5%, resulted in undesirable flow qualities of the frit composition. In particular, when bonding to an example glass substrate, in certain instances, higher percentages of SiO$_2$ or Al$_2$O$_3$ (e.g., in excess of 2 or 4%) resulted in concrete like qualities for the final frit composition.

Table 11 shows example results in a platinum crucible. Such a crucible may reduce or even prevent the leaching of excess additives during the firing process of the frit material.

TABLE 11

| Platinum Crucible-Normalized Moles (%) | | | | | | | | | |
|---|---|---|---|---|---|---|---|---|---|
| V$_2$O$_5$ | BaO | ZnO | CuCl | SnCl$_2$ | TeO$_2$ | Ta$_2$O$_5$ | Al$_2$O$_3$ | SiO$_2$ | Nb$_2$O$_5$ |
| 44.56 | 21.96% | 18.21% | 1.42% | 4.66% | 3.88% | 0.47% | 1.19% | 2.73% | 0.93% |
| 44.25 | 21.81% | 18.09% | 1.41% | 4.62% | 3.85% | 0.46% | 1.20% | 3.38% | 0.92% |
| 43.95 | 21.66% | 17.96% | 1.40% | 4.59% | 3.83% | 0.46% | 1.19% | 4.05% | 0.91% |
| 44.38 | 21.87% | 18.14% | 1.41% | 4.64% | 3.86% | 0.46% | 1.60% | 2.71% | 0.92% |
| 44.08 | 21.72% | 18.02% | 1.40% | 4.61% | 3.84% | 0.46% | 1.59% | 3.36% | 0.92% |
| 43.78 | 21.57% | 17.89% | 1.39% | 4.57% | 3.81% | 0.46% | 1.58% | 4.03% | 0.91% |
| 44.20 | 21.78% | 18.07% | 1.41% | 4.62% | 3.85% | 0.46% | 1.99% | 2.70% | 0.92% |
| 43.89 | 21.63% | 17.94% | 1.40% | 4.59% | 3.82% | 0.46% | 1.99% | 3.38% | 0.91% |
| 43.60 | 21.48% | 17.82% | 1.39% | 4.56% | 3.80% | 0.46% | 1.98% | 4.01% | 0.91% |

Figure 12C:
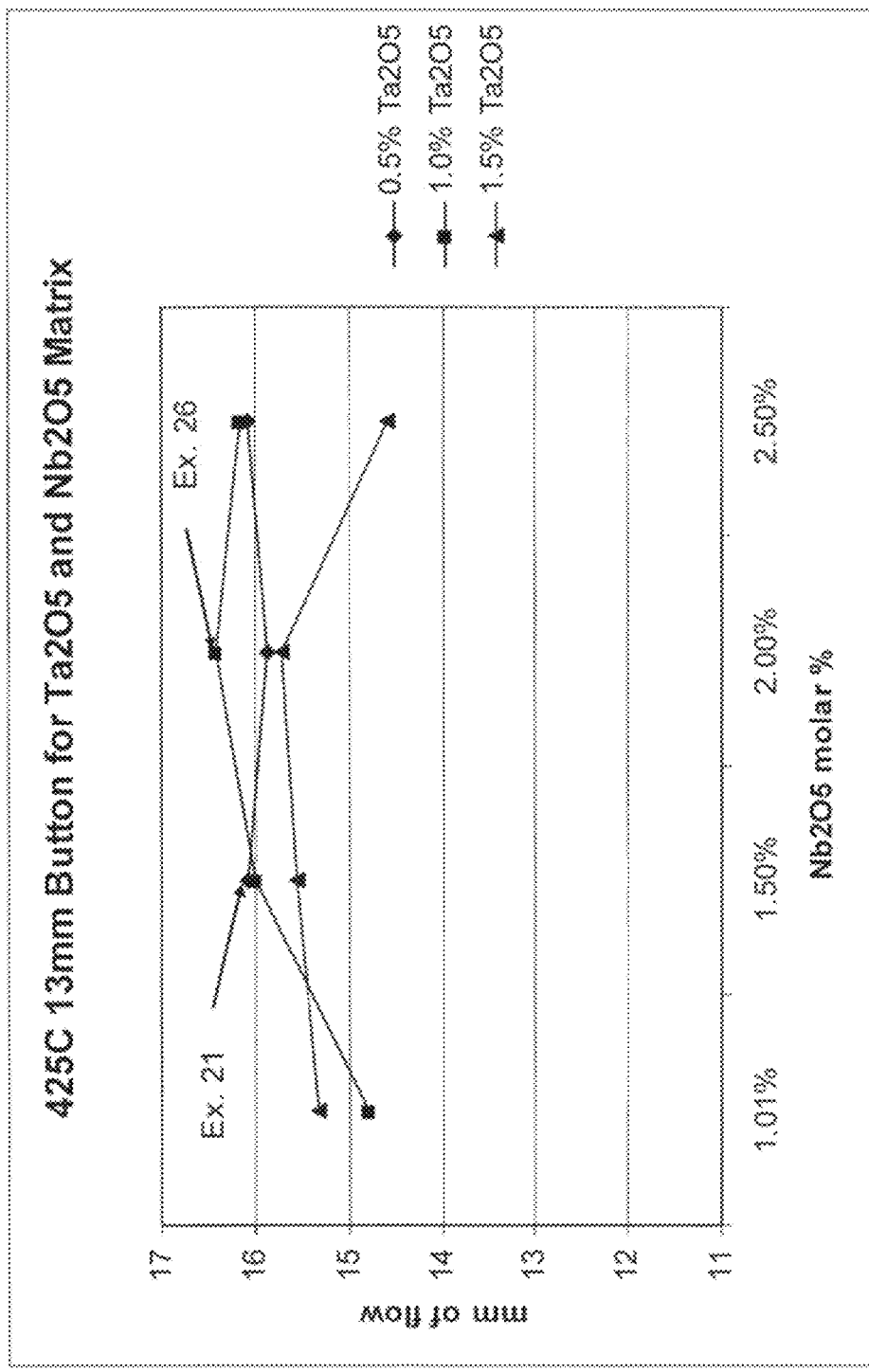

FIGS. 12A-12C are graphs summarizing flow characteristics of example frit materials according to certain example embodiments.

FIG. 12A shows that, at 375 degrees C., increasing Ta$_2$O$_5$ percentage may cause an increase in the initial softening temperature and resulting reduction in the flow (e.g., the diameter of the 13 mm button) for the example frit material. In certain example embodiments, increasing Nb$_2$O$_5$ percentage may provide less of a reduction in flow. As noted above, a frit (e.g., Ex. 21) with this composition may be used for a perimeter seal of a VIG unit.

FIG. 12B shows that, at 400 degrees C., Ex. 21 has improved flow characteristics. For example, with 1.0% Ta$_2$O$_5$, the frit flows well.

FIG. 12C shows, at 425 degrees C., Ex. 21 continuing to flow at higher temperatures, although, as shown above in Table 10D, the frit composition may become crystallized at such a temperature. However, Ex. 26 may continue to have good flow and has only a slight crystallization. Accordingly, Ex. 26 may continue to flow at higher temperatures.

As discussed herein, a binding agent may be applied to (or combined with) a frit material (e.g., a frit material based on the materials described herein). The inventor of the instant application has recognized that the reduced melting temperatures of certain example frit materials may provide for melting points that are less than the burnout temperature for certain types of binding agents that may be used in conjunction with the frit material. It is noted the following tests were performed using Ex. 26 as the frit composition, although the other frit compositions disclosed herein are expected to have similar performance characteristics, unless otherwise specifically noted below. It also is noted that a CTE matching material may be added in certain instances. One example is GM31682 available from Schott, which was added at 6.9 wt. % in conducting the following tests.

FIG. 13 is a graph showing a thermogravimetric analysis (TGA) of certain example binding agents. The TGA analysis was performed in nitrogen and, as can be seen, the example "QPAC" binding agents (discussed in more detail below) has a burn range that is approximately 100° C. lower than other binders in the cellulose family of compounds.

In certain example embodiments, the following example binder materials may be used in conjunction with certain frit materials.

EXAMPLE 1

A methyl cellulose polymer binder. Example 1 included 0.75 wt % methyl cellulose (400 cps molecular weight polymer) in DI water. TGA analysis of this material indicated a burn out of the binder at around 320-380° C.

EXAMPLE 2

A polyethylene carbonate binder, for example, [CH$_2$CH$_2$OCO$_2$]n or C$_3$H$_4$O$_3$. One example of such a binder is available under the material trade name QPAC® 25 from Empower Materials Inc. It will be appreciated that other carbonate inclusive binder materials may be used in certain example embodiments.

EXAMPLE 3

A polypropylene carbonate binder, for example, [CH$_3$CHCH$_2$OCO$_2$]n or C$_4$H$_6$O$_3$. One example of such a binder is available under the material trade name QPAC® 40 from Empower Materials Inc. As noted above, in FIG. 13, TGA analysis of these examples 2 and 3 indicated that the burnout of the binder material may be around 250-275° C.

The examples shown in FIGS. 14B, 15B, 16B, and 17-19 included a 5:1 (gram) ratio frit-to-binder solution. These were dried into layers on microscope slides, and the slides were placed on a 71/38 coated glass. It will be appreciated that this ratio of frit to binder solution is given by way of example and that other ratios may be used. For example, the ratio may be between ratios of 4:1 and 6:1.

Figure 14A:
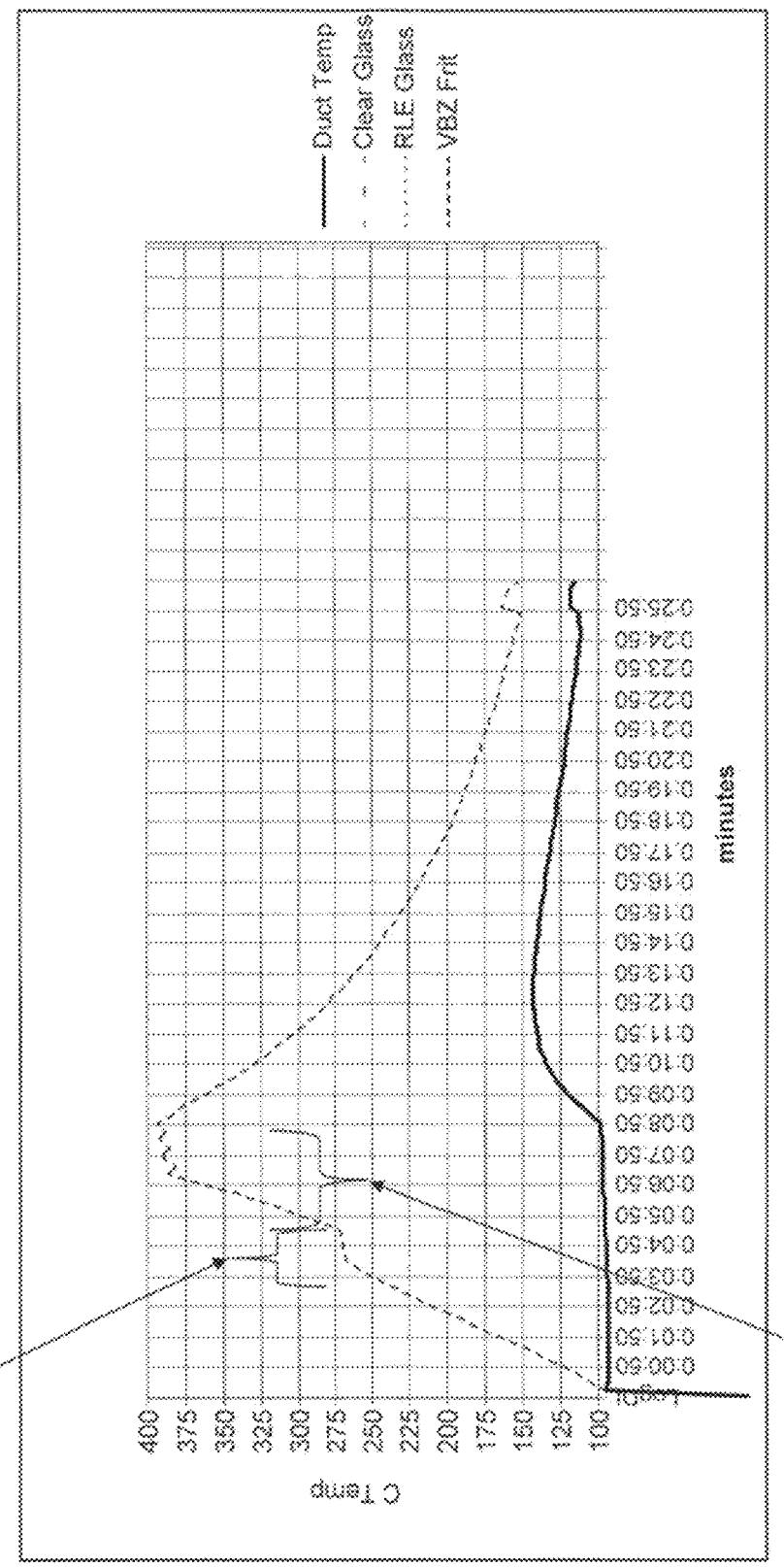
FIGS. 14A and 14B respectively show a heating profile graph and the example frit materials melted according to the heating profile.
Figure 15A:
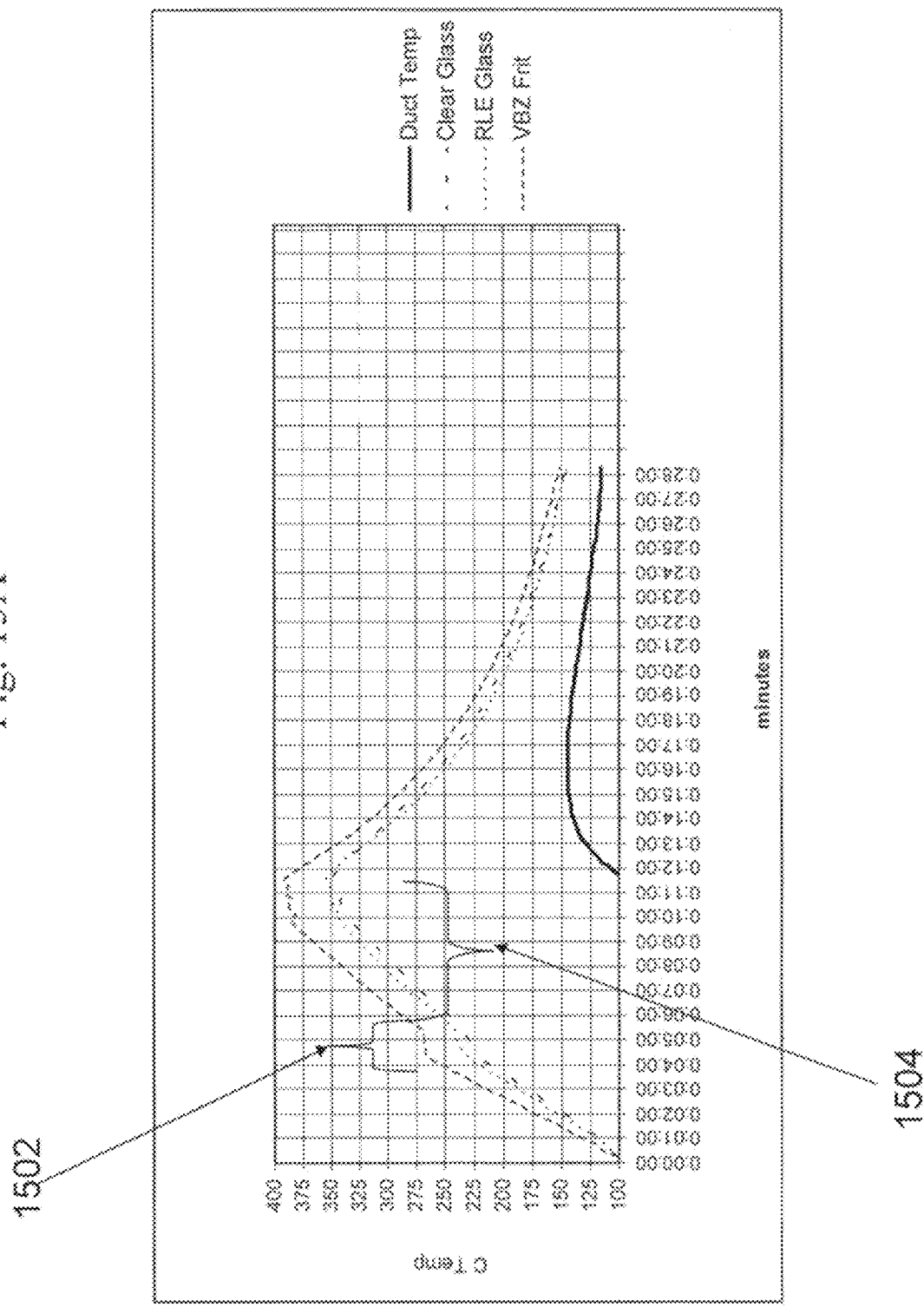
Figure 16:
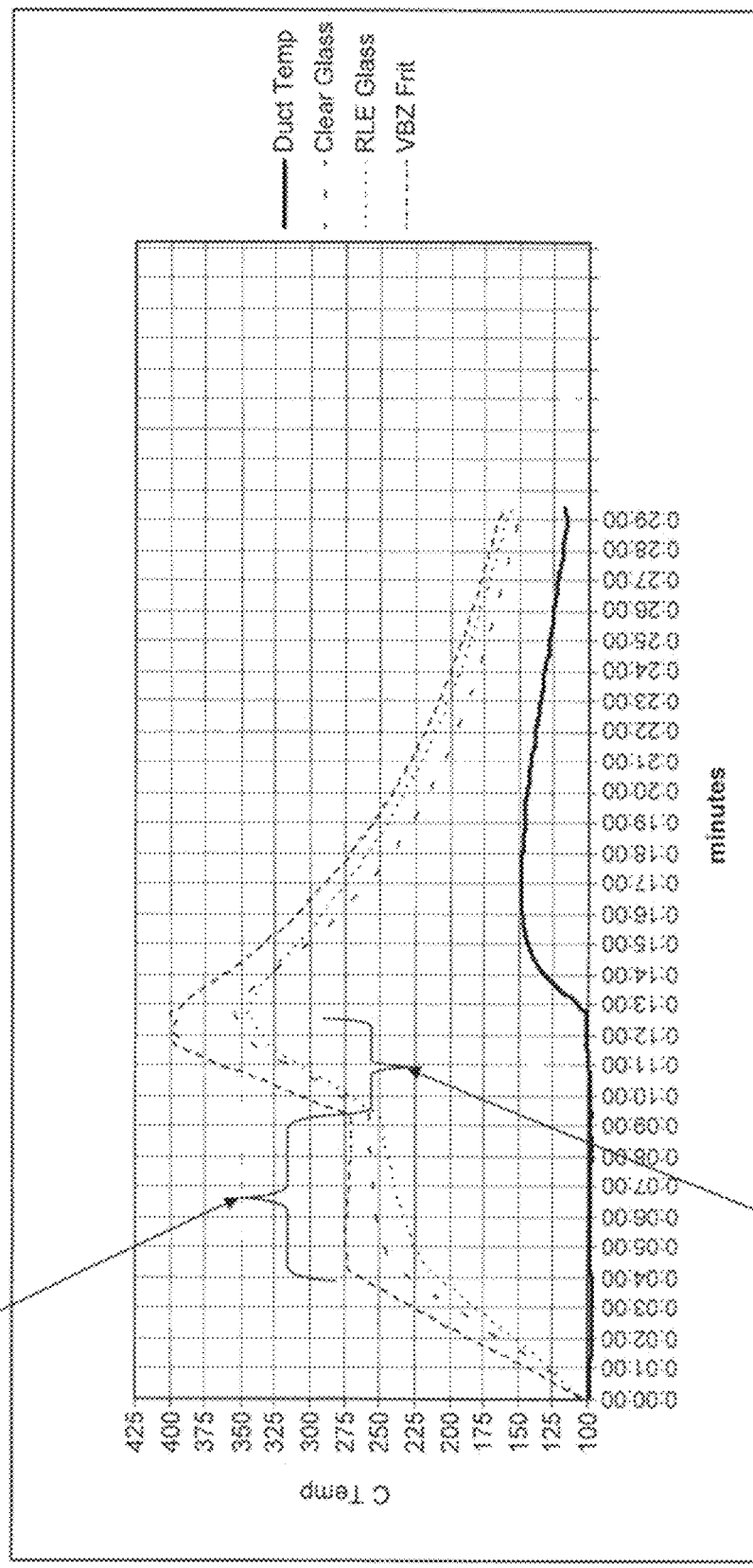
FIG. 16 shows yet another heating profile graph.

FIGS. 14A, 15A, and 16 are temperature vs. time graphs that each show various temperatures at varying times of an example frit material, a duct temperature (e.g., where the IR energy is applied), and two glass substrates that are respectively coated (e.g., with a low-E coating) and non-coated (e.g., "clear").

Figure 14B:
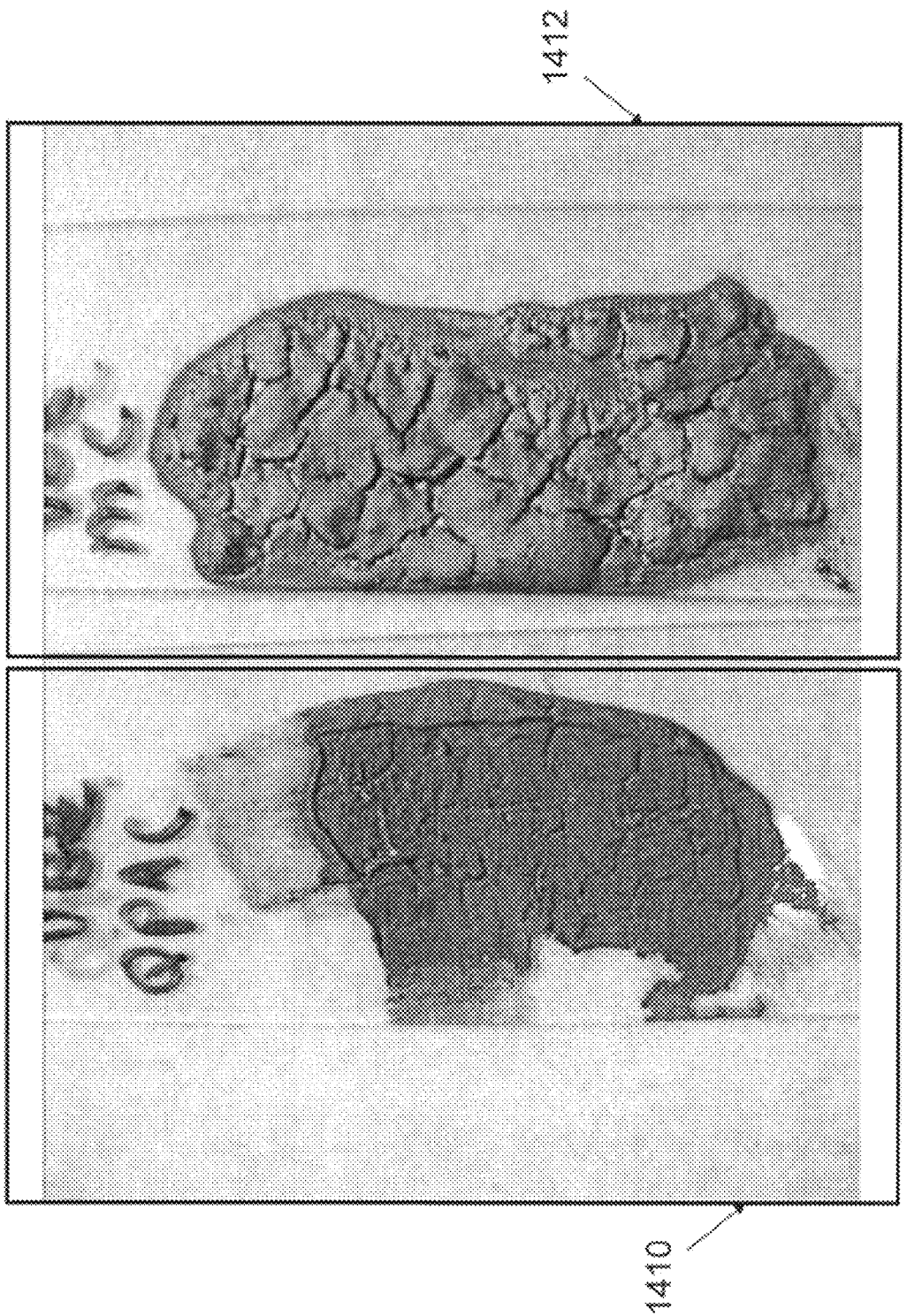

FIGS. 14A and 14B respectively show a heating profile graph and example frit materials melted according to the heating profile of FIG. 14A. The heating profile reflected in the graph of FIG. 14A included an approximately 1 minute hold time 1402 at around 270-275° C. Subsequent to this hold time, the temperature was increased to a frit melting temperature. The ramp time for this increase may be between 1.8 and 2.3 minutes or, more preferably, about 2.1 minutes.

FIG. 14B shows example frit materials that include different binding agents. The melted frit material 1410 included the above noted example 2 binding agent, whereas the melted frit material 1412 included the above noted exampled 1 binding agent. Frit 1410 had properties that included being fused and porous, not glassy, and/or delaminating from the substrate. Frit 1412 had properties that included being rough and poorly fused, not glassy, and and/or delaminating from the substrate.

FIGS. 15A and 15B respectively show another heating profile graph and the example melted frit materials according to the heating profile. The heating profile reflected in the graph of FIG. 15A included an approximately 1 minute hold time 1502 at around 265-275° C. Subsequent to this hold time, the temperature was increased to a frit melting temperature. The ramp time for this increase may be between 4.3 and 5.7 minutes, more preferably between about 4.5 and 5.2, and even more preferably between about 4.7 and 5 minutes. It will be appreciated that such an increased ramp time (e.g., over the example shown in FIG. 14A) may be achieved by reducing the IR voltage related to the energy applied to the frit material. For example, the voltage may be reduced from about 80% to around 50%. It will be appreciated that such percentages may be adjusted depending on the energy output of the heating elements involved in the melting process.

FIG. 15B shows example frit materials that include different binding agents. The melted frit material 1510 included the above noted example 2 binding agent, whereas the melted frit material 1512 included the above noted exampled 1 binding agent. Frit 1410 had properties that included having a glossy appearance (e.g., an increase over the frits shown in FIG. 14B) while being rough with no flowed look and delaminating from the substrate. Frit 1512 had properties that included being rough and cracking (e.g., indicating the binding agent is still present) and/or delaminating from the substrate. Such results may indicate that the binding agent is still present in the example frit material.

FIG. 16 shows yet another heating profile graph that may be used for applying energy to a frit material disposed onto a substrate. The heating profile reflected in the graph of FIG. 16A included an approximately 5 minute hold time 1602 at around 270-275° C. According to certain example embodiments, the hold time may be between about 235-290° C. Subsequent to this hold time, the temperature was increased to a frit melting temperature (e.g., 380-400° C. or less than 400° C.). The ramp time for this increase may be between 2 and 3 minutes, more preferably between about 2.2 and 2.8, and even more preferably about 2.4 minutes.

FIGS. 17-20 shows example frit materials that include different binding agents melted as a result of applying exemplary heating profiles. Frit materials 1702, 1802, 1902, and 2002 are based on a frit material that includes the above noted example 2 binding agent. Frit materials 1704, 1804, 1904, and 2004 are based on a frit material that includes the above noted example 3 binding agent. Frit materials 1706, 1806, 1906 and 2006 are based on a frit material that includes the above noted example 1 binding agent.

Figure 17:
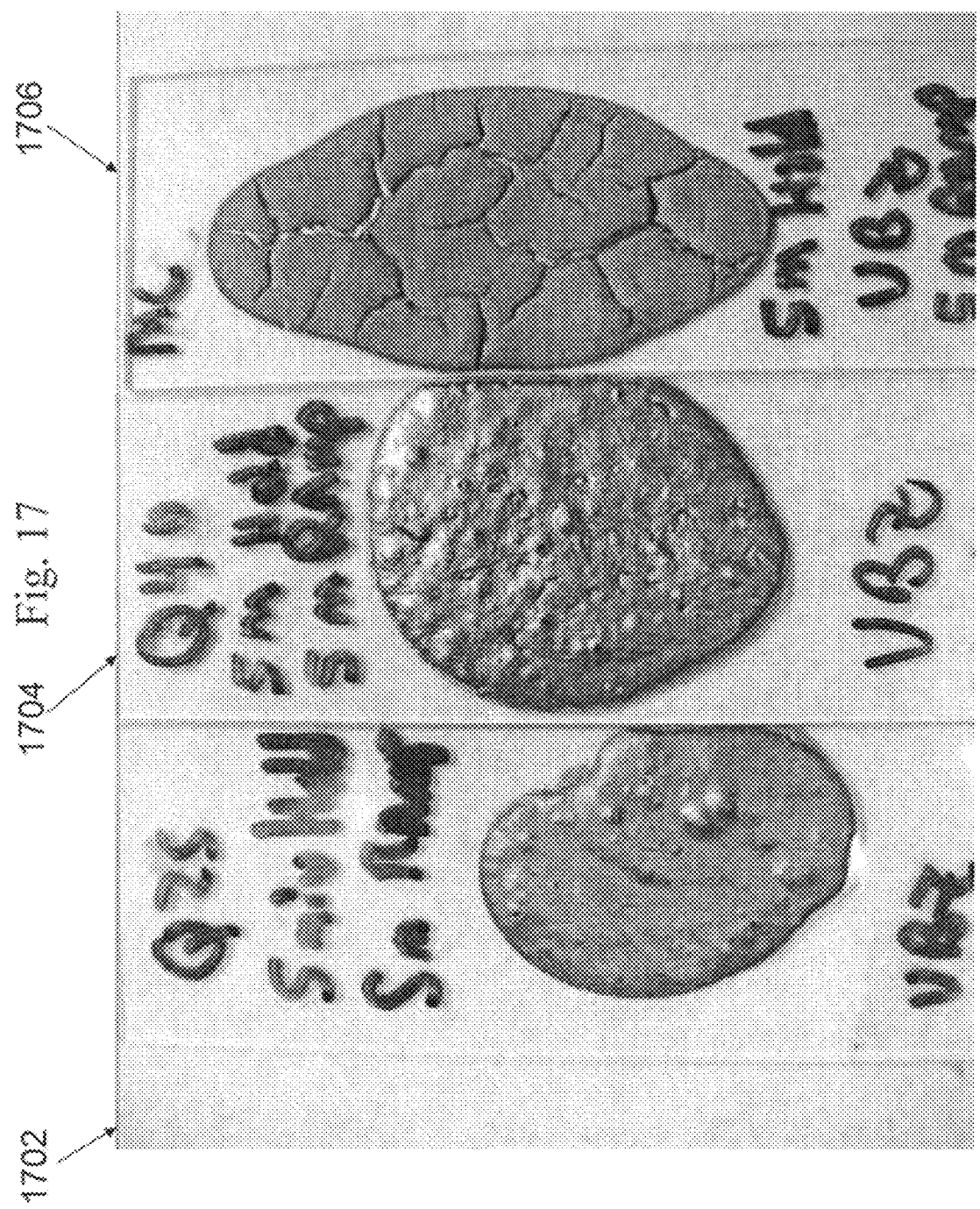
FIGS. 17-20 show example frit materials melted according to certain example embodiments.

In FIG. 17, the heating profile used included about a 5 minute hold time at around 275° C. with a subsequent 5 minute ramp time to seal (e.g., to the melting temp of the frit material) was used. Frit materials 1702 and 1704 both had good flow and solid bonds to the respective substrates. However, frit material 1706 was rough and not glassy and delaminated from the substrate.

Figure 18:
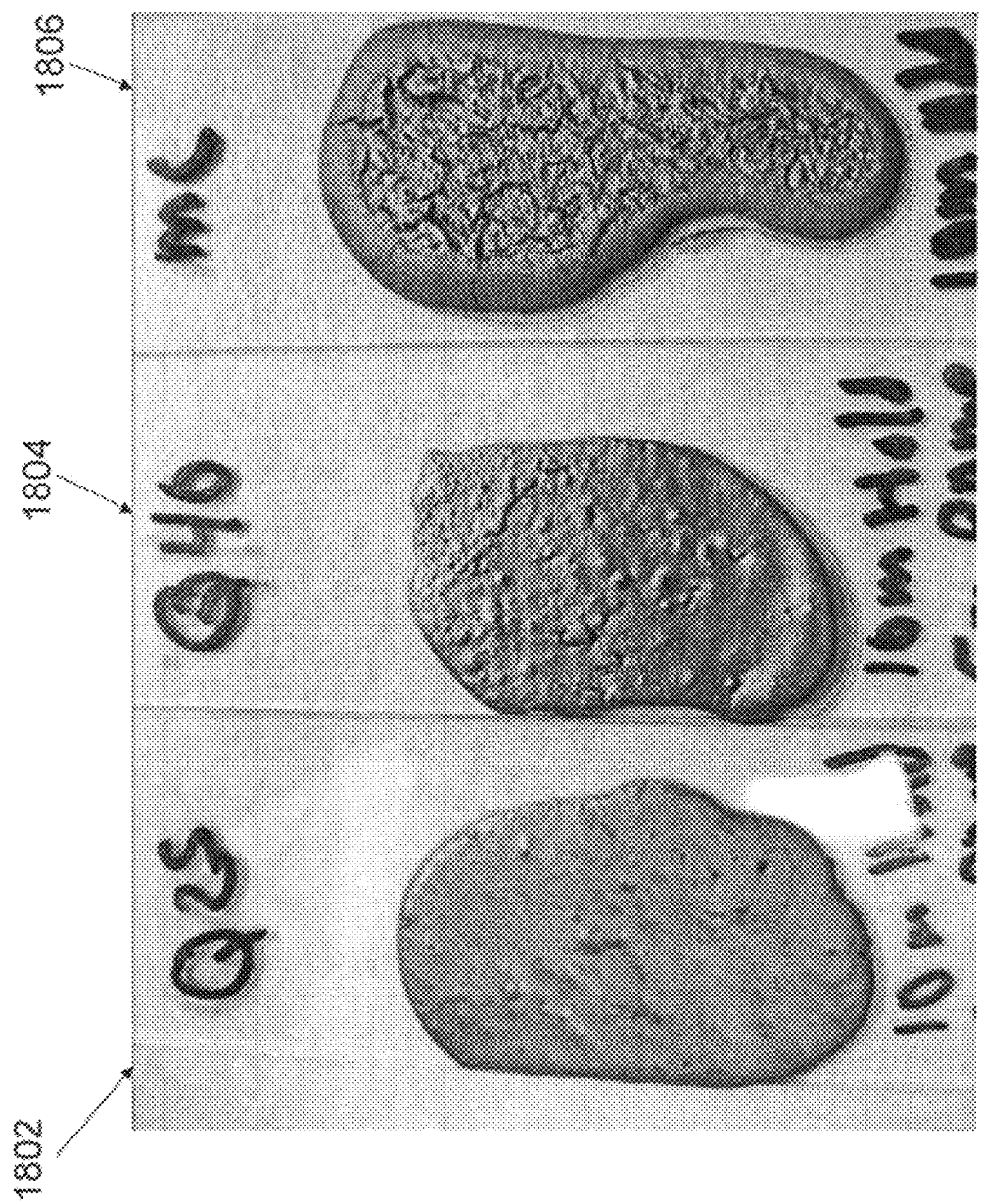

In FIG. 18, the heating profile used included about a 5 minute hold time at around 275° C. with a subsequent 5 minute ramp time to seal (e.g., to the melting temp of the frit material) was used. Frit materials 1802 and 1804 both had good flow, but delaminated some from the substrate. Frit material 1806 completely delaminated from the substrate. Also, while the edges of the frit may have melted, the roughness of the frit still was present in the melted version.

Figure 19:
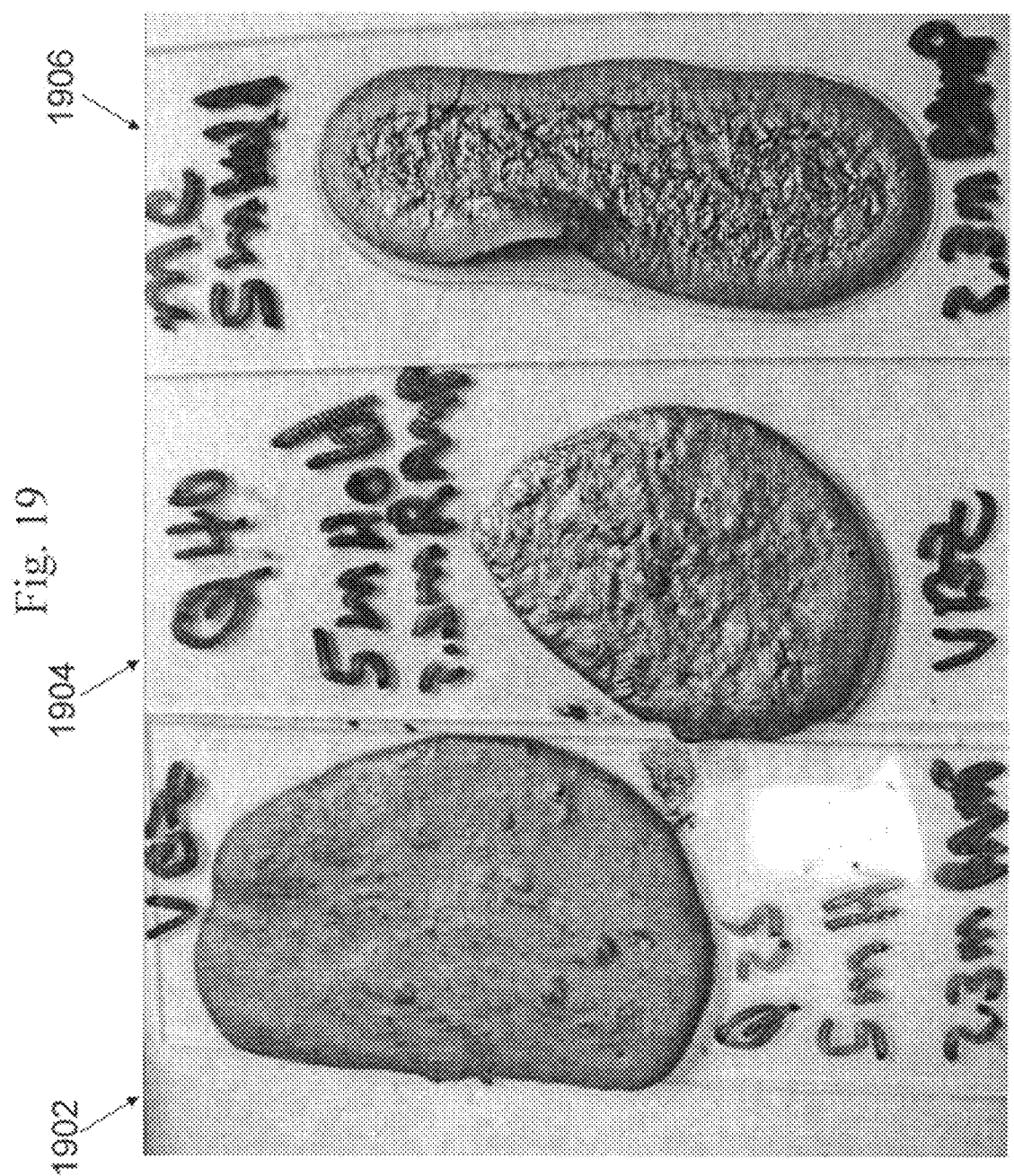

In FIG. 19, the heating profile used included about a 5 minute hold time at around 275° C. A subsequent 2.3 minute ramp time to seal (e.g., to the melting temp of the frit material) was used. Frit materials 1902 and 1904 both had a good melt along with a good bond to the respective substrates. Frit material 1906 had some melting along the edges, but still lifted off the substrate. Frit materials 1 and 2 may then, along with the heating profile used in FIG. 19, be applied to a glass substrate and may be used to form a VIG unit.

Figure 20:
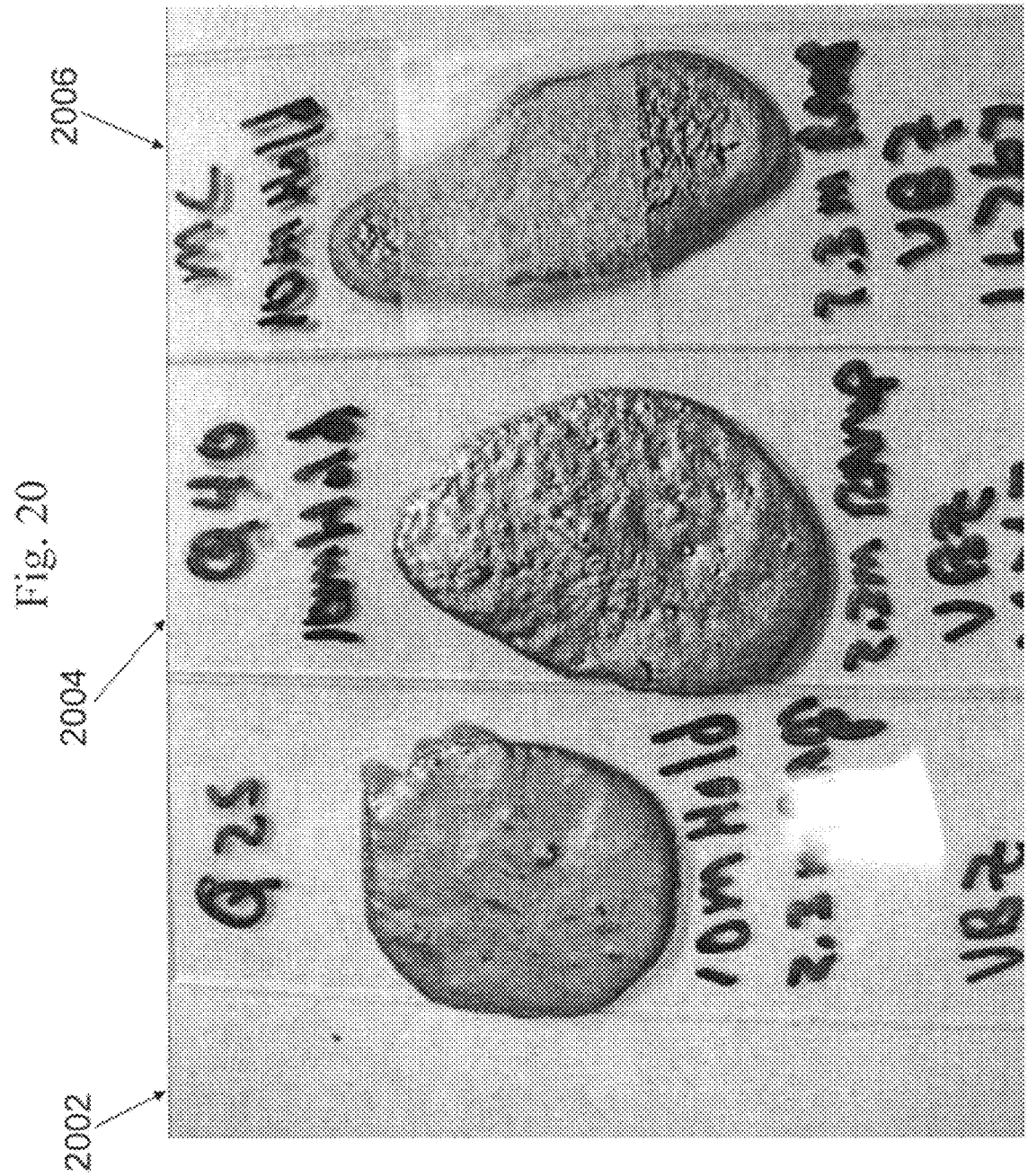

In FIG. 20, the heating profile used included about a 10 minute hold time at around 275° C. A subsequent 2.3 minute ramp time to seal (e.g., to the melting temp of the frit material) was used. Frit materials 2002 and 2004 both had good melts and adhesion to the substrate. Frit material 2006 had a relatively poor melt and completely lifted off the substrate slide.

While certain example embodiments may use a holding temperature of around 275° C., other temperatures between about 235° C. to 325° C., or more preferably between about 260° C. and 285° C. may be used. In certain example embodiments, a holding temperature may be less than about 300° C. In one example, a holding temperature of about 267° C. was used. In certain example embodiments, the temperature may vary, or slowly increase during this time period (e.g., to hold under a certain temperature or within a certain range for a period of time).

Furthermore, hold times using these and other hold temperatures may be used. For example, a hold time may be between 1 and 30 minutes, more preferably between about 2 and 15 minutes, and even more preferably between about 5 and 10 minutes may be used. In certain example embodiments, the hold time may be less than 5 or 10 minutes.

The named inventor of the instant application determined that in certain instances a burnout time that is too short (e.g., less than a minute) may lead to leftover carbon residue. Such a characteristic may be undesirable under certain conditions. The named inventor also determined that in certain conditions, an increased hold time (e.g., in excess of 30 minutes) may result in the frit material having a reduced bond strength to an underlying substrate. Accordingly, it will be appreciated that a length of time used to "burn out" a binder solution may influence a quality of the frit (e.g., the frit to substrate seal). For example, certain example timeframes as disclosed herein may be used to reduce (or in some cases eliminate) the negative effects of the above undesirable characteristics.

Also, in certain example embodiments, the ramp time to the sealing temperature may vary between about 1 minute and 10 minutes, more preferably between about 2 and 5 minutes. Certain example embodiments may employ a ramp time of less than 5 minutes, or more preferably less than 3 minutes. Accordingly, certain example embodiments may use relatively reduced ramp times (e.g., times that are less than the holding temperature).

Figure 21:
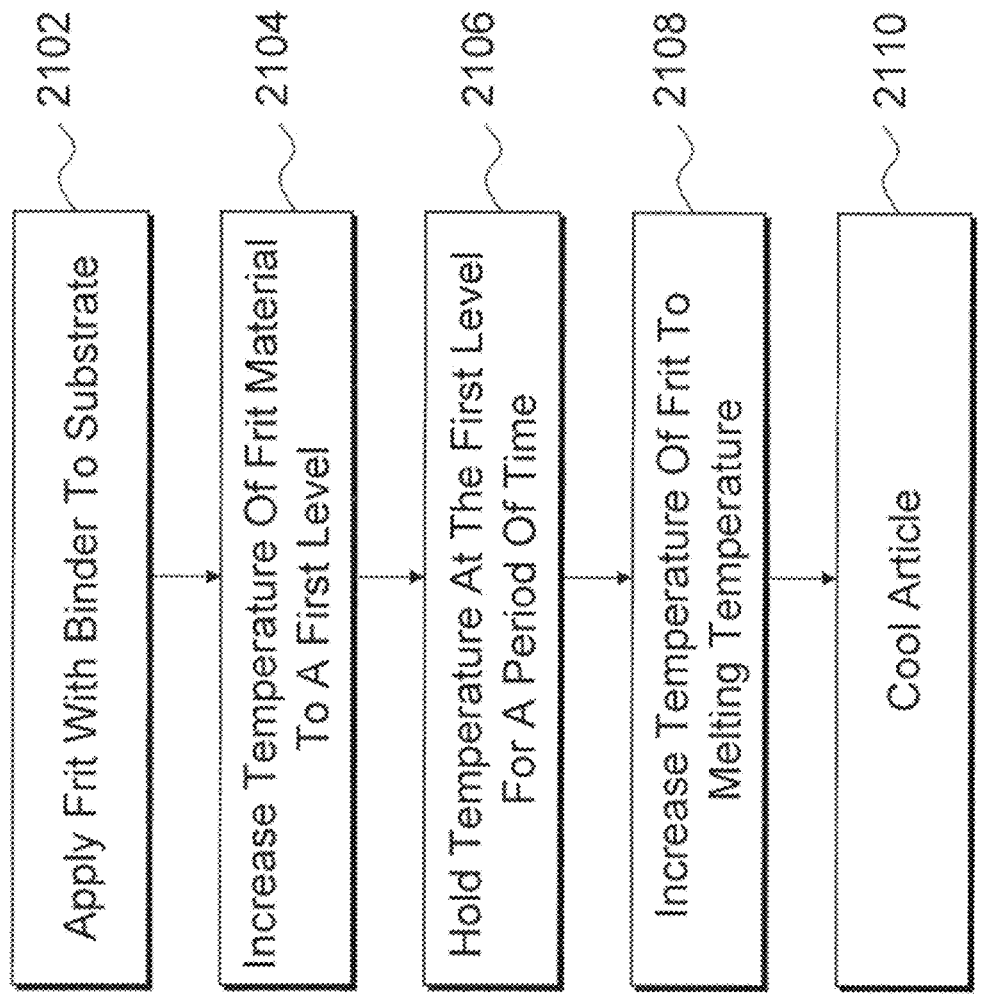
FIG. 21 is a flowchart illustrating a process for melting a frit material onto a substrate according to certain example embodiments.

FIG. 21 is a flowchart illustrating a process for melting a frit material onto a substrate according to certain example embodiments. In step 2102, a frit that includes a binder is applied to a substrate. In step 2104, the substrate is then disposed in an environment that raises the temperature of the frit material applied to the substrate to a first level. Such a temperature may be between about 200° C. and 350° C., or more preferably between about 250° C. and 300° C., or even more preferably about 275° C.

In step 2106 the temperature of the frit material is held at a relatively stable level for a period of time, e.g., between about 1 and 10 minutes, or about 5 minutes. The temperature of the frit is then raised to the melting temperature of the frit in step 2108. This may happen over a period of less than about 5 minutes, more preferably less than about 3 minutes, or even more preferably about 2.3 minutes. In step 2110, the substrate, frit, and other entities are then cooled. As a result, the frit material may be bonded to the substrate, and the binder material that was originally included with the frit may be substantially or completely burned off.

It will be appreciated by those skilled in the art that CTE adjustments may be carried out on the overall frit material (e.g., the compound) for the glass wetting and bonding properties of the frit to cooperate with an underlying substrate (e.g., a glass substrate). In certain example embodiments, CTE matching compounds may be added for these and/or other purposes.

One traditional CTE filler material that may be used with certain example frit materials may be lead titanate. However, as discussed above, usage of lead as a CTE filler may be commercially impractical, e.g., due to laws concerning the presence of lead in certain products (e.g., windows). Accordingly, non-lead based CTE filler material may be desirable in some cases.

In certain example embodiments, CTE filler material may be mixed in the form of a powder (e.g., spherical silica—vacuum bubbles) or microspheres with a frit material to form a sealing material that is used on one or more substrate(s).

For example, the following glass bubbles were tested with an example vanadium based frit material. The type in table 12 refers to a type of glass sphere available from the 3M Company.

TABLE 12

Example Glass Bubbles

| Type | Crush Strength (psi) | Density (gm/cm$^3$) | Thermal Conductivity | Particle Size |
|---|---|---|---|---|
| K37 | 3,000 | 0.37 | 0.124 | 45 |
| S60 | 10,000 | 0.6 | 0.2 | 30 |
| 560 H | 18,000 | 0.6 | 0.2 | 29 |
| IM30K | 28,000 | 0.6 | 0.2 | 15 |

Figure 22:
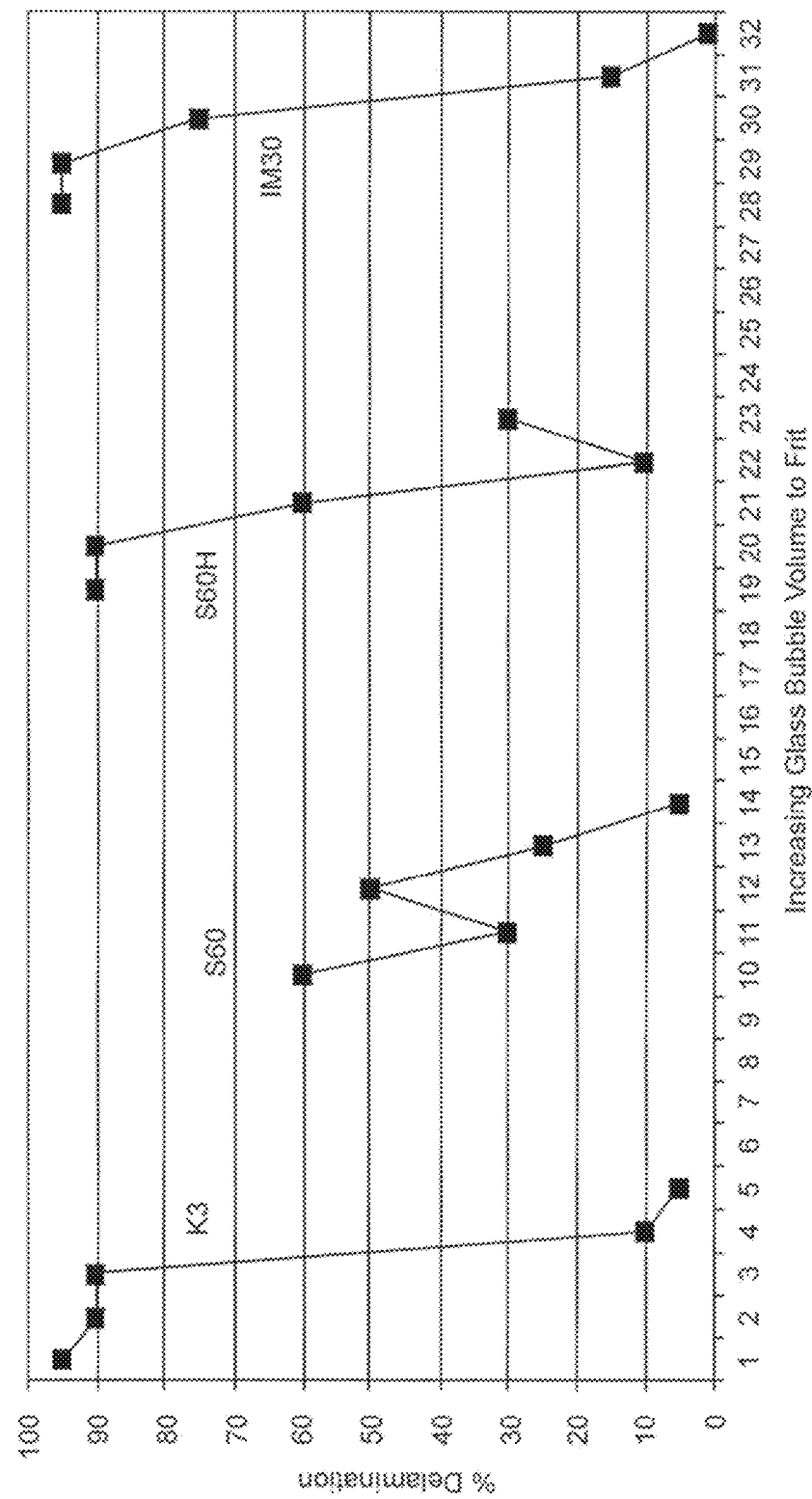
FIG. 22 shows a graph illustrating the delamination properties of certain example materials.

As will be appreciated, the larger the bubble size the weaker mechanically the glass is (e.g., as shown in the crush strength). The inventor of the instant application determined that the IM30K example achieved results that were improvements over the other types in table 12. Further, the inventor determined that increasing the ratio of glass bubble volume to frit material may reduce the amount of delaminating of the sealing material from a substrate. In other words, as the amount of glass bubbles (e.g., in grams) to frit material is increased, the amount of delaminating to an example glass substrate may decrease. FIG. 22 shows an example of the above noted materials and how they delaminate when applied to a substrate. The data points from left to right in the graph represent increases in volume of the filler material used. In certain instances, by percent of volume, the glass sphere volume may be greater than that of the frit volume. For example, the spheres (by volume) may be 100% to 150% of the frit material.

In certain example embodiments, a CTE filler that is based on molybdenum (Mo) may be used. Molybdenum may have a linear ppm CTE of about 4.8. The inventor of the instant application determined that molybdenum in a spherical form may perform with increased efficiency than other molybdenum based particles. In certain example embodiments, shapes with a size of less than about 150 mesh or more even less than about 170 mesh may be used with certain example VBZ frit materials.

A CTE filler that includes molybdenum spheres of between about 0.8 and 1.5 grams per 2.5 grams of frit material may produce improved compatibility with the base VBZ frit material and increase bond strength to an example glass substrate. In certain example embodiments, 1.0 grams of CTE filler per 2.5 grams of frit material may be used. In certain preferred embodiments, a frit material may be combined with about a 1.2 grams of molybdenum spheres (e.g., per 2.5 grams of frit material).

The inventor determined that use of spherical forms in CTE fillers may increase the effectiveness of restraining the frit matrix when compared to random shapes of conventional particle fillers. In such instances, spherical sizes may correlate to how a frit material with CTE filler may adhere to a glass substrate.

Figure 23B:
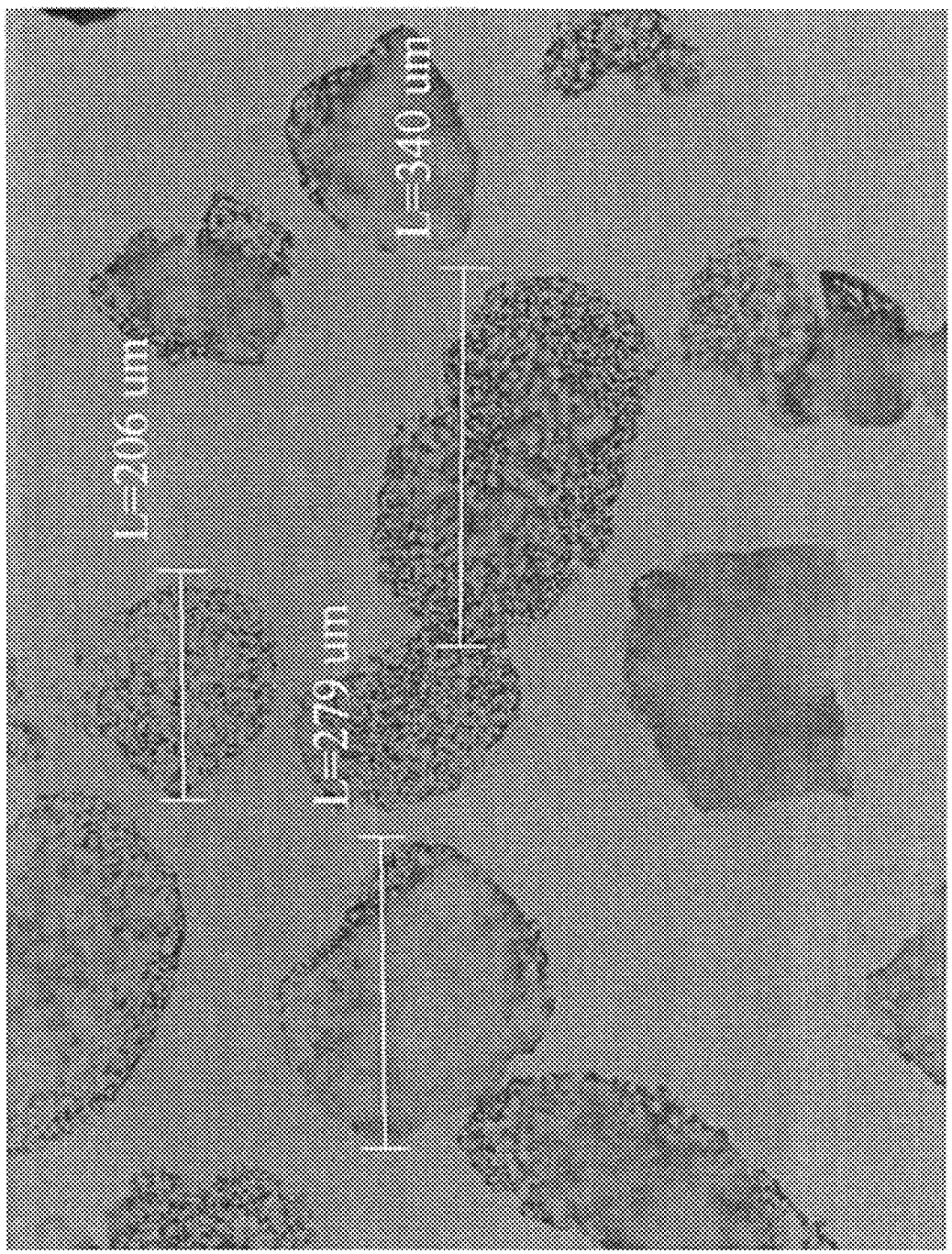
Figure 23C:
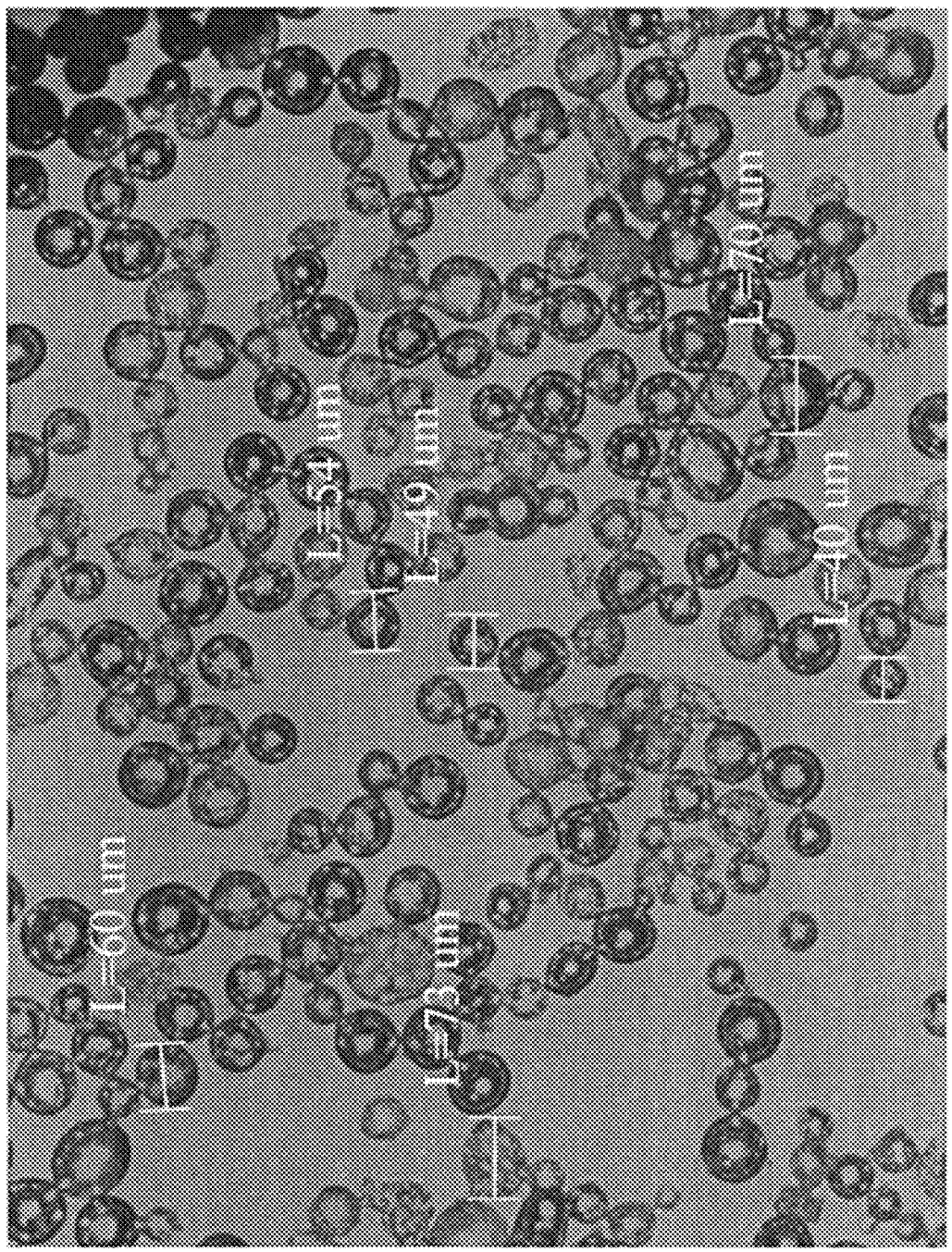

FIGS. 23A-23C show example microscope images of the spheres of certain example molybdenum materials. Such materials may be obtained from, for example, H. C. Starck and/or Alfa Aesar (a Johnson Matthey Company). FIG. 23A shows molybdenum spheres that are approximately 80 microns in diameter or major distance with some small variation in sizes, and the shapes being mostly round (e.g., spherical) and/or oblong. FIG. 23B shows spheres that are larger than those in FIG. 23A and that generally are in the 280-340 micron diameter or major distance range. As can be seen, the shapes in this molybdenum sphere example may be increasingly erratic, ragged, and/or sharp. FIG. 23C shows molybdenum spheres that are smaller than those of FIG. 23A. Here, the spheres are generally round and between about 40 and 70 microns in diameter or major distance.

In certain instances, the size of a sphere may affect the CTE matching properties of a CTE material. It has been observed that small particles (e.g., <5 microns in diameter or major distance) tend to dissolve into the frit during firing and contaminate the frit glass. It is noted that typical CTE fillers tend to have a significant amount of particles <5 microns in size. Additional dissolved compounds can upset the composition of the frit glass and change its sealing properties for the worse, unless it has a high tolerance for such contaminates (such as traditional lead frits). On the other hand, larger particles tend to have less surface area per mass, so the amount of dissolved contaminate tends to be significantly less. Thus, for example, a sphere size in the approximate range of those spheres shown in FIG. 23A may be preferred. Accordingly, certain example CTE fillers may have spheres in a size range between about 60 and 100 microns, more preferably between about 70 and 90 microns or, for example, about 80 microns in sphere diameter or major distance size.

It will be appreciated that not all of the spheres or material within a given portion of CTE filler may fit such criteria (e.g., smaller/larger particles or non-sphere shaped particles). Thus, certain example embodiments may be comprised of between 80% and 100% of the above identified sphere sizes, with the remainder of the particles and/or spheres being outside such a sphere size (e.g., spheres/particles that are greater than 100 microns or particles/spheres less than 60 microns). Additionally, not all of the "spheres" may be perfectly spherically shaped. Indeed, as shown in FIG. 23A some of the "spheres" may be partially or substantially spherically shaped (e.g., oblong in shape or erratically, spherically shaped). Thus, the particles that are used in certain CTE fillers may be "substantially" spherical. For example, more than half or 60% of the objects in a given CTE filler material may be "substantially" spherical, more preferably at least 80%, and even more preferably at least 95%. In certain instances, a percentage of spherically shaped elements in a CTE filler that are within a range of 60 to 100 microns may comprise at least 90% by volume of the CTE filler, more preferably at least 95%, and even more preferably at least 98%.

It will be appreciated that small particles sizes (e.g., <1 micron) may also be present in the initial CTE filler material.

Thus, in certain instances for metals, heat may be used to consolidate the powdered metals into spherical or oblong shapes. This process may decrease or otherwise eliminate the finer powder, e.g., <1 micron particles. In other words, tiny particles may dissolve in the frit glass matrix and have negative impacts on the sealing properties. Larger particles with less surface area per weight may have a more controlled and enhanced effect on CTE expansion properties. Further, less spherical material may be needed to obtain a similar CTE value than would a powder of the same material.

In certain instances, the surface chemistry of the spheres (or other shapes) may be modified to improved CTE matching properties and/or the mechanical strength of the spheres (e.g., to withstand the stress of a VIG article).

In certain example embodiments, the following materials may be used in conjunction with a frit material for CTE matching the frit to a glass substrate: $Cu_2P_2O_7 \times H_2O$ (e.g., Copper Pyrophosphate Hydrate); $Mg_2P_2O_7$ (e.g., Magnesium Pyrophosphate); $SnP_2O_7$ (e.g., Tin Pyrophosphate—improved compatibility with at lower additions (e.g., 0.2-0.5 gm per 2.5 gm of frit material)); W (Tungsten powder—improved compatibility with frit materials at high addition levels (e.g., 1 to 1.5 gm per 2.5 gm of frit material)); Fe/Ni 65:35 wt % (e.g., Invar Alloy—improved compatibility with frit materials at higher addition levels (e.g., 0.6-0.8 gm per 2.5 gm of frit material)). Such materials (e.g., Invar) may be spherical in shape as the molybdenum material discussed above. Further, certain materials (e.g., Invar) may have decreased CTE—1.2 ppm—and may therefore lower the additional weight added to a frit to obtain CTE matching. In certain instances, ceramic fillers may be used that are in spherical form (or substantially spherical form). In certain example embodiments, quartz may be used. The quartz may be provided in the form of the spheres described herein. As the CTE of quartz is about 0.6, less material than other materials described herein may be needed in order to obtain a CTE match against a given substrate. One aspect of certain example embodiments relates to a filler that is inert and does not react with the molten frit glass during firing.

In certain example embodiments, Zirconium Tungstenate (e.g., Zirconium Tungsten Oxide or $ZrW_2O_8$) powder may provide acceptable CTE matching for certain example frit materials with a soda lime float glass (e.g., with linear CTE for the glass being between about 7.0-11.0 ppm). However, as $ZrW_2O_8$ may be relatively expensive, such a CTE filler may be commercially impractical for some mainstream applications. However, it will be appreciated that where cost is not an issue (or the overall price of the CTE filler decreases), such a CTE filler may be used in conjunction with certain example frit materials described herein. In certain example embodiments, a Zirconium Tungstenate based filler may use spherical shapes instead of particles (e.g., powder).

In certain example embodiments molybdenum spheres may be combined with glass bubbles (e.g., other particles). For example, 0.3-0.5 gm by weight of molybdenum spheres combined with 0.2-0.3 gm by weight of IM30K or between 0.15-0.35 by weight of $ZrW_2O_8$ and 0.2-0.3 gm of IM30K may be used according to certain example embodiments. In certain example embodiments, two or more of the discussed CTE fillers may be combined to form a combined CTE filler material.

Figure 24:
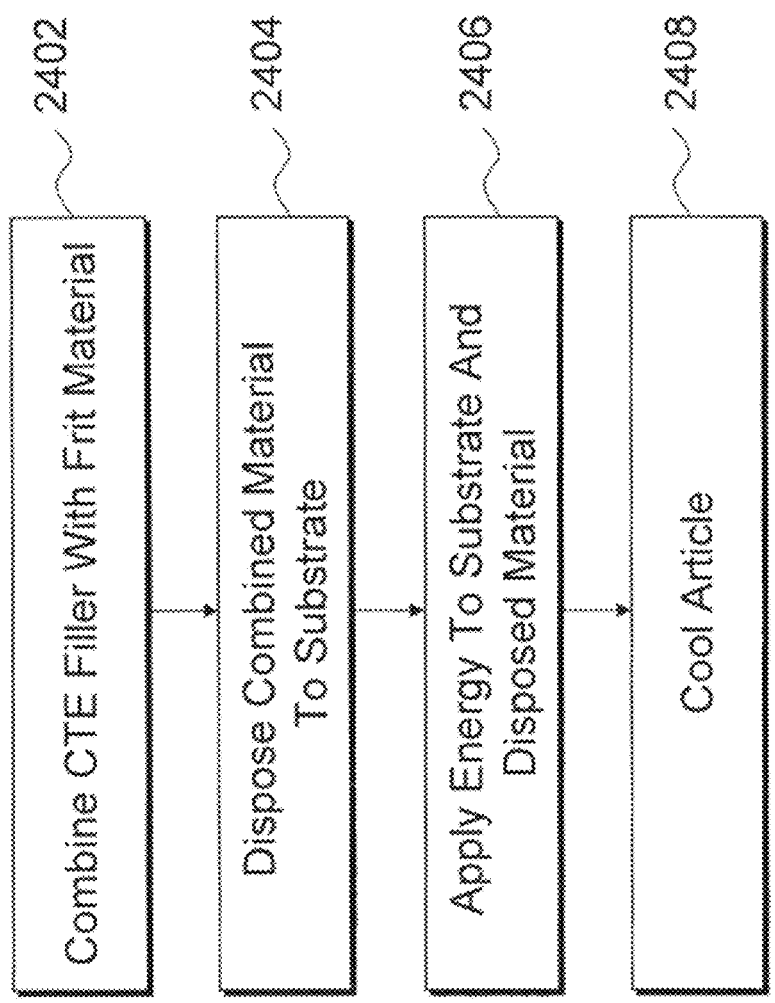
FIG. 24 is a flowchart illustrating a process for creating an article according to certain example embodiments.

FIG. 24 is a flowchart illustrating a process for creating an article according to certain example embodiments. A CTE filler is combined with an exemplary frit material (e.g., a VBZ frit) in step 2402. The combined material is then disposed on a substrate in step 2404. For example, the substrate may be a soda lime float glass substrate. In certain instances, e.g., the creation of the VIG unit, another substrate may be applied with a gap between the two substrates. In any event, energy (e.g., IR energy) may be applied to the glass and/or the combined material to thereby melt the material in step 2406. After melting, the combined material, and the substrate(s) or article may be cooled or allowed to cool in step 2408.

In certain example embodiments, the CTE of a frit material including an exemplary CTE filler may be within about 15% of the CTE of a substrate, more preferably within about 10%, even more preferably within about 5%, and even more preferably within about 3%. For instance, it is known that glass has a CTE of 8.6 ppm, e.g., over a temperature range of about 25-300 degrees C. It would be desirable to provide a CTE filler material that is less than or equal to this value. For instance, a CTE of 8.0 ppm over the same or similar range would be desirable. Doing so will keep the glass in a state of compression, which is desirable.

Although certain example embodiments have been described as relating to spherical or generally spherical CTE fillers, other shapes may be used in place of or together with such shapes. For instance, football, eye-shaped, cylindrical, elongated, whisker-shaped, and/or other type particles may be used. Such shapes may be symmetrical and/or symmetrically curved in some example cases. In certain example embodiments, the shapes shown in FIG. 23B and/or 23C may be used with sizes between, for example, 60-100 microns.

Moreover, it is to be understood that there may be some variation in a particular size and/or shape material. However, in the aggregate, the material distributions should generally have the specified sizes/shapes.

In certain example embodiments, the weight of an example CTE filler (e.g., of molybdenum spheres) may be between about 20 to 40 percent to frit weight. In other words, the weight may range from 1 gram of CTE filler for every 4 grams of frit material to 2 grams of CTE filler for every 5 grams of frit material. More preferably, the percentage may be between about 30 to 35 percent. In certain example embodiments, the percentage may be about 32 percent (e.g., 1.2, by weight, CTE filler to 2.5, by weight, frit material). It will be appreciated that such a percentage may vary (e.g., by 5 to 10 percent). In certain example embodiments, different sized spheres may be combined or mixed to form exemplary CTE fillers that are used in connection with certain frit materials described herein. For example, particles or spheres between about 40-80 microns may be combined with particles/spheres between about 80 and 160 microns to form a CTE filler.

In certain instances, for the compositions described herein (e.g., in table 15), were made using 14.8 gram of total mixture on a 25 mm die and pressed at 1000-1200 psi. The buttons were fired at 400 degrees C. for 20 minutes and immediately cooled and removed from a convection oven. Also, in certain instances the frit material and CTE filler (e.g., of or including molybdenum spheres) were weighed out and inter mixed using alumina cylinders in a shaker jar.

Certain example molybdenum spheres may have the example properties shown in the table below.

TABLE 13

| Density | Approx | 2.8 g/cc | |
|---|---|---|---|
| Screen Analysis | | | |
| Mesh | Micron | | |
| 140 | 105 | 0.5 | % |
| 170 | 88 | 5.0 | % |
| 200 | 74 | 25.5 | % |
| 230 | 63 | 38.4 | % |
| 270 | 53 | 8.5 | % |
| 325 | 44 | 1.4 | % |
| Pan | Fines | 21.2 | % |
| | | 100 | |

TABLE 14

| | | | | | | | | | | | | |
|---|---|---|---|---|---|---|---|---|---|---|---|---|
| Chemistry-ppm | | | | | | | | | | | | |
| Al | Ca | Cd | Cr | Cu | Fe | Mg | Mn | Ni | Pb | Si | Sn | Ti | Zr |
| 62 | 8 Oxygen 3979 | 0 | 135 | 8 | 677 Carbon 27 | 8 | 14 | 205 | 3 | 172 | 2 | 5 | 1 |

Figure 25:
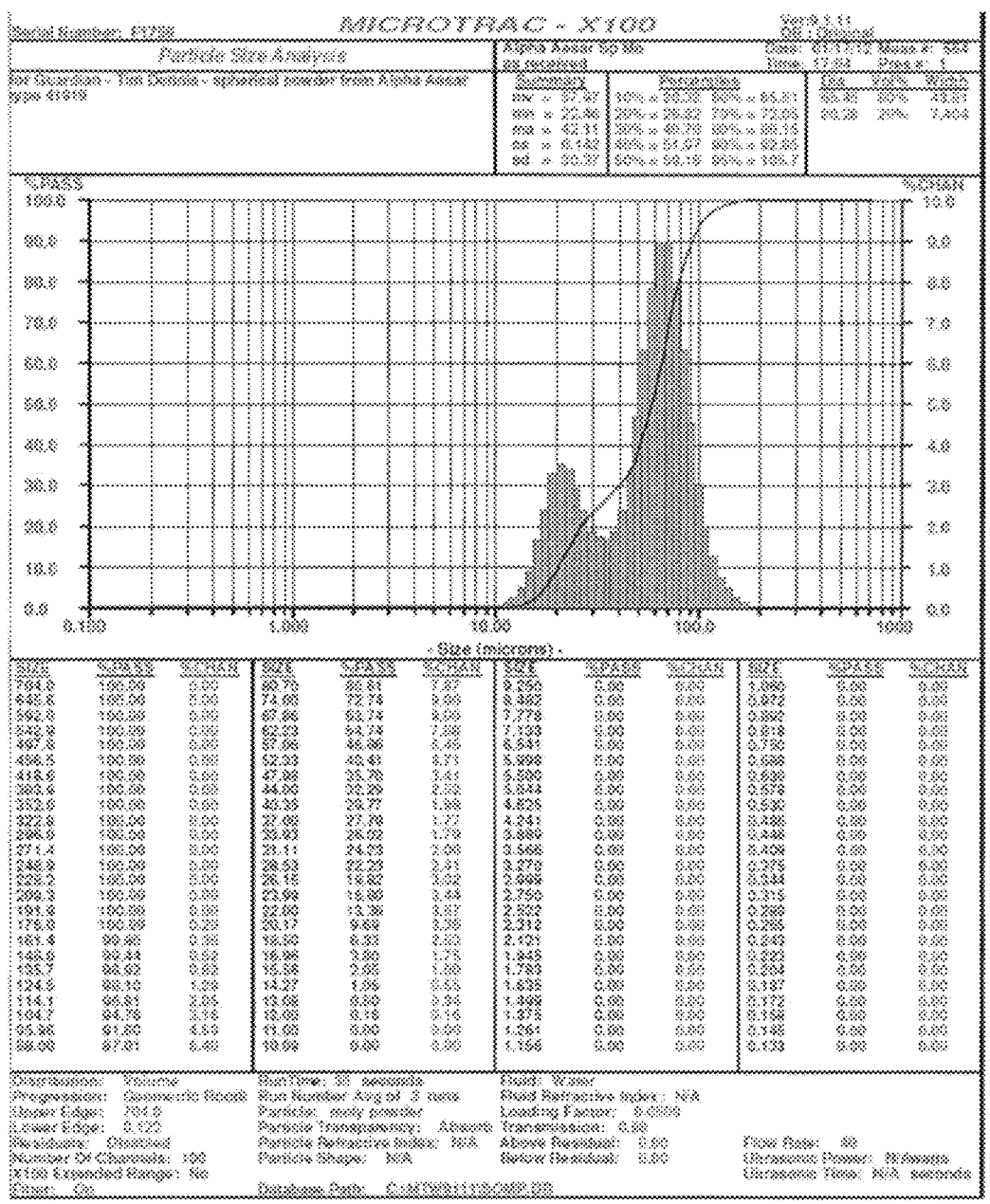
FIG. 25 shows a size distribution of example particles in connection with certain example embodiments.

FIG. 25 shows a size distribution of example particles in connection with certain example embodiments. Here, the spherical powder from type 41919 from Alpha Aesar is shown.

Figure 26A:
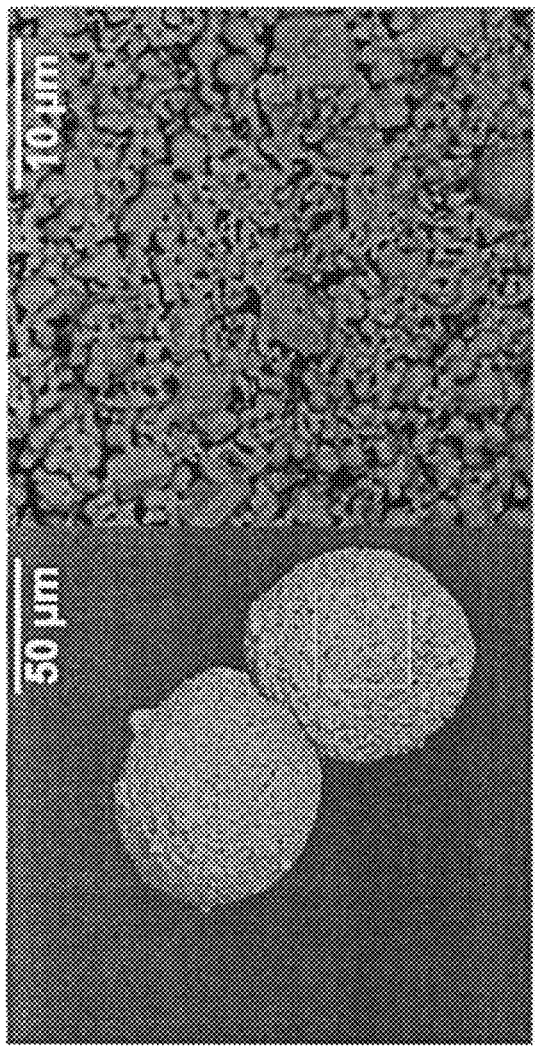
Figure 26B:
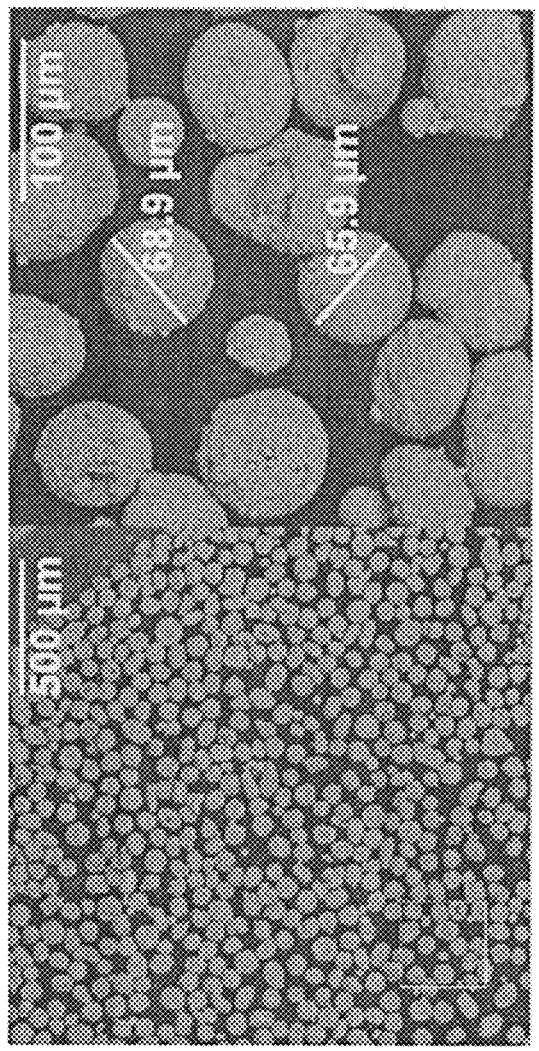

FIGS. 26A-26F are microscope images of example particles according to certain example embodiments. In particular, these images are from a scanning electron microscope. FIGS. 26A and 26B show that the spheres may be fused conglomerates of smaller molybdenum particles in some cases.

FIG. 26C shows molybdenum spheres from HC Starck that are classified as "RTP." These spheres may be 325 mesh of <40 micron in size (e.g., includes fine particles). As can be seen FIG. 26C, spheres of 22 um, 35 um, 40 um, 45 um, and 73 um are identifiable.

Figure 26D:
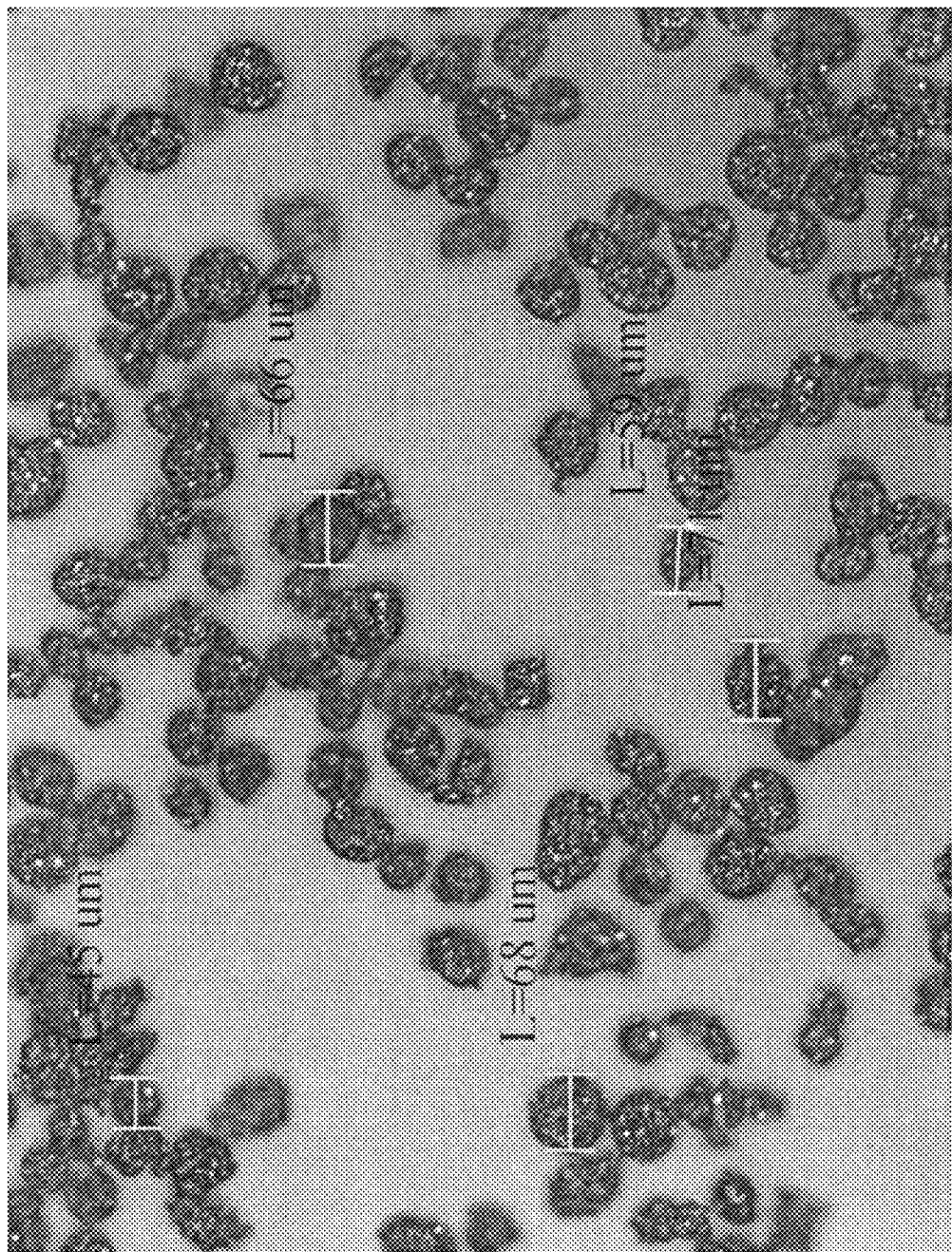

FIG. 26D shows molybdenum spheres from HC Starck that are classified as "S2." These spheres may be between about 40 and 70 microns in size. As can be seen FIG. 26D, spheres of 45 um, 59 um, 66 um, 68 um, and 71 um are identifiable.

FIG. 26E shows molybdenum spheres from HC Starck that are classified as "S3." These spheres may be between about 70 and 90 microns in size. As can be seen FIG. 26E, spheres of 76 um, 82 um, and 87 um, are identifiable.

Figure 26F:
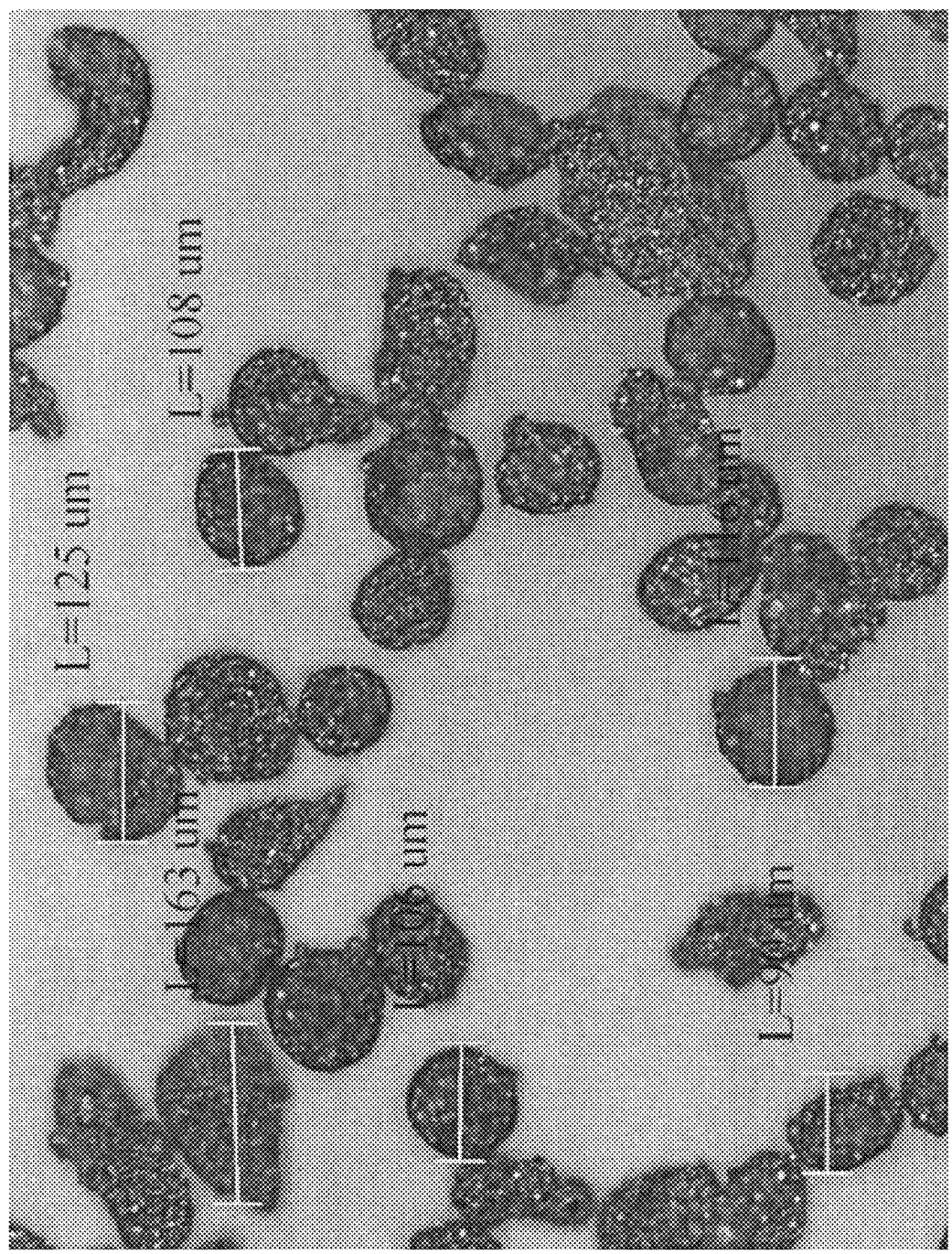

FIG. 26F shows molybdenum spheres from HC Starck that are classified as "S4." These spheres may be between about 90 and 160 microns in size. As can be seen in FIG. 26F, spheres of 90 um, 106 um, 108 um, 116 um, 125 um, and 163 um are identifiable.

Table 15 below shows frit buttons with different CTE fillers included with the frit material. Each of batches 1-13 had about 10 grams of frit material combined with Alfa Aesar molybdenum spheres, the S2-S4 varieties described above, RTP type, or some combination thereof. These compositions were then fired as described above. Specifically, in certain instances, a powder button may be initially 25 mm. Based on such a button, certain example compositions may have flow values between about 30-35 mm (e.g., where higher flow values typically may be better). In certain example embodiments, a flow value of at least 30 mm may be preferred. However, flow values of about 29 mm may be used according to certain example embodiments. A 27 mm flow may indicate a thick glass viscosity at the sealing temperature. Accordingly, for these example buttons, increased flow (e.g., in mm) may translate into increased or improved sealing properties. For example, higher flow values may indicate lower glass viscosity at a sealing temperature.

TABLE 15

| Batch # | Alfa | S2 | S3 | S4 | RTP | S3/S4 | mm flow | Comment |
|---|---|---|---|---|---|---|---|---|
| 1 | 4.8 | | | | | | 26.70 | Glassy-Control |
| 2 | | 4.8 | | | | | 26.51 | Not glassy, no flow, cracked |
| 3 | | | 4.8 | | | | 27.00 | |
| 4 | | | | 4.8 | | | 26.46 | |
| 5 | | | | | 4.8 | | 25.94 | Not glassy, no flow, cracked |
| 6 | | 1.2 | 0.96 | 2.54 | | | 27.10 | HC Starck production fractions |
| 7 | | 2.7 | 2.08 | | | | 27.03 | Not glassy, no flow |
| 8 | | | 1.2 | 3.6 | | 0.33 | 28.61 | |
| 9 | | | 1.3 | 3.5 | | 0.37 | 28.92 | |
| 10 | | | 1.4 | 3.4 | | 0.41 | 28.48 | |
| 11 | | | 1.6 | 3.2 | | 0.5 | 28.30 | |
| 12 | | | 1.8 | 3.0 | | 0.6 | 28.58 | |
| 13 | | | 2.0 | 2.8 | | 0.71 | 28.52 | |

In table 15 above, batch 9 showed flow properties that, relative to the others tested, were increased. Further, batches 8, 12, and 13 provided increased good flow characteristics. Also, batches 10 and 11 provided flow characteristics that were in excess of 28 mm.

FIG. 27 is a graph with flow properties of certain example particle types. In comparison to the Alfa spheres, the S2 and S4 sphere types may have slightly reduced characteristics, while S3 may have improved flow characteristics. Also, in certain instances in these tests, the RTP and S2 types produced cracked VBZ buttons. In such circumstances, such batches may exhibit reduced capacity mechanical properties, which is undesirable.

Figure 28:
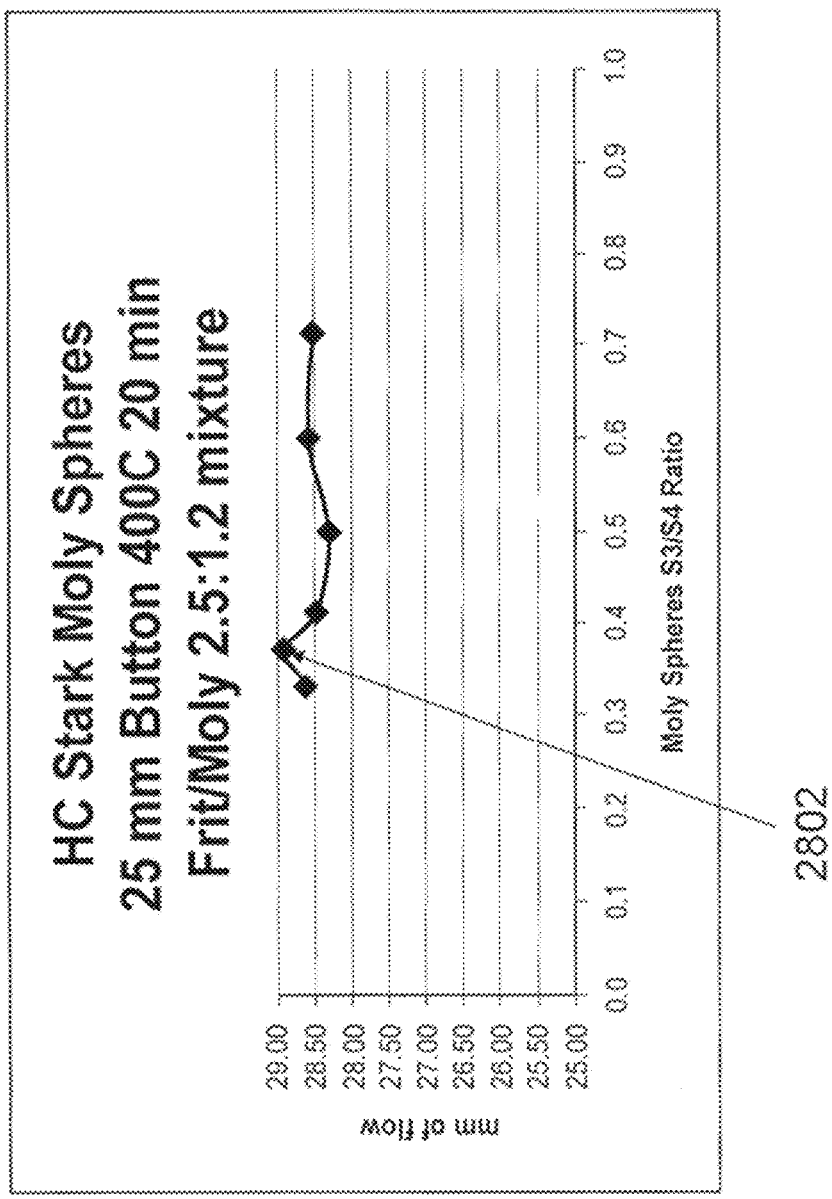
FIG. 28 is a graph with flow properties of certain example combined particle types.

FIG. 28 is a graph with flow properties of certain example combined particle types (e.g., certain compositions with combined CTE fillers shown in table 15). Here, six different combinations of CTE mixture are shown. The CTE mixture was combined with the frit material at a ratio of 2.5 grams of frit per 1.2 grams of CTE mixture. Of the six combinations tested, element 2802, with a combination of 35% S3 molybdenum particles to 65% S4 molybdenum particles, provided flow properties of about 29 mm. While this may be somewhat lower than the 30-35 mm range discussed above, such flow characteristics may still work in a production environment. Also, in certain example embodiments, additional mechanical pressure may be applied to the frit (with CTE filler) to facilitate application of the frit to the glass.

The following table 16 shows example combinations of various molybdenum sphere size combinations for the S2, S3, and S4 varieties described herein.

TABLE 16

| Batch # | S2 | S3 | S4 | Total gm | mm flow |
|---|---|---|---|---|---|
| 1 | 0 | 1.3 | 3.5 | 4.8 | 28.56 |
| 2 | 0.1 | 1.12 | 3.57 | 4.8 | 28.06 |
| 3 | 0.2 | 1.02 | 3.57 | 4.8 | 28.29 |
| 4 | 0.31 | 0.92 | 3.57 | 4.8 | 28.71 |
| 5 | 0.1 | 1.20 | 3.5 | 4.8 | 28.89 |

TABLE 16-continued

| Batch # | S2 | S3 | S4 | Total gm | mm flow |
|---|---|---|---|---|---|
| 6 | 0.2 | 1.1 | 3.5 | 4.8 | 28.45 |
| 7 | 0.3 | 1 | 3.5 | 4.8 | 28.44 |
| 8 | 0.1 | 1.27 | 3.43 | 4.8 | 28.44 |
| 9 | 0.2 | 1.18 | 3.43 | 4.8 | 28.22 |
| 10 | 0.29 | 1.08 | 3.43 | 4.8 | 28.50 |
| 11 | 0.1 | 1.34 | 3.36 | 4.8 | 27.97 |
| 12 | 0.19 | 1.25 | 3.36 | 4.8 | 28.33 |
| 13 | 0.29 | 1.15 | 3.36 | 4.8 | 28.25 |

Accordingly, certain example CTE fillers may have 3 or more particle ranges or distributions (e.g., S2, S3, and S4) to form an example CTE filler. It will also be appreciated that certain example CTE fillers may have slightly altered percentages. For example, the percentage of S3/S4 may be between about 25 and 50 percent S3 to a complementary amount of S4 (e.g., 50-75%).

Figure 29:
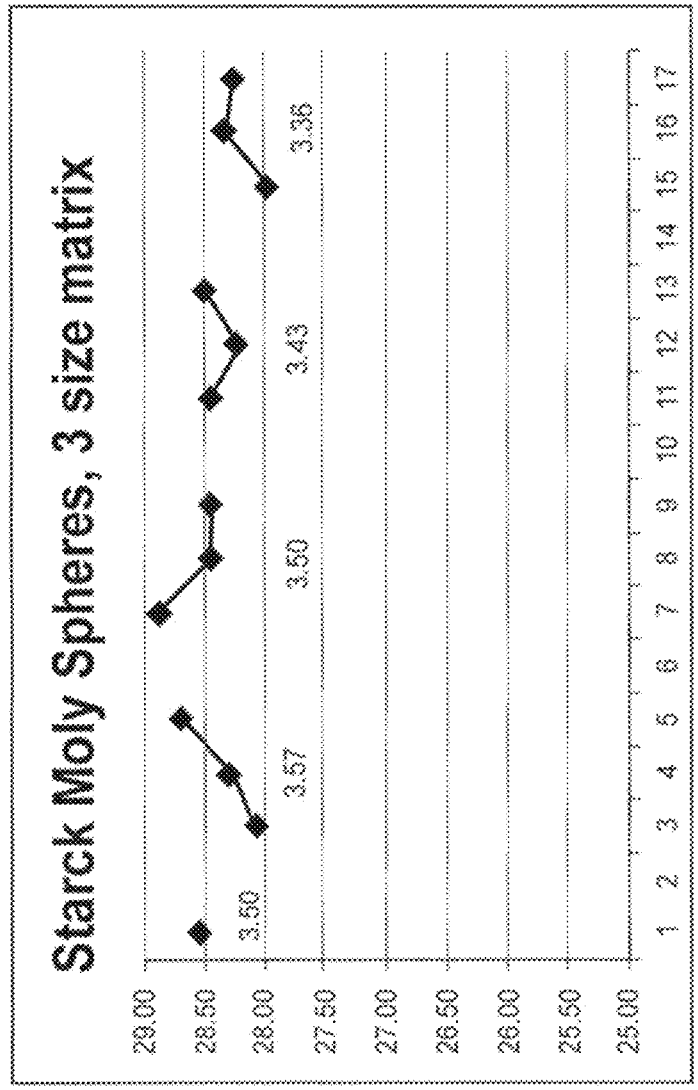
FIG. 29 is a graph with flow properties of certain example combined particle types.

FIG. 29 is a graph with flow properties of certain example combined particle types. Specifically, FIG. 29 shows the above combinations from table 16 on the graph, with combinations 1-13 shown from left to right.

Figure 30C:
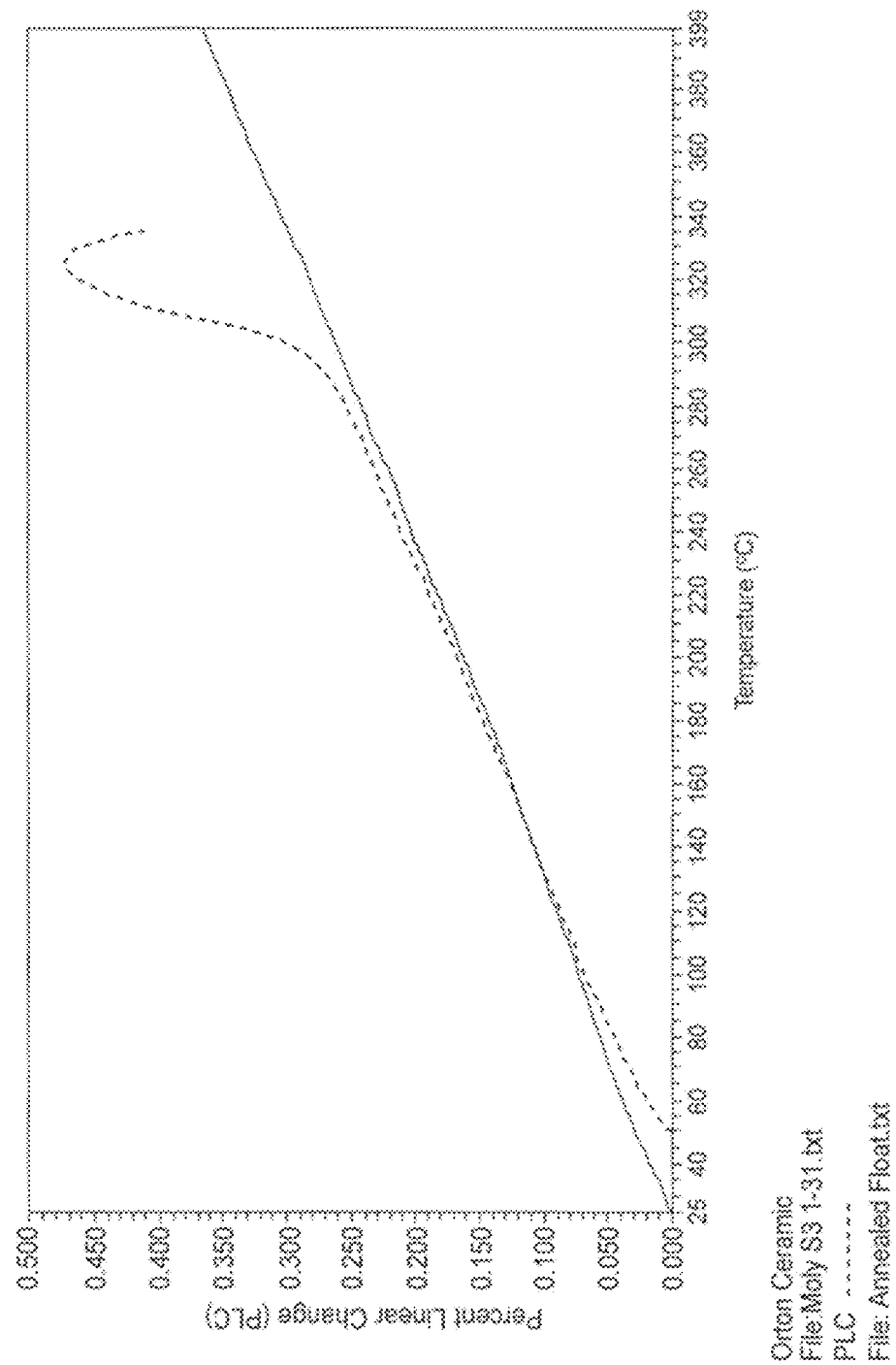

FIGS. 30A-30C are graphs that illustrate CTE values for example frit materials that include example CTE fillers. These graphs show CTE values (percent linear change) for various frit combinations. These may be used to determine when an example frit to molybdenum weight ratio is at a value that matches the CTE of the float glass.

FIG. 30A shows VBZ frit material with a CTE filler that includes lead titanate. Such a frit with a CTE filler may produce a satisfactory glass seal. Specifically, dilatometer output indicates that the frit is slightly higher than the glass (however, this may be due to a bias for the equipment used in producing these results). The top line is the frit (with the CTE filler), and the bottom line is the float glass. However, as described above, use of lead in a CTE filler may have certain disadvantages.

FIG. 30B is a graph of Alfa molybdenum spheres and VBZ frit at 1.2/2.5 weight ratio (e.g., 32 wt %). These tests showed cracking in the VIG units and incomplete sealing due to delamination of the frit seal from glass during cool down. The higher line supports the CTE measurement, is relative to the float glass, and may not be matched close enough to produce a satisfactory seal for certain applications.

FIG. 30C shows the same 1.2/2.5 CTE filler (e.g., molybdenum spheres) to frit ratio shown above (e.g., 32% wt). However, in this graph, the molybdenum spheres are combined at a 1.3/3.5 ratio of S3/S4 type molybdenum spheres. Although the 32 wt % is the same, the CTE is lower and may provide for increased match characteristics with the float glass. Accordingly, in certain example embodiments, the physical size of the molybdenum spheres may be adjusted to provide for an improved CTE filler. Such a CTE filler may be combined with a VBZ frit to produce a VIG unit. Certain example CTE fillers may be obtained by mixing two sizes of screened fractions of molybdenum spheres (e.g., HC Starck's S3 and S4).

The example embodiments described herein have been observed as exhibiting good compatibility with the specific example frit systems disclosed herein. For instance, the combination of the example CTE matchers with the example frit materials disclosed herein have been observed as having good sealing properties such as glassy fired appearance and good frit-to-glass wetting and bond strength. Mechanical strength also has been found to be good. Some other commercially available CTE matching materials do not exhibit the same compatibility, strengths, etc., with the example frit materials disclosed herein.

It will be appreciated that one or more metal oxide, chloride, and/or fluoride additives may be used as additives in different embodiments of this invention. Furthermore, in certain example implementations, the metal oxide, chloride, and/or fluoride additives may be stoichiometric or sub-stoichiometric.

It is noted that the example embodiments discussed herein may be used in connection with other applications such as, for example, MEMS applications. In the MEMS context, the CTE filler may be increased to lower overall expansion to silicon and/or alumina. For example, 3 ppm CTE matcher with 40 wt % $ZrW_2O_8$ may be sufficient for the former, and 8 ppm CTE with 35 wt molybdenum-based spheres may be sufficient for the latter.

In certain example embodiments, a method of making a vacuum insulated glass (VIG) unit is provided. First and second glass substrates are provided in substantially parallel, spaced apart relation to one another, with a gap being defined between the first and second substrates. An edge sealing material is disposed proximate to the first and/or second glass substrates, with the edge sealing material comprising at least a frit material and a coefficient of thermal expansion (CTE) matching material. Energy is applied to the edge sealing material so as to melt the edge sealing material at a melting temperature. The CTE matching material comprises a first element group and a second element group. The first element group includes a majority of elements that are between 40 and 100 microns in size, and the second element group includes a majority of elements that are between 80 and 200 microns in size. The frit material is formed from a base composition including: vanadium oxide (~45-50 Normalized Mole %), barium oxide (~20-23 Normalized Mole %), and zinc oxide (~19-22 Normalized Mole %).

In addition to the features of the previous paragraph, in certain example embodiments, elements of the CTE matching material may comprise molybdenum.

In addition to the features of the either of the two previous paragraphs, in certain example embodiments, the first element group may be lower, by weight, than the second element group.

In addition to the features of any of the previous three paragraphs, in certain example embodiments, a percentage, by weight, of the first element group in the CTE matching material may be between about 25 and 45 percent, and preferably about 35 percent.

In addition to the features of any of the previous four paragraphs, in certain example embodiments, a percentage, by weight, of CTE matching material of the edge sealing material may be between about 25 and 40 percent, and preferably about 32 percent.

In addition to the features of any of the previous five paragraphs, in certain example embodiments, a majority of elements in the first element group and a majority of the elements in the second element group may be substantially spherical.

In addition to the features of any of the previous six paragraphs, in certain example embodiments, the melting temperature of the edge sealing material may be about 400 degrees C. or less.

In addition to the features of any of the previous seven paragraphs, in certain example embodiments, the edge sealing material may have a flow rate that is similar to a 30 mm flow rate on a 25 mm button of the edge sealing material.

In addition to the features of any of the previous eight paragraphs, in certain example embodiments, the majority of elements of the first element group may be between about 70 and 90 microns and the majority of elements of the second element group may be between about 90 and 160 microns.

In certain example embodiments, a composition is provided. A coefficient of thermal expansion (CTE) material is substantially lead-free. A frit material has a composition that includes: vanadium oxide (~45-50 Normalized Mole %), barium oxide (~20-23 Normalized Mole %), and zinc oxide (~19-22 Normalized Mole %). The composition has a first CTE value that is within about 15% of soda lime silicate glass by virtue of the CTE material's composition. The CTE material comprises a first group of particles and a second group of particles, where the first group of particles includes a majority of elements that are between 60 and 100 microns in major distance and the second group of particles includes a majority of elements that are between 80 and 160 microns in major distance.

In addition to the features of the previous paragraph, in certain example embodiments, the first group of particles and the second group of particles may include molybdenum particles.

In addition to the features of the either of the two previous paragraphs, in certain example embodiments, the first group of particles may be lower, by weight, than the second group of particles.

In addition to the features of any of the previous three paragraphs, in certain example embodiments, a percentage, by weight, of the first group of particles in the CTE material may be about 35 percent.

In addition to the features of any of the previous four paragraphs, in certain example embodiments, a percentage, by weight, of CTE material of the composition may be about 32 percent.

In addition to the features of any of the previous three paragraphs, in certain example embodiments, the frit material may further include at least six additives selected from the group consisting of: $Ta_2O_5$, $Ti_2O_3$, $SrCl_2$, $GeO_2$, CuO, AgO, $Nb_2O_5$, $B_2O_3$, MgO, $SiO_2$, $TeO_2$, $Tl_2O_3$, $Y_2O_3$, $SnF_2$, $SnO_2$, $SnCl_2$, $CeO_2$, AgCl, $In_2O_3$, SnO, SrO, $MoO_3$, $CsCO_3$, and $Al_2O_3$.

In certain example embodiments, a vacuum insulted glass (VIG) unit is provided. First and second substantially parallel, spaced apart glass substrates are provided. An edge seal is provided around a periphery of the first and/or second substrates to form a hermetic seal therebetween and at least partially define a gap between the first and second substrates. The gap is provided at a pressure less than atmospheric. The edge seal may be formed from a material that at least initially corresponds to the composition of any of the four previous paragraphs.

In certain example embodiments, a method of making a composition is provided. A base composition is provided to a holder. The base composition comprises: vanadium oxide (~45-50 Normalized Mole %), barium oxide (~20-23 Normalized Mole %), and zinc oxide (~19-22 Normalized Mole %). The base composition is melted. The melted base composition is cooled and/or the melted base composition is allowed to cool so as to form an intermediate product. A base frit material is created from the intermediate product. The base frit material is combined with a CTE filler material that comprises a first element group and a second element group. The first element group includes elements that are between 40 and 100 microns in major distance, and the second element group includes elements that are between 80 and 200 microns in major distance.

In addition to the features of the previous paragraph, in certain example embodiments, the first element group may be lower, by weight, than the second element group.

In addition to the features of the either of the two previous paragraphs, in certain example embodiments, the base composition may include at least four additives selected from the group consisting of: $Ta_2O_5$, $Ti_2O_3$, $SrCl_2$, $GeO_2$, CuO, AgO, $Nb_2O_5$, $B_2O_3$, MgO, $SiO_2$, $TeO_2$, $Tl_2O_3$, $Y_2O_3$, $SnF_2$, $SnO_2$, $SnCl_2$, $CeO_2$, AgCl, $In_2O_3$, SnO, SrO, $MoO_3$, $CsCO_3$, and $Al_2O_3$.

In addition to the features of any of the previous three paragraphs, in certain example embodiments, the elements of the first element group may be between about 70 and 90 microns and the elements of the second element group may be between about 90 and 160 microns.

In certain example embodiments, a method of bonding a frit material to a glass substrate is provided. The frit material is combined with a CTE material to form a combined material. The combined material is disposed on the substrate. The combined material is heated to a temperature about 400 degrees C. or less. The CTE material comprises a first group of particles and a second group of particles, where the first group of particles includes a majority of elements that are between 60 and 100 microns in major distance and the second group of particles includes a majority of elements that are between 80 and 160 microns in major distance. A coefficient thermal expansion associated with the combined material is within 10% of the coefficient of thermal expansion of the glass substrate when heat is applied to the combined material. The frit material includes a composition comprises: vanadium oxide (~45-50 Normalized Mole %), barium oxide (~20-23 Normalized Mole %), and zinc oxide (~19-22 Normalized Mole %).

In addition to the features of the previous paragraph, in certain example embodiments, the first group of particles may be lower, by weight, than the second group of particles.

In addition to the features of the either of the two previous paragraphs, in certain example embodiments, a percentage, by weight, of the first group of particles in the CTE material may be about 35 percent.

In addition to the features of any of the previous three paragraphs, in certain example embodiments, a percentage, by weight, of CTE material of the material may be about 32 percent.

In addition to the features of any of the previous four paragraphs, in certain example embodiments, the majority of elements of the first group of particles may be between about 70 and 90 microns and the majority of elements of the second group of particles may be between about 90 and 160 microns.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulated glass (VIG) unit, the method comprising:

providing first and second glass substrates, spaced apart from each other, a gap being defined between the first and second glass substrates;

having an edge sealing material proximate to the first and/or second glass substrates; and applying energy to the edge sealing material so as to melt the edge sealing material;

wherein the edge sealing material comprises vanadium oxide, barium oxide, and zinc oxide as the three largest components, and further comprises niobium oxide.

2. The method of claim 1, wherein the niobium oxide comprises $Nb_2O_5$.

3. A method of making a vacuum insulated glass (VIG) unit, the method comprising:

providing first and second glass substrates, spaced apart from each other, a gap being defined between the first and second glass substrates;

having an edge sealing material proximate to the first and/or second glass substrates; and applying energy to the edge sealing material so as to melt the edge sealing material;

wherein the edge sealing material comprises vanadium oxide, barium oxide, and zinc oxide as the three largest components, and further comprises niobium oxide and tellurium oxide.

4. The method of claim 3, wherein the tellurium oxide comprises $TeO_2$.

* * * * *